(12) United States Patent
Oberoi et al.

(10) Patent No.: US 9,294,623 B2
(45) Date of Patent: Mar. 22, 2016

(54) SYSTEMS AND METHODS FOR SELF-SERVICE AUTOMATED DIAL-OUT AND CALL-IN SURVEYS

(75) Inventors: Gaurav Oberoi, Seattle, WA (US); Charles Groom, Seattle, WA (US)

(73) Assignee: SURVEYMONKEY.COM, LLC, Palo Alto, CA (US)

( * ) Notice: Subject to any disclaimer, the term of this patent is extended or adjusted under 35 U.S.C. 154(b) by 934 days.

(21) Appl. No.: 12/883,865

(22) Filed: Sep. 16, 2010

(65) Prior Publication Data

US 2012/0069977 A1    Mar. 22, 2012

(51) Int. Cl.
*H04M 11/00* (2006.01)
*H04M 3/51* (2006.01)
*H04M 3/493* (2006.01)

(52) U.S. Cl.
CPC ............ *H04M 3/5158* (2013.01); *H04M 3/493* (2013.01)

(58) Field of Classification Search
USPC .......................................................... 379/69
See application file for complete search history.

(56) References Cited

U.S. PATENT DOCUMENTS

| | | | |
|---|---|---|---|
| 4,355,372 A | 10/1982 | Johnson et al. | |
| 4,922,520 A | 5/1990 | Bernard et al. | |
| 5,740,035 A | 4/1998 | Cohen et al. | |
| 5,838,774 A * | 11/1998 | Weisser, Jr. | 379/92.02 |
| 5,893,098 A | 4/1999 | Peters et al. | |
| 5,943,416 A * | 8/1999 | Gisby | 379/265.13 |
| 6,093,026 A | 7/2000 | Walker et al. | |
| 6,175,833 B1 | 1/2001 | West et al. | |
| 6,189,029 B1 | 2/2001 | Fuerst | |
| 6,477,504 B1 | 11/2002 | Hamlin et al. | |
| 6,577,713 B1 * | 6/2003 | Peterson et al. | 379/88.22 |
| 6,581,071 B1 | 6/2003 | Gustman et al. | |
| 6,895,405 B1 | 5/2005 | Choi et al. | |
| 6,912,521 B2 | 6/2005 | Kraft et al. | |
| 6,925,166 B1 * | 8/2005 | Chan | 379/265.02 |
| 7,233,908 B1 | 6/2007 | Nelson | |
| 7,493,344 B2 | 2/2009 | Wald et al. | |
| 8,873,733 B1 * | 10/2014 | Snyder | 379/265.02 |
| 2002/0052774 A1 | 5/2002 | Parker et al. | |
| 2002/0188777 A1 | 12/2002 | Kraft et al. | |
| 2003/0101088 A1 | 5/2003 | Lohavichan | |
| 2004/0093257 A1 * | 5/2004 | Rogers et al. | 705/10 |
| 2004/0128183 A1 | 7/2004 | Challey et al. | |
| 2005/0071219 A1 | 3/2005 | Kahlert et al. | |
| 2005/0100158 A1 * | 5/2005 | Kreiner et al. | 379/265.02 |
| 2005/0147228 A1 * | 7/2005 | Perrella et al. | 379/265.06 |
| 2009/0063252 A1 | 3/2009 | Abhyanker | |
| 2009/0094627 A1 | 4/2009 | Lee et al. | |
| 2009/0276235 A1 | 11/2009 | Benezra et al. | |
| 2012/0072261 A1 | 3/2012 | Oberoi et al. | |

\* cited by examiner

*Primary Examiner* — Joseph T Phan
(74) *Attorney, Agent, or Firm* — Marger Johnson

(57) ABSTRACT

A poll definition comprising a plurality of poll questions and a phone list comprising a plurality of phone list entries is received over the network from a user. Each phone list entry comprises a phone number for one of a first plurality of poll targets. A first poll run is conducted as a dial-out poll run using the poll definition and the phone list, such that a first set of answers to the plurality of poll questions is received from at least some of the first plurality of poll targets. A second poll run is conducted as a call-in poll run, using the poll definition, such that a second set of answers to the plurality of poll questions is received from a second plurality of poll targets. A third poll run is conducted as a web survey, using the poll definition, such that a third set of answers to the plurality of poll questions is received from a third plurality of poll targets.

44 Claims, 61 Drawing Sheets

250

- 251 Select Phone List Entries From a Phone List
- 252 For Each Phone List Entry
- 253 Call Phone Number on Phone List Entry
- 254 Answer?
  - No → (loop back to 252)
  - Yes ↓
- 255 Conduct Voice Response Survey
- 256 Store Anwers On Database
- 257 View and Analyze Survey Results

Official Run - Web Survey

Please indicate how well done you like your meat. 1 = raw, and 5 = well done.

○ ○ ○ ○ ○
1 2 3 4 5

[Next]

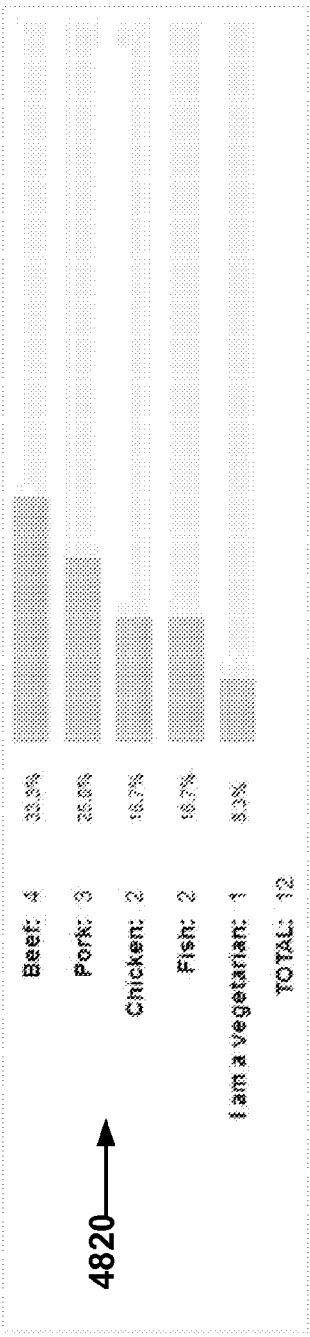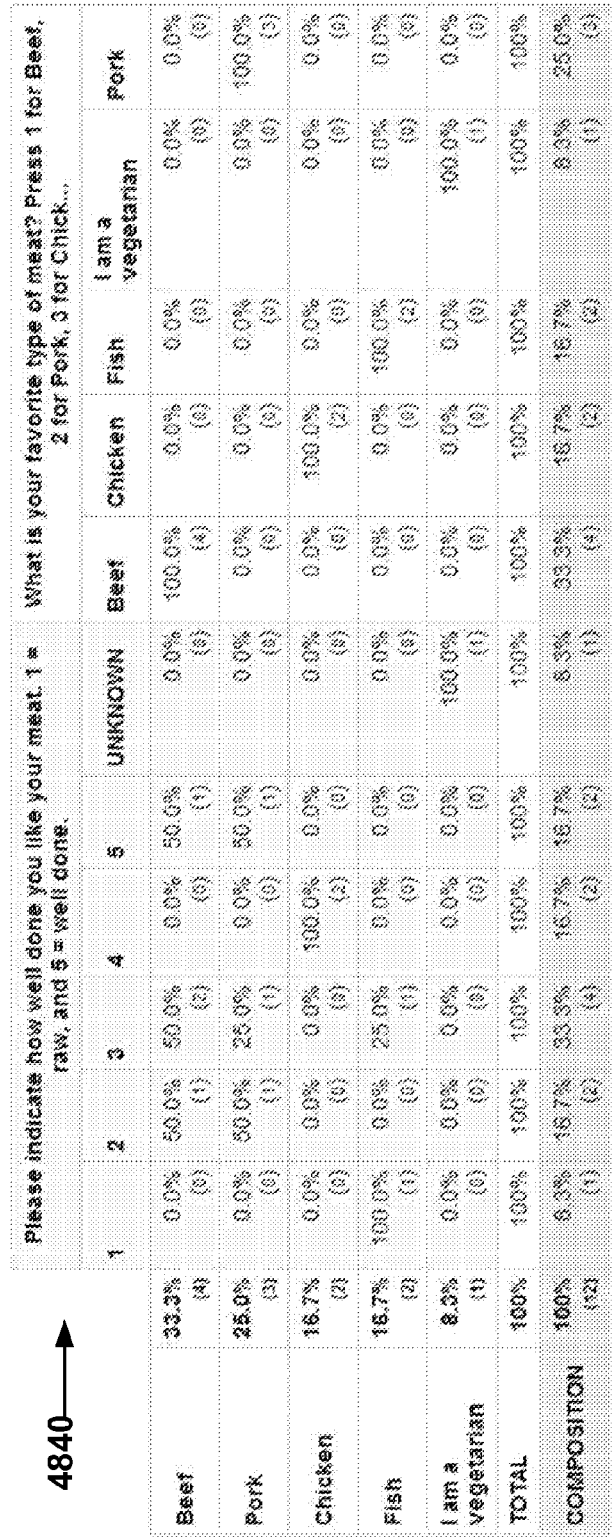
FIG. 48

SYSTEMS AND METHODS FOR SELF-SERVICE AUTOMATED DIAL-OUT AND CALL-IN SURVEYS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for defining and conducting automated surveys, and more particularly for systems and methods for self-service systems for conducting multimodal surveys.

BACKGROUND OF THE INVENTION

Surveys have long been a staple method for business to gather information for strategic and tactical decisions. Surveys enable businesses to determine consumer preferences for products and services, as well as consumer's experience and satisfaction with a company's customer service. The evolution of telephone communications and the Internet have enabled businesses to define and conduct automated surveys quickly and efficiently via such mediums without the need for human intervention.

BRIEF DESCRIPTION OF THE DRAWINGS

The foregoing and other objects, features, and advantages of the invention will be apparent from the following more particular description of preferred embodiments as illustrated in the accompanying drawings. The drawings are not necessarily to scale, emphasis instead being placed upon illustrating principles of the invention.

FIG. 4. illustrates one embodiment of a user account set up page.

FIG. 11. illustrates one embodiment of a multiple choice question entry page.

FIG. 12. illustrates one embodiment of a rating question entry page.

FIG. 37 illustrates one embodiment of a multiple choice question on a web survey.

FIG. 38. illustrates one embodiment of a rating question on a web survey.

FIG. 47. illustrates one embodiment of a cross tab setup page.

FIG. 48. illustrates one embodiment of a display of results for a multiple choice question.

FIG. 50. illustrates one embodiment of a display of results for an "Enter a number" question.

FIG. 52. illustrates one embodiment of a of a cross tab setup page including demographics.

FIG. 53. illustrates one embodiment of a display of results for a multiple choice question with demographics.

FIG. 55. illustrates one embodiment of a display of results for an "Enter a number" question with demographics.

DETAILED DESCRIPTION

Figure 1:
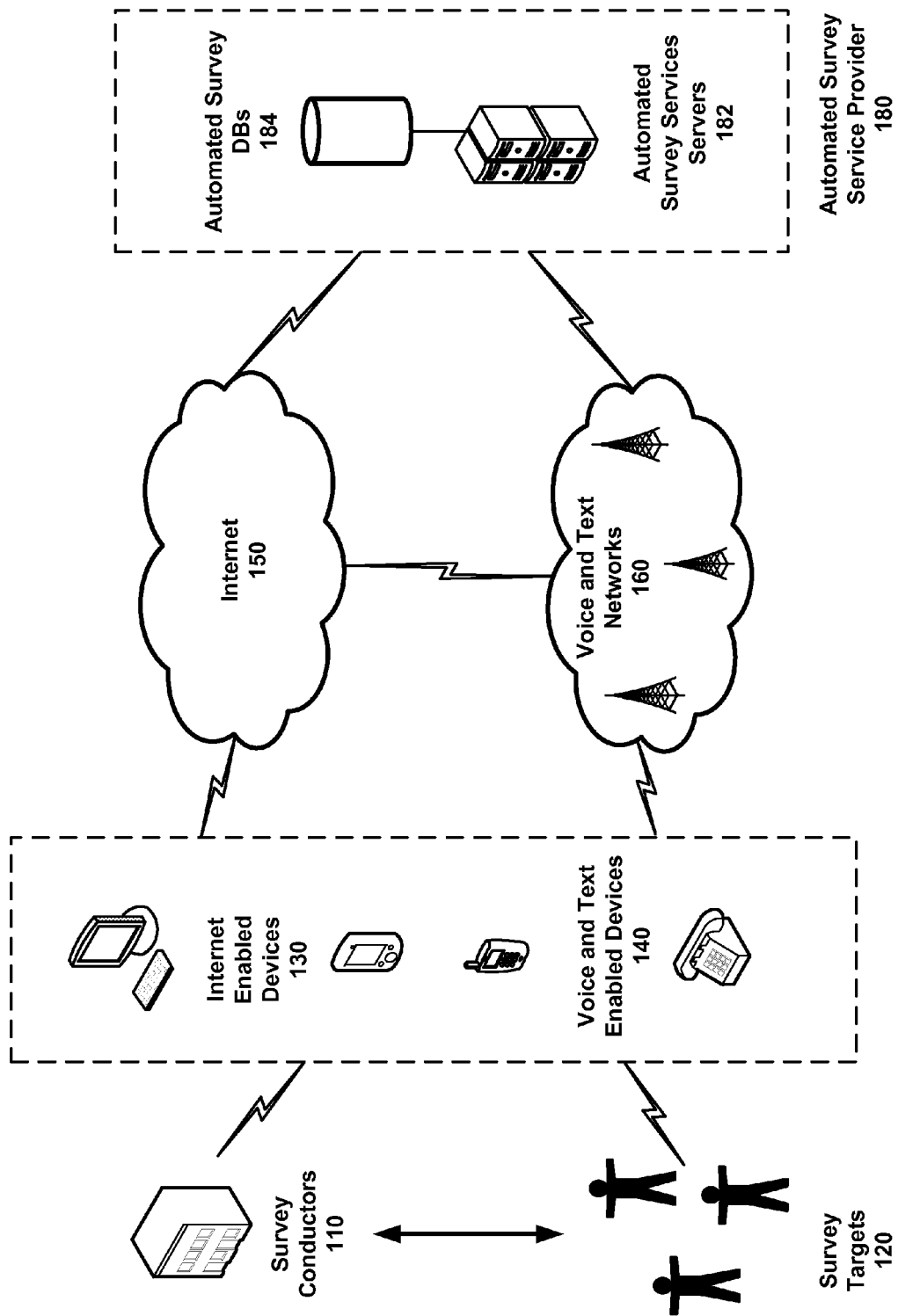
FIG. 1 illustrates one embodiment of an overall environment in which a system for automated surveys could exist.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

The present disclosure is directed to systems and methods that provide a service for self-service automated phone surveys solution that allow user to go from designing a survey to analyzing results entirely without additional human intervention.

FIG. 1 illustrates one embodiment of an overall environment in which a system for automated surveys could exist. Survey conductors 110 may wish to survey a plurality of survey targets 120 by, for example, directing one or more specific questions to the survey targets. Survey conductors 110 are commonly businesses who wish to survey consumers regarding products and/or services the survey conductors either offer, or are considering offering in the future. Survey conductors 110 could, however, comprise any other type of person or entity interested in receiving answers to specific questions or sharing information with others. For example, surveys could be set up to encourage voters to go to the polls on election day, to poll the membership of a organization for their opinions on important issues, to call existing members of an organization to see if they'd like to participate in a funding drive, to collect email addresses from a group of individuals, or simply share important information by sending announcements to a list of individuals without asking any questions.

Survey targets 120 are commonly consumers or potential consumers of products and/or services offered by survey conductors 110. Survey targets 120 could, however, comprise any other type of person or entity whose knowledge, preferences or opinions may be of interest to survey conductors or with whom such survey conductors would like to share important information.

Survey conductors 120 can, of course, conduct surveys without the services of an automated survey system. In the most basic form, a survey conductor 110 can direct surveys directly to survey targets 120, for example, by in-person interviews, telephone interviews, hard copy mail, directed emails, and so forth. Such methods, however, can be slow, inefficient and expensive, at least in part because of significant manpower requirements.

An automated survey service provider 180 can enhance the speed and cost effectiveness of conducting surveys. In one embodiment, the automated survey service provider 180 maintains one or more automated survey service servers 182 that provide software and hardware to enable automated surveys conducted via one or more modes. Such modes could include dial-out, call-in and web surveys. In one embodiment, automated survey data, including survey questions and answers, lists of survey targets and survey results can be maintained on one or more automated survey databases 184.

In one embodiment, automated survey services provider 180 provides self-service survey services via one or more applications systems implemented on the automated survey services servers 182. In one embodiment, such application systems provide a web-based interfaces for survey conductors 120 to setup and run polls and analyze poll results for, without limitation, dial-out and call-in polls and web surveys.

In one embodiment, automated survey services servers 182 interface to voice networks 160 via a services provided by communications service provider (not shown), such as, for example, the TWILIO cloud-based telephony and communications service. In one embodiment, the service provider provides an API to interface into voice communications services that enable applications hosted on the automated survey services servers 182 to make phone calls, receive phone calls, play voice messages, receive voice messages and receive phone key press data. Alternatively, the automated survey services provider 180 may host their own equipment and software that enable applications hosted on the automated survey services servers 182 to make phone calls on a voice network 160, receive phone calls from the voice network, play voice messages, receive voice messages and receive phone key press data.

In one embodiment, regardless of what mode is used to conduct the survey, once a survey is designed and a list of targets is selected, the automated survey service provider 180 automatically conducts the survey until survey objectives (e.g. a minimum number of responses) are reached. The automated survey service provider 180 could additionally provide reporting services to the survey conductors 110 to provide various types of summary and detail reports that allow the survey conductors to analyze and interpret survey results.

FIG. 1 is purely illustrative, and it is understood the functionality provided could be provided via other hardware and/or software configurations. For example, automated survey service servers 182 could be implemented as cloud based servers, or could be maintained on behalf of the service provider by a third party.

Figure 2A:
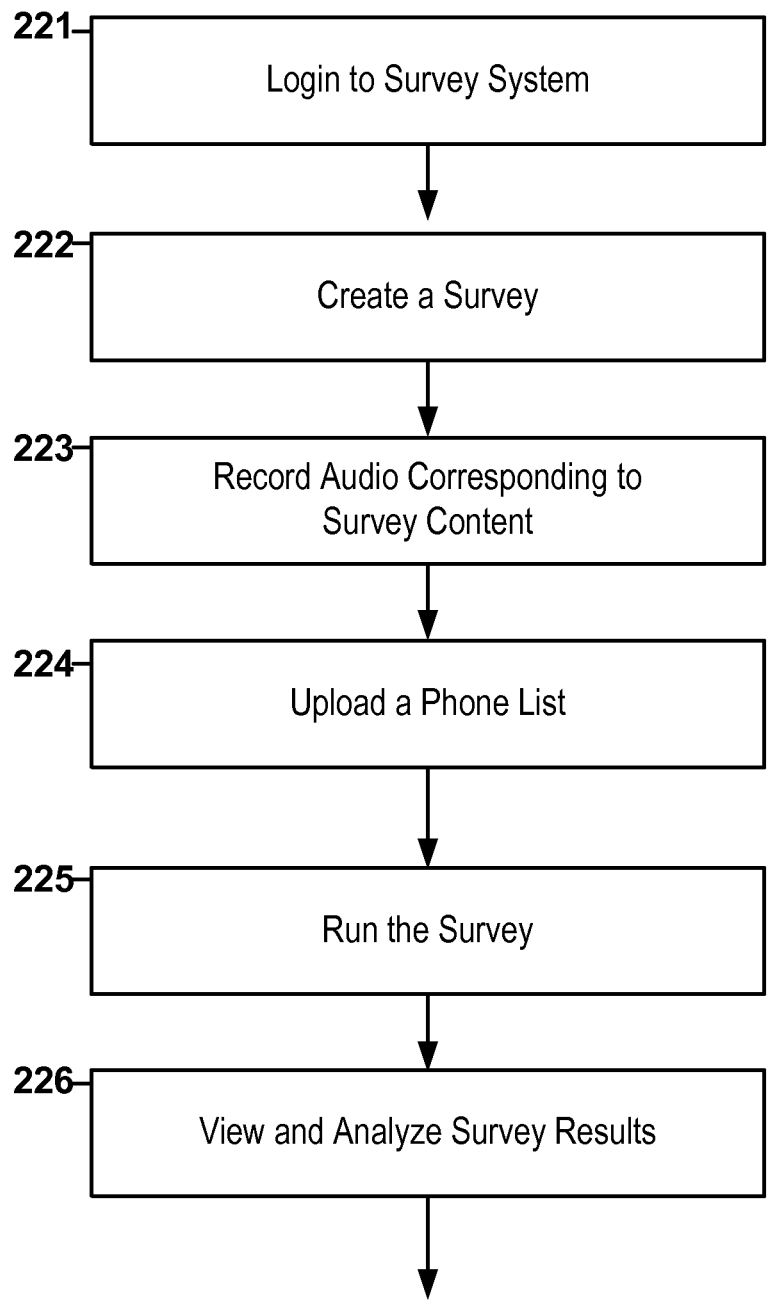
FIG. 2A illustrates a high-level process for conducting a self service automated survey using one or more embodiments of the disclosed systems and methods.

FIG. 2A illustrates a high-level process 220 for conducting a self service automated survey using one or more embodiments of the disclosed systems and methods. In the discussion that follows, the terms "poll" and "survey" are used interchangeably, and it is understood in the discussion that follows that a "poll" is a type of survey where the automated survey system solicits information, or provides information to survey targets via electronic means.

A user logs 221 into an automated survey system using a user ID and password. In one embodiment, the user sets up a user account to provide payment for conducting the survey, as well as to provide secure access to survey results. The user then sets up a survey/poll definition 222 though an online interface. In one embodiment, the survey/poll can include messages and a set of one or more questions. The user can then record 223 audio versions of survey/poll messages and questions and upload a phone 224 list if the survey/poll in question is to be conducted telephonically. The user then schedules the survey/poll to be run 225 by the automated survey system. In one embodiment, the automated survey system can run the survey/poll as a call-in poll, a dial-out poll, a web survey, or any combination of the three. While the survey/poll is running, and after it completes, the user can view and analyze 226 the survey/poll results.

Figure 2B:
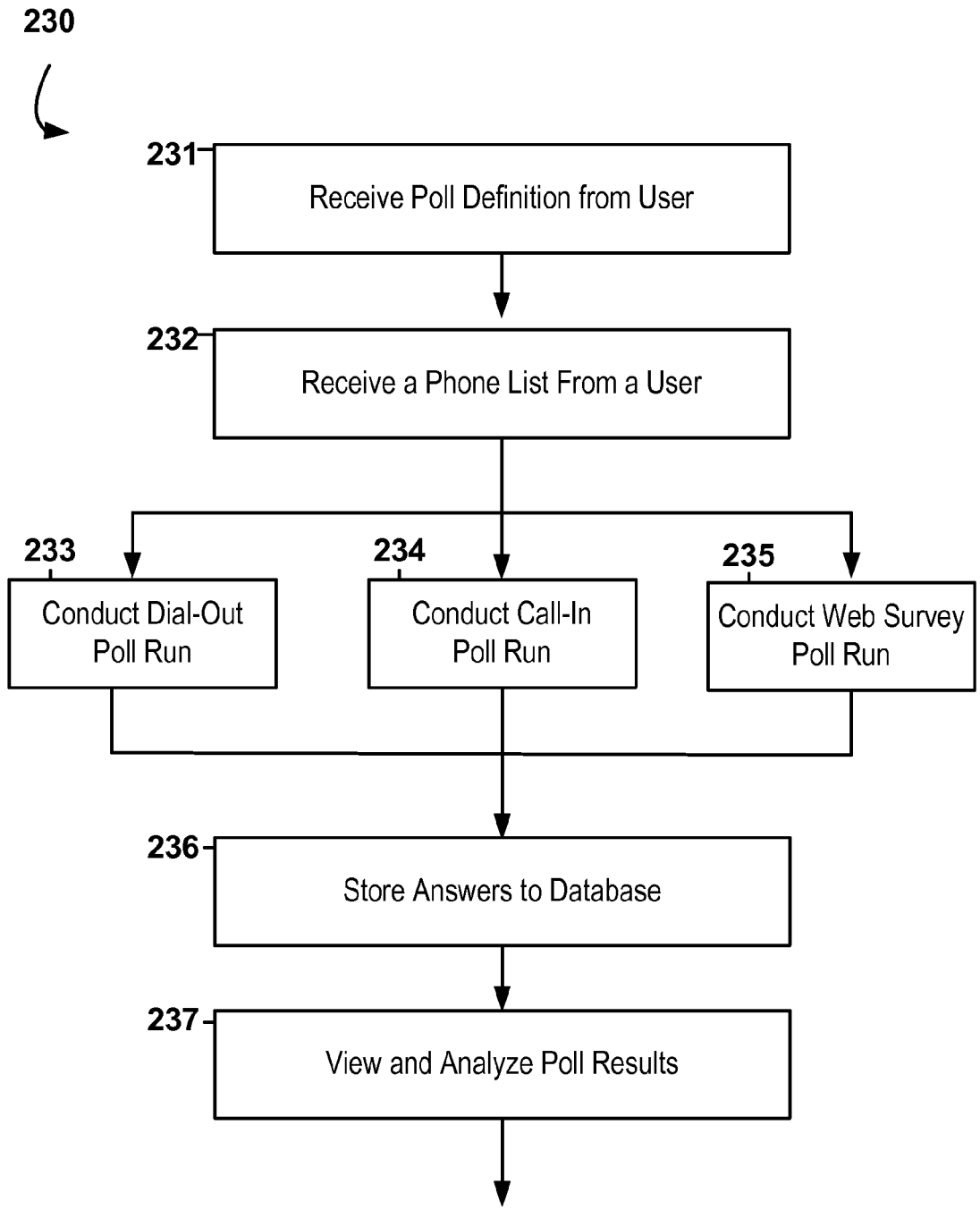
FIG. 2B illustrates a process for multimodal survey system using one or more embodiments of the disclosed systems and methods.

FIG. 2B illustrates a process 230 for multimodal survey system using one or more embodiments of the disclosed systems and methods.

A poll definition comprising a plurality of poll questions is received 231 from a user over a network at a computing device. A phone list comprising a plurality of phone list entries is received 232 from a user over a network. Each phone list entry comprises a phone number for one of a first plurality of poll targets, and can additionally comprise information relating to poll targets, such as demographics A first poll run is conducted 233, using the computing device, as a dial-out poll run using the poll definition and the phone list, such that a first set of answers to the plurality of poll questions is received from at least some of the first plurality of poll targets. A second poll run is conducted 234, using the computing device, as a call-in poll run, using the poll definition, such that a second set of answers to the plurality of poll questions is received from a second plurality of poll targets. A third poll run is conducted 235, using the computing device, as a web survey, using the poll definition, such that a third set of answers to the plurality of poll questions is received from a third plurality of poll targets. The first, second and third set of answers to the plurality of poll questions are stored 236 to a poll answers database, such that the answers are stored in association with the poll run to which they relate. While the survey is running, and after it completes, the user can view and analyze 237 the survey/poll results.

Figure 2C:
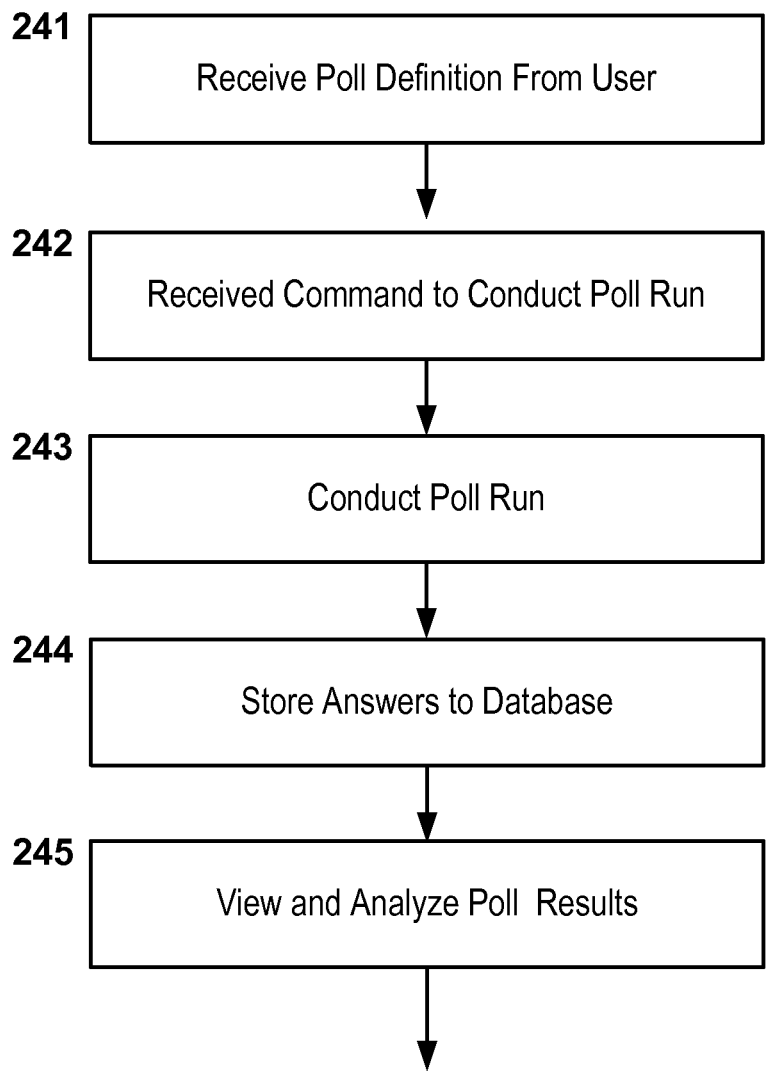
FIG. 2C illustrates a process for multimodal survey system with a user selectable polling mode using one or more embodiments of the disclosed systems and methods.

FIG. 2C illustrates a process 240 for multimodal survey system with a user selectable polling mode using one or more embodiments of the disclosed systems and methods.

A poll definition comprising a plurality of poll questions is received 241 from a user, over a network. at a computing device. A command to conduct a poll run is received 242 over the network. The command comprises a polling mode selected from a set of possible polling modes presented to the user through a user interface, the set consisting of dial-out, call-in and web survey. In one embodiment, various configuration parameters for the poll run can additionally be set at this time, such as for example, times during which phone calls may be made, completion criteria, caller ID parameters and so forth. A poll run then is conducted 243, over a network, using the polling mode and the poll definition, such that a set of answers to the plurality of poll questions is received from a plurality of poll targets. The set of answers to the plurality of poll questions is stored 244 to a poll answers database, such that the answers are stored in association with the poll run. While the survey is running, and after it completes, the user can view and analyze 245 the survey/poll results stored on the poll answers database.

Figure 2D:
FIG. 2D illustrates a process for dial-out polling using one or more embodiments of the disclosed systems and methods.

FIG. 2D illustrates a process 250 for dial-out polling using one or more embodiments of the disclosed systems and methods.

A plurality of phone list entries are selected 251 from a phone list. Each phone list entry comprises a target phone number. For each of the plurality of phone list entries 252, the phone number of the respective phone list entry is called 253 over a voice network. If the call is answered 254, a voice response survey is conducted 255, using the computing device, using a poll definition comprising at least one question, such that a person responding to the call is asked the poll questions using a voice capability provided via the computing device. In one embodiment, if a call is not answered, the number is retried a predefined number of times at fixed intervals (e.g. 3 times, once per hour). In one embodiment, if a call is answered by an answering machine, a message is left for the target or the call is retried. Answers received to the poll questions via the voice network. are stored 256 to the poll run answers database. While the survey is running, and after it completes, the user can view and analyze 257 the survey/poll results stored on the poll answers database.

Figure 2E:
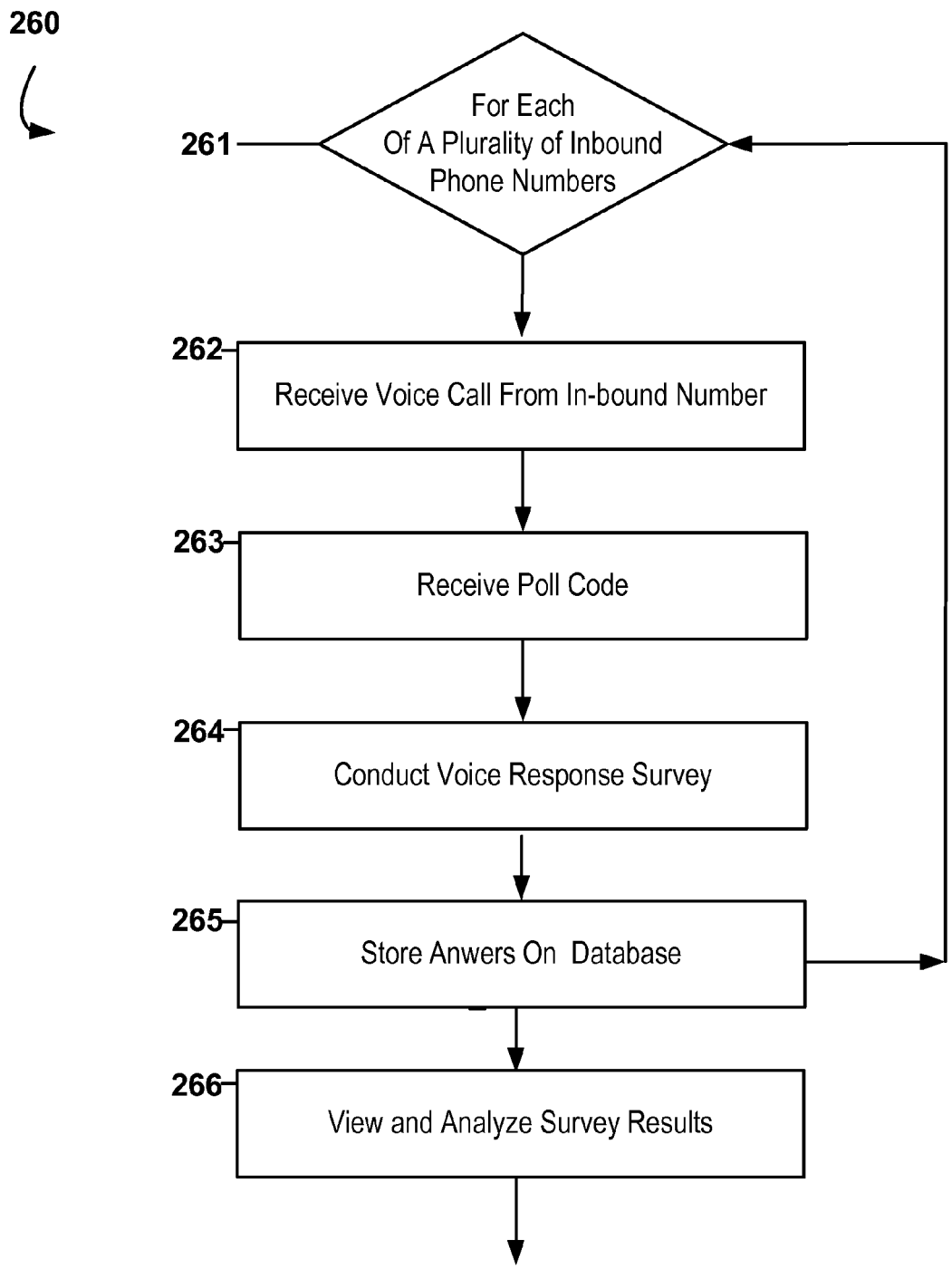
FIG. 2E illustrates a process for call-in polling using one or more embodiments of the disclosed systems and methods.

FIG. 2E illustrates a process 260 for call-in polling using one or more embodiments of the disclosed systems and methods.

For each 261 of a plurality of in-bound phone numbers, a voice call is received 262 from the respective phone number. A poll code is received 263, via the voice call, using the computing device. A voice response survey is conducted 264, using a poll definition corresponding to the poll code. The poll definition comprises at least one question, such that a person making the inbound call is asked the poll questions using a voice capability provided via the computing device. Answers are received to the poll questions via the voice network and are stored 265, using the computing device, to a poll run answers database. While the survey is running, and after it completes, the user can view and analyze 266 the survey/poll results stored on the poll answers database.

Functions provided by various embodiments of the disclosed systems and methods will now be discussed in greater detail.

User Login to the Survey System

In one embodiment, user login corresponds to step 221 of FIG. 2A.

Figure 3:
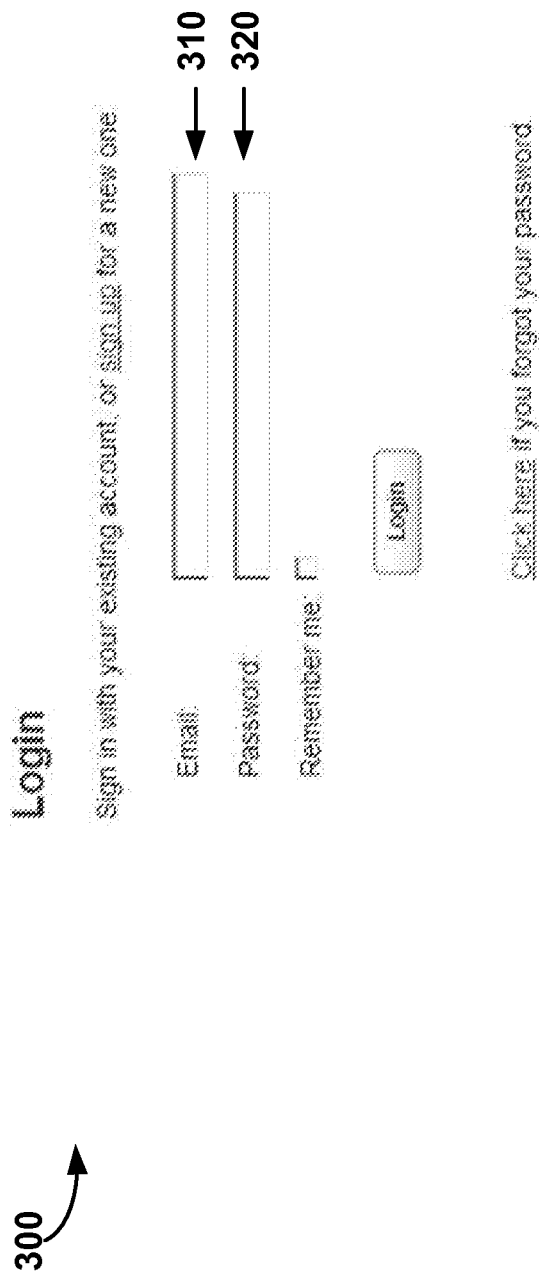
FIG. 3 illustrates one embodiment of a survey system login page.
Figure 4:
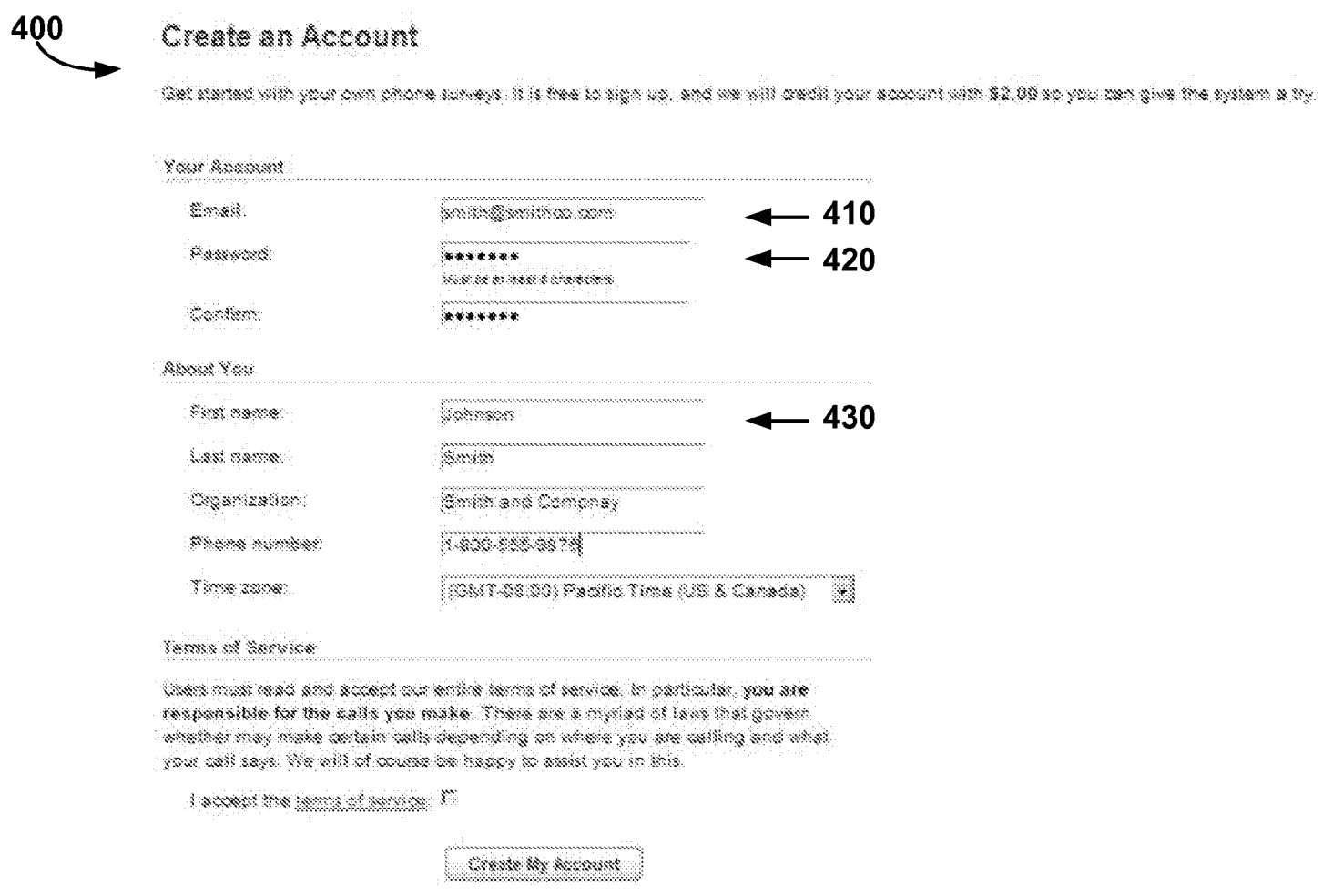

In one embodiment, user accounts and automated surveys/polls are set up with an automated server system over the Internet using a browser-based interface provided by a survey services server. In one embodiment, users create accounts using an email and a password. The user initially proceeds to a webpage with a login prompt 300 such as shown in FIG. 3. In one embodiment, the user enters an email address 310 and a password 320. Where the user is setting up a new account, the user proceeds to a user account set up page 400 such as shown in FIG. 4. In one embodiment, accounts are set up using basic contact information, including an email address 410, password 420, and name, address and telephone number 430. When the user account is set up, a survey system dashboard 500, such as shown in FIG. 5 is displayed.

In one embodiment, surveys are paid for on a prepaid basis, and a balance is maintained for the user. In the illustrated embodiment, the user is initially credited with a trial balance of $2.00. The charge applied for a given survey/poll varies depending on the mode of the survey. For example, in one embodiment, dial-out surveys could cost $0.30 per call. In one embodiment, users can add money to their account using any form of payment adapted to online payment such as, for example, credit cards, or PAYPAL or GOOGLE CHECKOUT payment services. In one embodiment, users cannot add funds to their account until they are verified by the automated survey service provider.

In one embodiment, the system deducts from this account balance when, for example, calls are made, or when recorded messages are transcribed. In one embodiment, an account balance can be allowed to be reduced to a negative balance, for example, in the case of a high-volume poll, where the user begins with a positive balance. In one embodiment, when a user's account balance runs to zero, the user's polls stop running.

Figure 5:
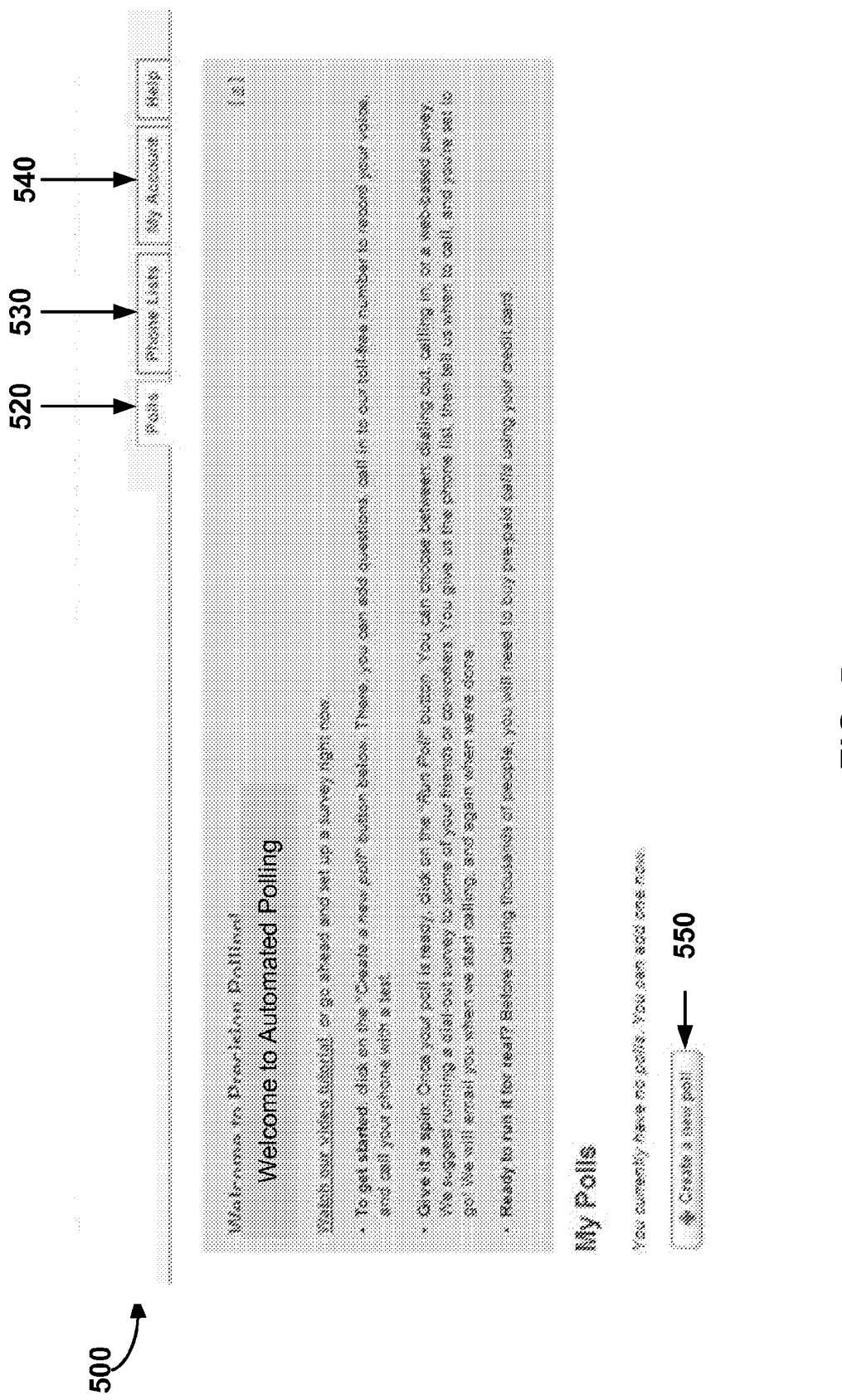
FIG. 5 illustrates one embodiment of a survey system dashboard.

In one embodiment, the dashboard 500 as shown in FIG. 5. provides access, via tabs for polling functions 520, phone list set up 530 and account management 540. Account management functions can include, in addition to adding funds to the user account, functions for updating user-specific settings like time zone, company logo, and user preferences, as well as purchase history (e.g. payment for poll runs).

Creation of a Survey/Poll Definition

In one embodiment, the creation of a poll definition corresponds to step 222 of FIG. 2A, step 231 of FIG. 2B, step 241 of FIG. 2C. In one embodiment, poll definitions are used in running polls in step 225 of FIG. 2A, steps 233-235 of FIG. 2B, step 243 of FIG. 2C, step 255 of FIG. 2D and step 264 of FIG. 2E.

Figure 6:
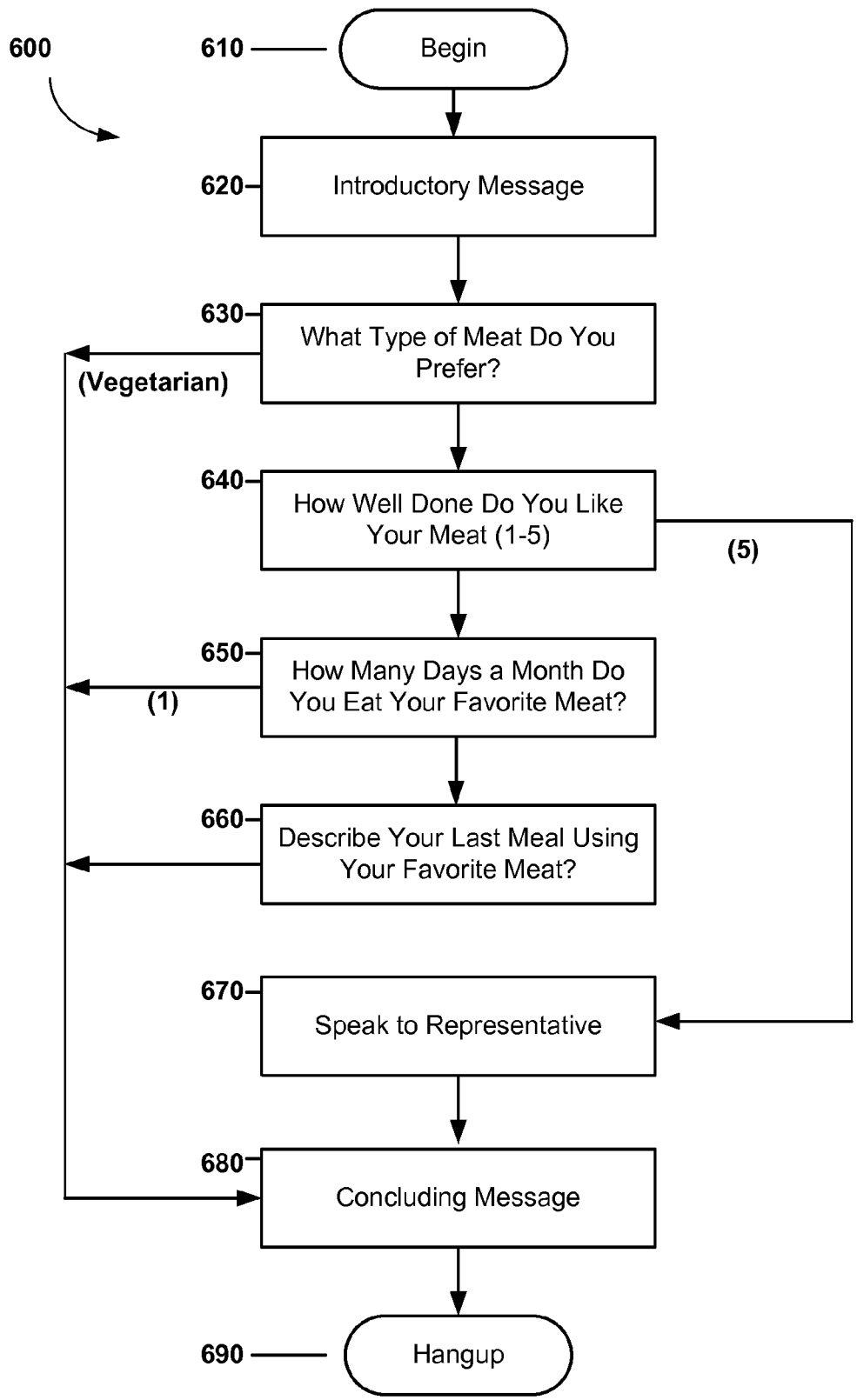
FIG. 6 illustrates a flow chart of one embodiment of an exemplary poll.

By way of non-limiting example, suppose a user wishes to create a poll "Food Preferences" to poll survey targets for their meat consumption habits. FIG. 6 illustrates a flow chart of one embodiment of an exemplary poll for gathering such information. The logical flow of the poll is as follows. When the poll begins 610, the target is first given an introductory message 620 as to the nature and purpose of the poll. The target is then asked a multiple-choice type question 630 "What Type of Meat Do You Prefer?" and given a set of 5 choices: beef, pork, chicken, fish and vegetarian. If the target selects "vegetarian", the poll immediately flows to a concluding message 680 that notifies the target that the poll is complete and the poll hangs up 690, since the main purpose of the poll is to survey meat consumption habits.

If the target does not selects "vegetarian", the target is then asked a rating-type question 640 "How Well Done Do You Like Your Meat", and is give a choice of ratings from 1 to 5 as to how well-done the target prefers their meat, where 1=raw and 5=very well done. If the target prefers their meat very well done (5), the survey immediately flows to a step where the user is patched through to a phone number to speak with a live representative 670. A target could be directed to a live representative for any reason. In the illustrated embodiment, one purpose of passing the user to a live representative could be to determine exactly why the target prefers their meat well done (e.g. health concerns). The user could also be patched through to a phone number with a recorded message (e.g. cooking instructions to avoid overcooking meat). When the live call completes, the survey passes to the concluding message 680.

If the target did not respond with a 5 (well-done) to the rating question 640, the survey passes on to an "enter a number" type question 650 where the user is asked a question "How Many Days a Month Do You Eat Your Favorite Meat?" The user can then respond with a number from 0 to 31. If the target answers 1, the survey immediately flows to a concluding message 680, since the intent of the survey is to gather information from targets who consume a moderate to large amount of meat.

If the target responded with a number other than 1 to the "enter a number" question 650, the survey passes on to an operation to record a voice message 660 where the user is asked a question to the effect "Describe Your Last Meal Using Your Favorite Meat?" The user can then record a voice message. When the recording of the voice message is complete, the survey flows to a concluding message 680. The purpose of recording a message could be to gather detailed information on exactly how and where the user consumes his or her favorite meat.

Figure 7:
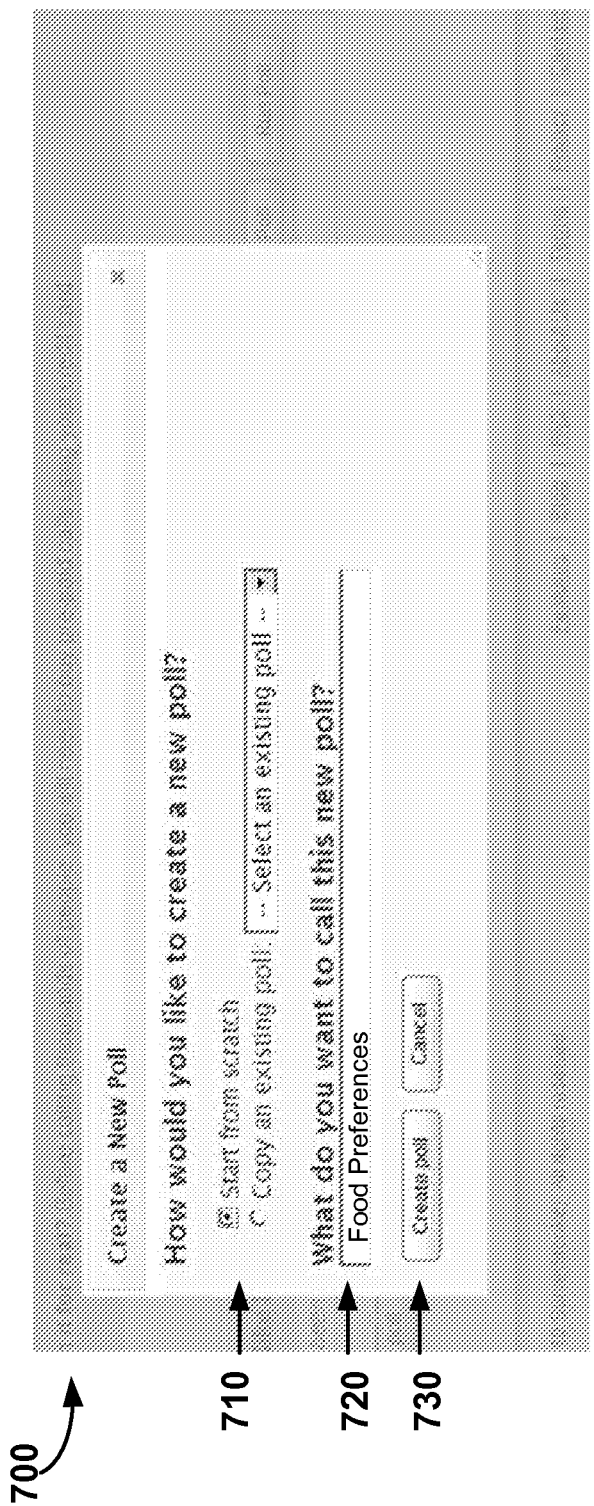
FIG. 7. illustrates one embodiment of a poll creation page.

The process of setting up such a poll on one embodiment of an automated self-service survey system is now described. In one embodiment, a user begins the process of setting up a poll from the dashboard in FIG. 5. The user begins by clicking the "Create a new poll" control 550. Control flows to a poll creation page 700, as shown in FIG. 7. In the illustrated embodiment, the user can create a poll from scratch 710, or copy an existing poll. If the user is creating a new poll, the user enters a poll name 720 and selects the "Start from scratch"

option 720, and clicks on the "Create poll" control. Control then proceeds to a poll editing page 800 such as shown in FIG. 8.

Figure 8:
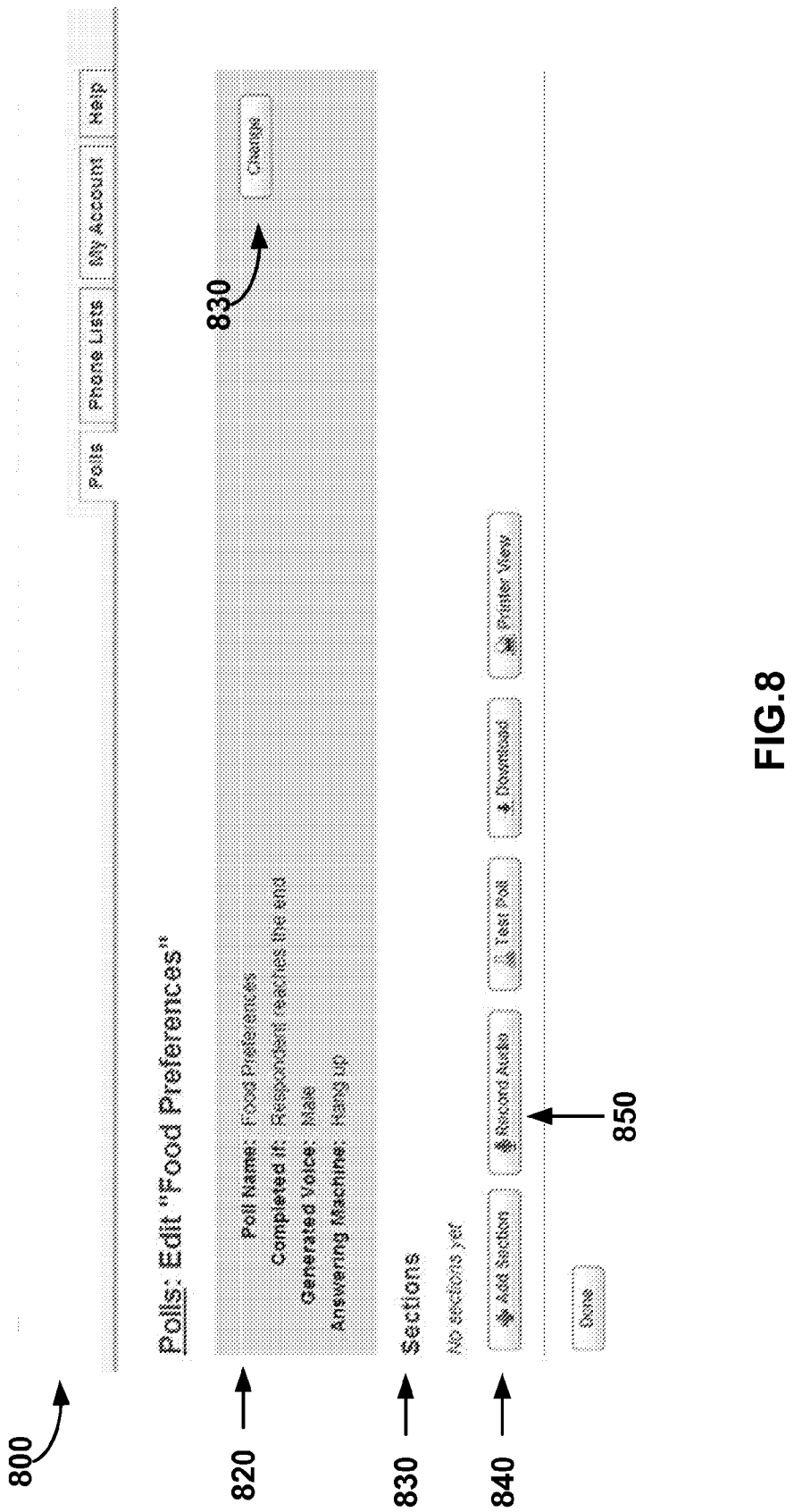
FIG. 8. illustrates one embodiment of a poll creation page.

In FIG. 8, the user has begun the creation of the exemplary poll, "Food Preferences", In the illustrated embodiment, a poll is divided up into sections 830, where each section comprises one step in the poll, such as a message, a question or an operation. The poll currently has no section. In one embodiment, the poll is initially defined with a set of default options 820 which the user can modify by clicking on the "Change" control 830. Among the options displayed is a completion option that defines when a response to a poll is considered complete. In one embodiment, the default completion option requires a survey target to reach the end of the poll, but alternatively, the user may elect to consider a poll complete when a specific section (e.g. a specific question before the end of the survey) is complete. In one embodiment, the user may elect to consider a poll complete if a target listens to the entire poll, but takes no action.

A user may elect to have a phone survey conducted using a machine generated voice to phrase questions in lieu of recording questions (discussed below). In one embodiment, the user can elect a male or female machine generated voice. In one embodiment, the user can specify what action to take if an answering machine pickup is detected. In one embodiment, the default option is to simply hang-up, but the system can also provide the ability to leave a message on the target's answering machine. For example, in a dial-out survey, a user could elect to leave a message for the target to give the target a phone number to complete the survey on a call in basis.

Note that basic poll options do not specify whether the poll will be a conducted as a dial-out, a call-in or a web-based survey. In one embodiment, the mode of the poll is conducted is determined at poll run time, and a poll could be conducted via multiple modes in multiple poll runs. Also note that while the illustrated embodiments discussed herein relate to dial-out and call-in surveys using voice technology and web based surveys, poll run modes could include any medium adapted to electronic communications, such as, for example via SMS messaging.

Figure 9:
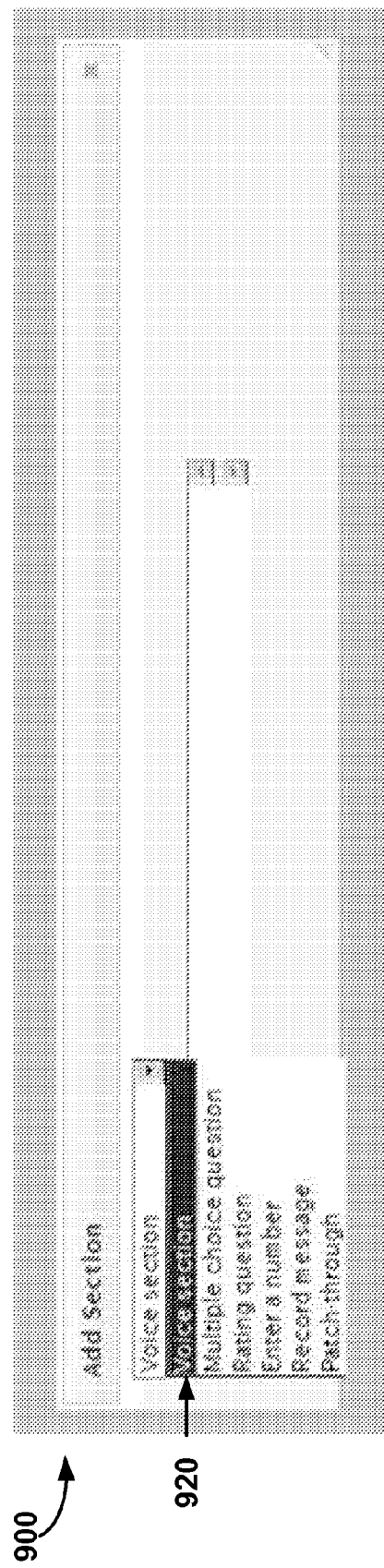
FIG. 9. illustrates one embodiment of an "Add Section" page.

The user begins adding sections to the survey by clicking the "Add Section" control 840 as shown in FIG. 8. In one embodiment, as shown in FIG. 9, an "Add Section" page 900 then is then displayed providing the user with a drop down selection list 920 including options for voice sections, multiple choice questions, rating questions "enter a number" type questions, record message questions, and patch though sections (e.g. link to an another phone number). Each will be discussed in turn below in connection with the construction of the exemplary poll.

Figure 10:
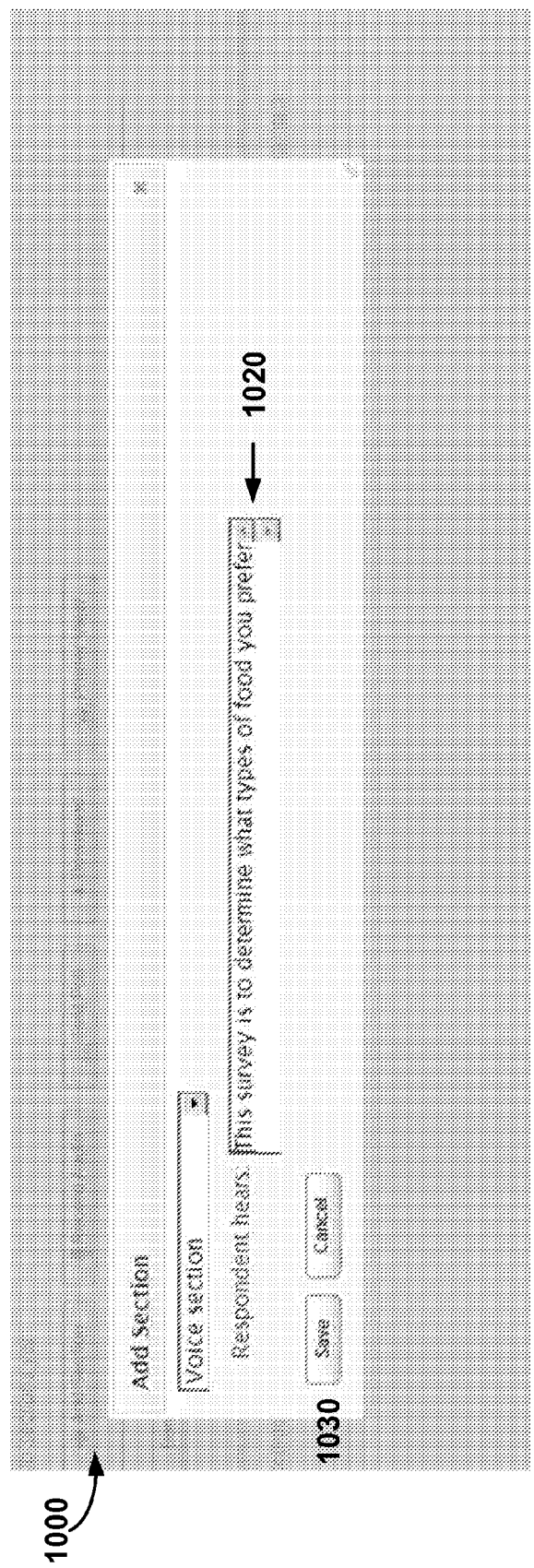
FIG. 10. illustrates one embodiment of a voice section entry page.

In one embodiment, step 620 of the exemplary poll corresponds to a voice section in an automated survey system. The user begins entry of a voice section by selecting "Voice section" from the dropdown menu 920 in FIG. 9. A voice section entry page 1000 is then displayed as shown FIG. 10. In one embodiment, the voice section page provides a free-form text entry box 1020 for user supplied text. The user can then click the "Save" control 1030 to save the section. In the illustrated embodiment, the text section as shown is added as section 1 of the exemplary poll.

Figure 11:
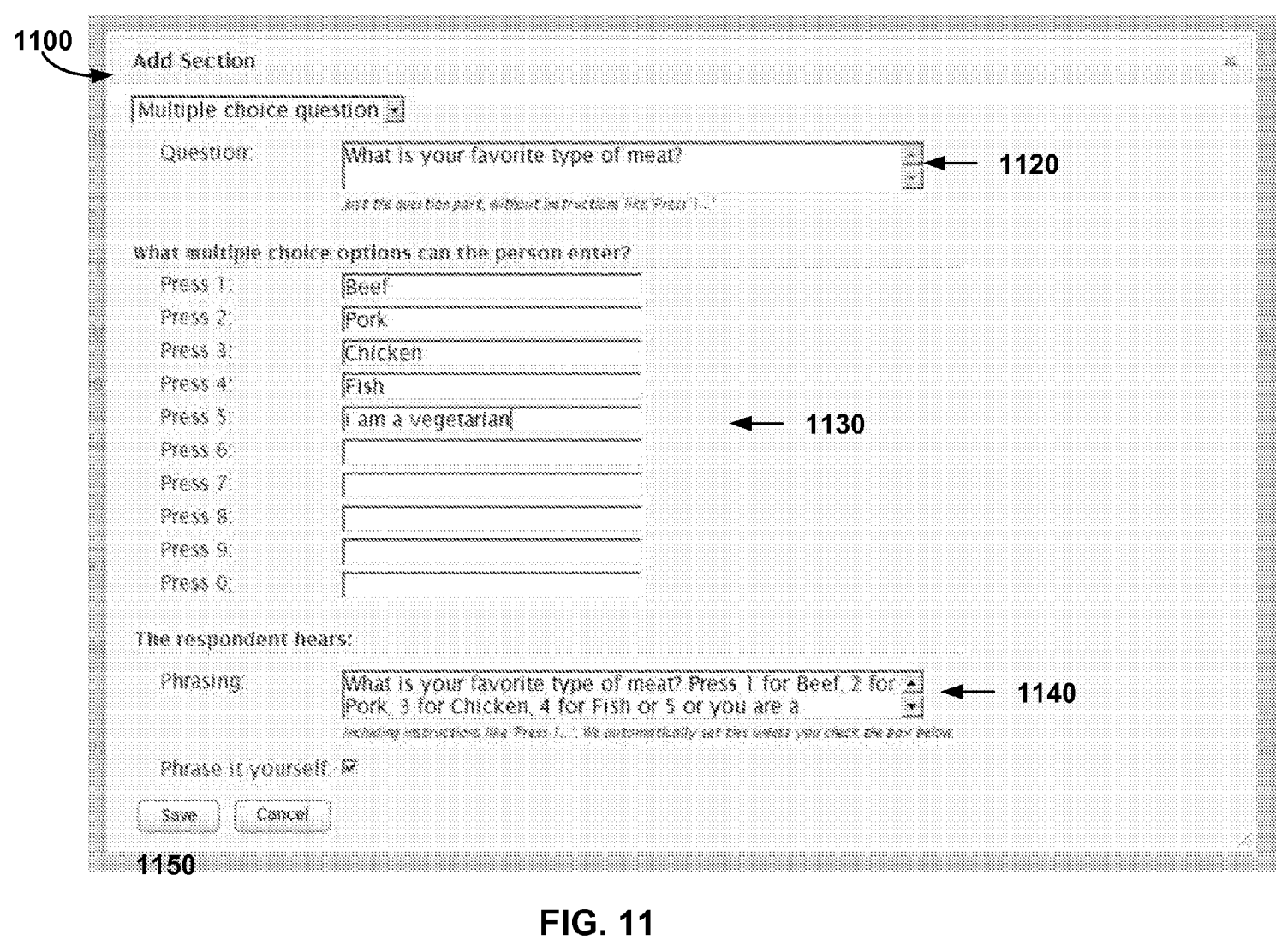

In one embodiment, step 630 of the exemplary poll corresponds to a multiple choice question section in an automated survey system. The user begins entry of a multiple-choice question by selecting "Multiple choice question" from the dropdown menu 920 in FIG. 9. In one embodiment, a multiple-choice entry page 1100 is then displayed as shown in FIG. 11. In one embodiment, the multiple choice entry page includes a free-form text entry box 1120 for the body of the question, and up to 10 multiple choice options 1130 corresponding to the 10 number buttons of a conventional phone. In one embodiment, the page additionally includes a free-form question phrasing text entry box 1140. This phrasing is the phrasing survey targets hear on call-in or dial-out surveys. If no phrasing is provided, the question text and multiple choice options are used to generate a default for format such as "[question body] Press 1 for [answer 1] Press 2 for [answer 2]" and so forth. After entering question details in the entry box, the user can then click the "Save" control 1150 to save the section. In the illustrated embodiment, the multiple-choice section as shown is added as section 2 of the exemplary poll.

Figure 12:
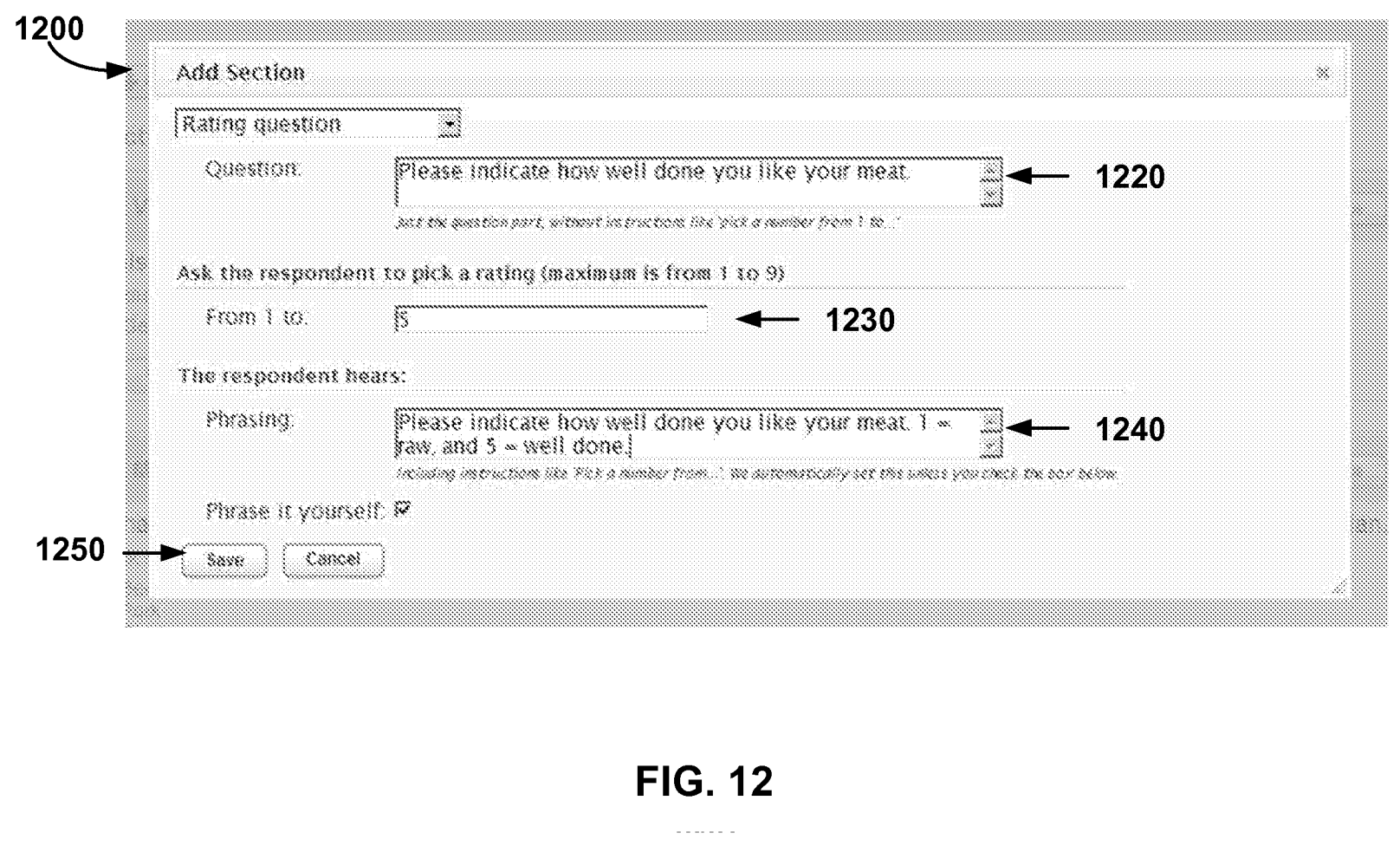

In one embodiment, step 640 of the exemplary poll corresponds to a rating question section in an automated survey system. The user begins entry of a rating question by selecting "Rating question" from the dropdown menu 920 in FIG. 9. In one embodiment, a rating question entry page 1200 is then displayed as shown in FIG. 12. In one embodiment, the rating question entry page includes a free form text entry box 1220 for the body of the question and a maximum rating value entry box 1230 that allows the user to set the highest numerical rating allowed in the question, which can range from 1 to 9 corresponding to the 9 non-zero number buttons of a conventional phone. In one embodiment, the page additionally includes a free form question phrasing text entry box 1240. This phrasing is the phrasing survey targets hear on call-in or dial-out surveys. If no phrasing is provided, the question text is used to generate a default for format such as "[question body] Pick a number from 1 to [max rating]". The user can then click the "Save" control 1250 to save the section. In the illustrated embodiment, the rating question section as shown is added as section 3 of the exemplary poll.

Figure 13:
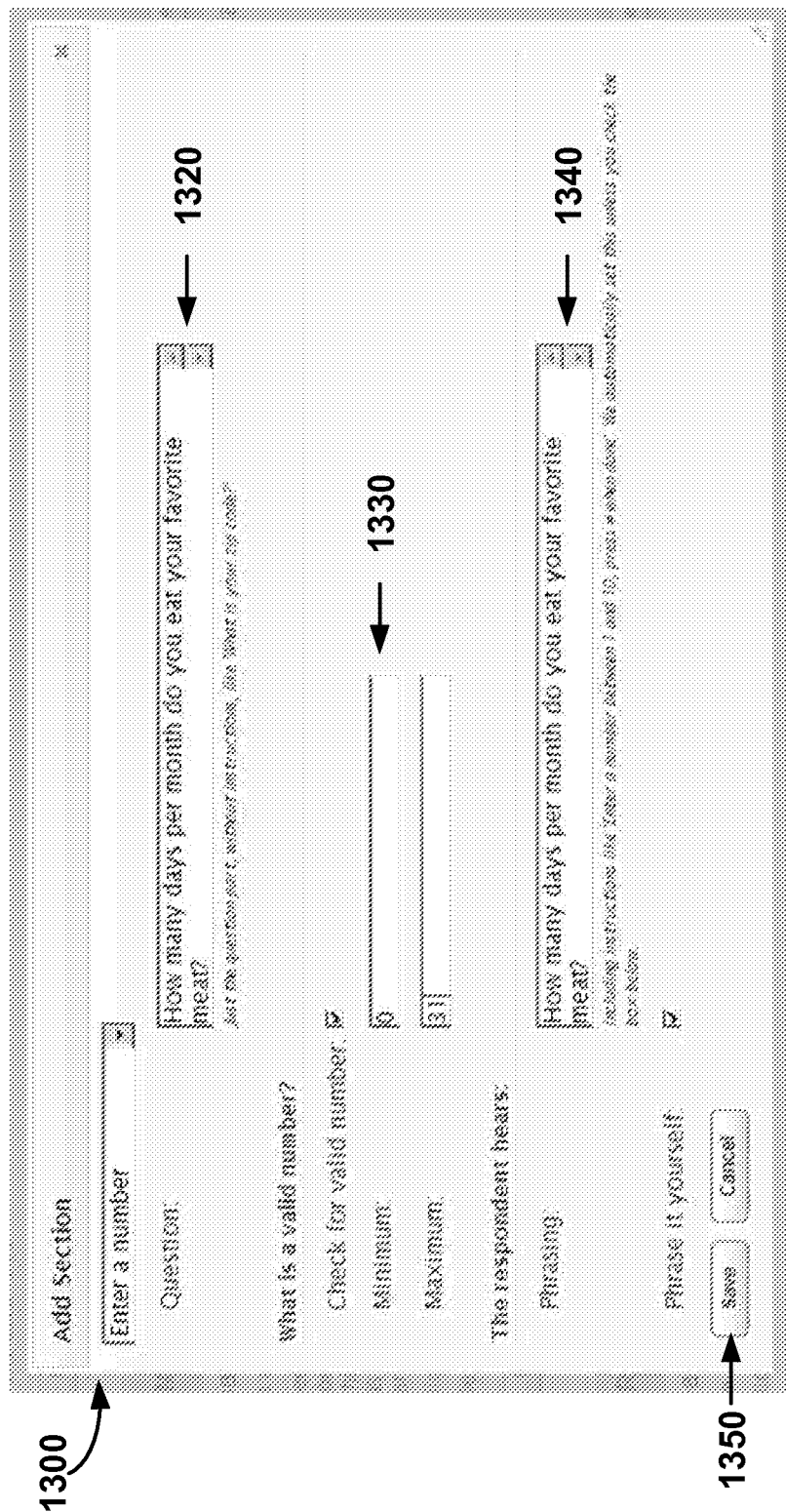
FIG. 13. illustrates one embodiment of an "Enter a number" question entry page.

In one embodiment, step 650 of the exemplary poll corresponds to a "enter a number" question section in an automated self-service survey system. The user begins entry of an "enter a number" by selecting "Enter a number" from the dropdown menu 920 in FIG. 9. In one embodiment, an "Enter a Number" entry page 1300 is then displayed as shown in FIG. 13. In one embodiment, the "Enter a Number" question entry page includes a free form text entry box 1320 for the body of the question and optional range validation specification entry boxes 1330 that allow the user to set a minimum and a maximum value for the number. In one embodiment, the page additionally includes a free form question phrasing text entry box 1340. This phrasing is the phrasing survey targets hear on call-in or dial-out surveys. If no phrasing is provided, the question text is used to generate a default for format such as "[question body] Enter a number from [minimum] to [maximum] and press # when done". The user can then click the "Save" 1350 control to save the section. In the illustrated embodiment, the "Enter a Number" section as shown is added as section 4 of the exemplary poll.

Figure 14:
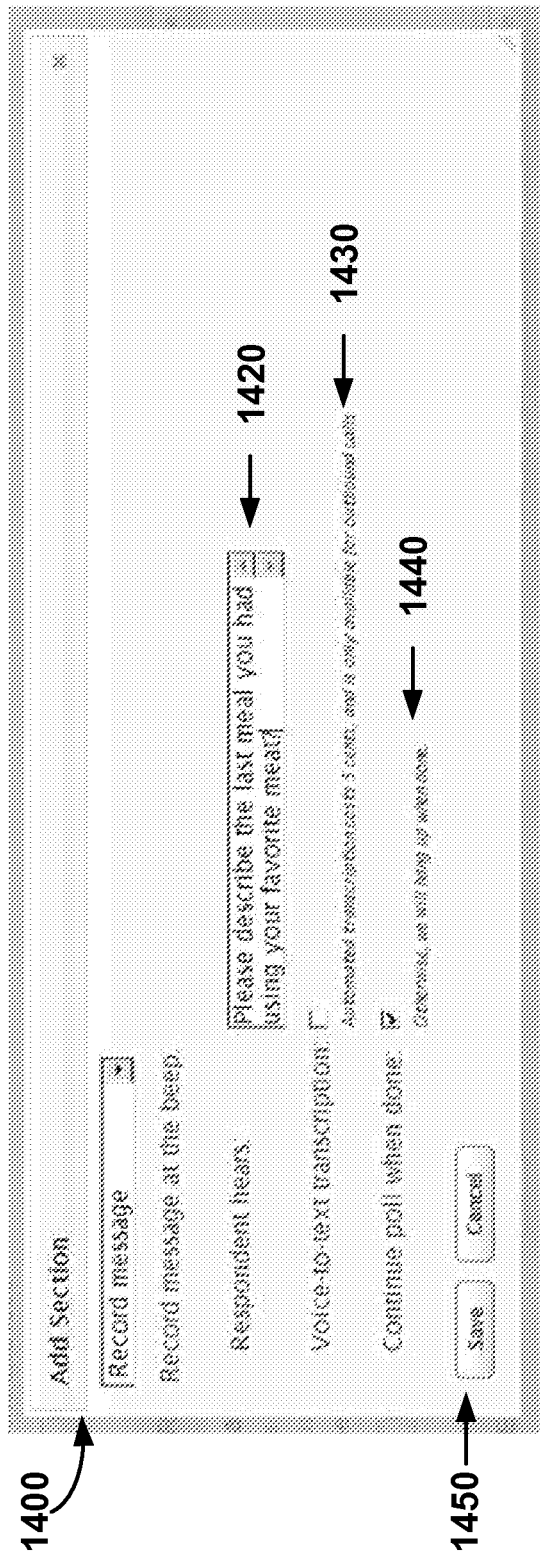
FIG. 14. illustrates one embodiment of a record message section entry page.

In one embodiment, step 660 of the exemplary poll corresponds to a record message section. The user begins entry of a record message section by selecting "Record message" from the dropdown menu in FIG. 8. In one embodiment, a record message section entry page 1400 is then displayed as shown in FIG. 14. In one embodiment, the record message section entry page includes a free form text entry box for the body of the question 1420. In one embodiment, voice messages recorded in the course of a survey can be provided to the user as digital audio files (e.g. mp3 sound files). In one embodiment, the page additionally includes an option for automated, machine-based transcription of voice messages 1430. In one embodiment, the page additionally includes an option 1440 to continue or terminate the survey after a voice message is recorded by the target. The user can then click the "Save" control 1450 to save the section. In the illustrated embodiment, the record message section as shown is added as section 5 of the exemplary poll.

Figure 15:
FIG. 15. illustrates one embodiment of a "Patch-through" section entry page.

In one embodiment, step 670 of the exemplary poll corresponds to a "patch-though" section for transferring a target to a phone number. The user begins entry of a record message section by selecting "Patch-through" from the dropdown menu 920 in FIG. 9. In one embodiment, a "patch-through" section entry page 1500 is then displayed as shown in FIG. 15. In one embodiment, the "record message" entry page includes a free form text entry box 1520 for a message that is played to survey targets before transferring calls and a telephone number 1530 to transfer calls to. In one embodiment, the page additionally includes an option 1550 to continue or terminate the survey after calls to the patch-through number are complete. In one embodiment, the user must certify 1540 that the user is permitted to route calls to the patch-through number. The user can then click the "Save" 1560 control to save the section. In the illustrated embodiment, the "patch-through" section as shown is added as section 6 of the exemplary poll.

Figure 16:
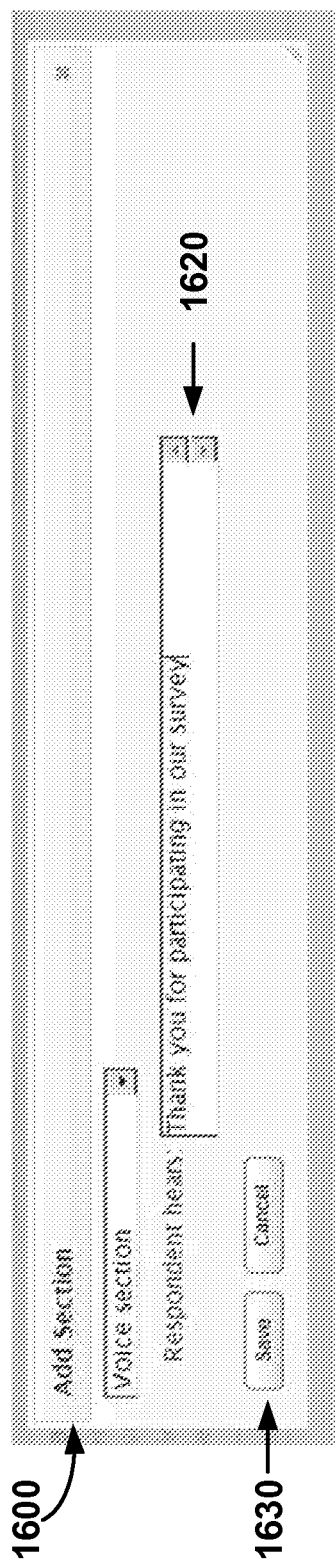
FIG. 16. illustrates one embodiment of a voice section entry page.

In one embodiment, step 680 of the exemplary poll corresponds to a voice section for a concluding message in an automated survey system. The user begins entry of a voice section by selecting "Voice section" from the dropdown menu 920 in FIG. 9. A voice section entry page 1600 is then displayed as shown in FIG. 16. In one embodiment, the voice section page provides a free-form text entry box 1620 for the concluding message. The user can then click the "Save" control 1630 to save the section. In the illustrated embodiment, the concluding voice section as shown is added as section 7 of the exemplary poll. In the illustrated embodiment, after this section completes, in the case of call-in and dial-out surveys, the survey system hangs up the call.

It should be understood that the types of questions described above are illustrative, and not limiting. In various other embodiments, question types other than those illustrated above could be supported by the system. For example, in one embodiment, the system could support a multi-option answer type question that allows a target to select more than one answer to a question (e.g. "check all types of meat you consume at least once per month (a.) beef, (b.) pork, (c) chicken, (d) fish").

Figure 17:
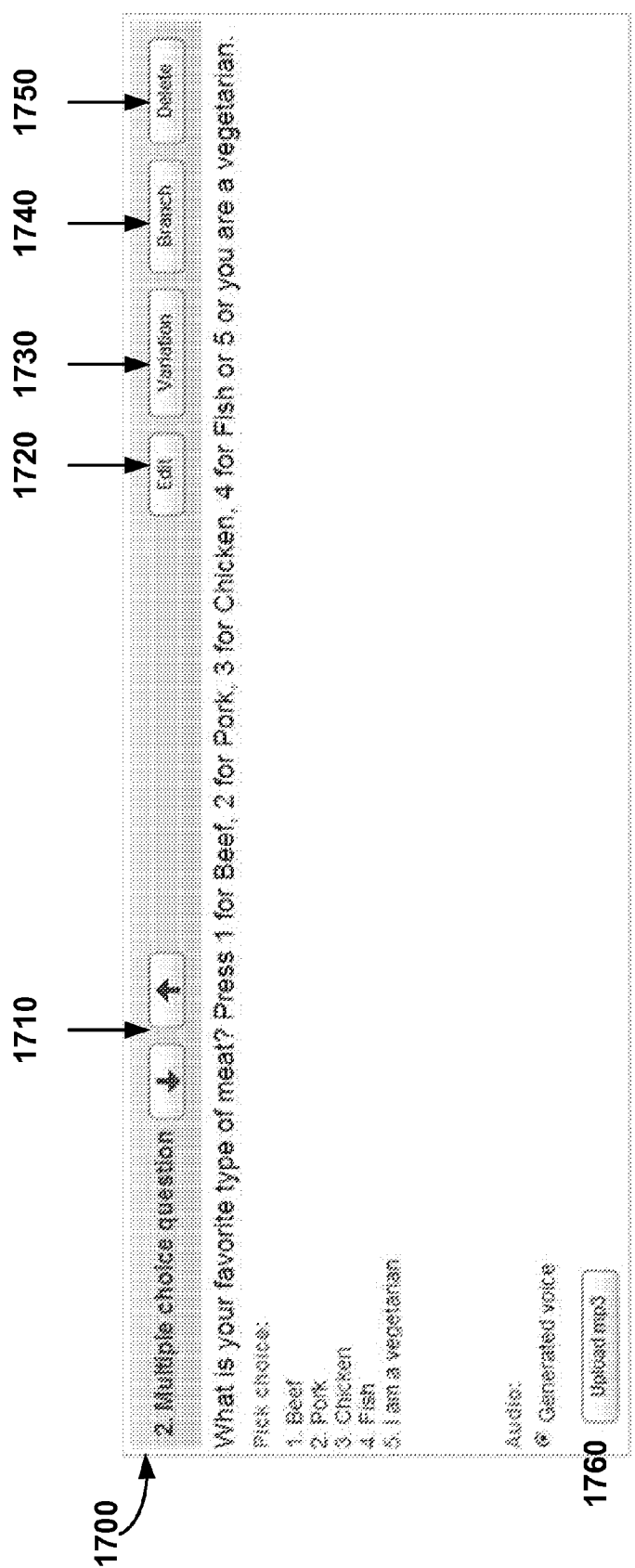
FIG. 17. illustrates one embodiment of a display for a poll section.

Thus, the exemplary poll as defined at this point consists of 7 sections. The default operation of the poll is to proceed sequentially though the sections in order. The poll design, however, requires branching logic based on answers to the poll questions. In one embodiment, poll sections are individually displayed on the dashboard in sequence. FIG. 17 illustrates a display 1700 of the multiple-choice question corresponding to the multiple-choice question of step 630 of the exemplary poll (section 2). The interface provides a "Branch" control 1740 that allows the user to launch a branch logic entry page. Every other section of the survey displays a comparable control.

Figure 18:
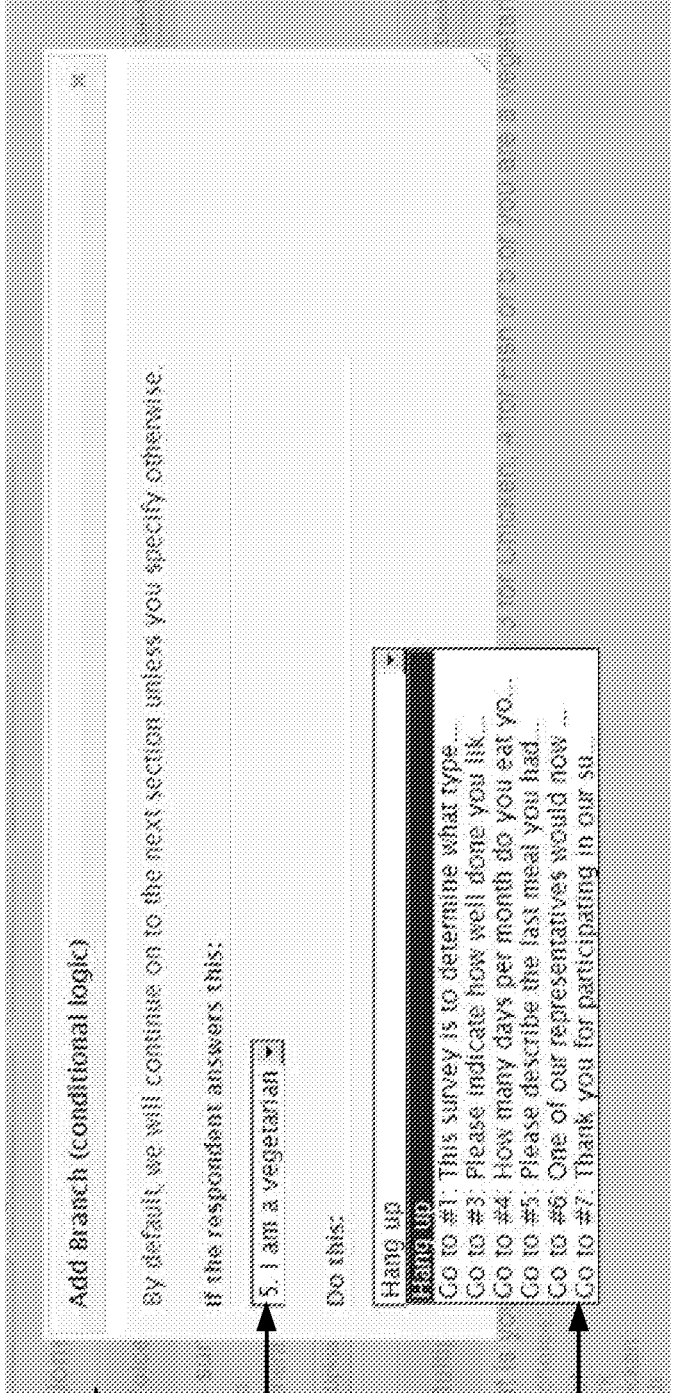
FIG. 18. illustrates one embodiment of an add branch logic page.

In one embodiment, when the user launches a branch logic entry page for the multiple-choice section of the exemplary poll (section 2 of the poll, corresponding to step 630 of FIG. 6), a branch entry logic page 1800 is displayed as shown in FIG. 18. In order to create a branch to the survey termination message (section 7) when the user selects option 5 (vegetarian), the user selects multiple choice option '5' from a multiple choice option drop down list 1820 and "Go to #7" from a branch-to drop down list 1840.

Figure 19:
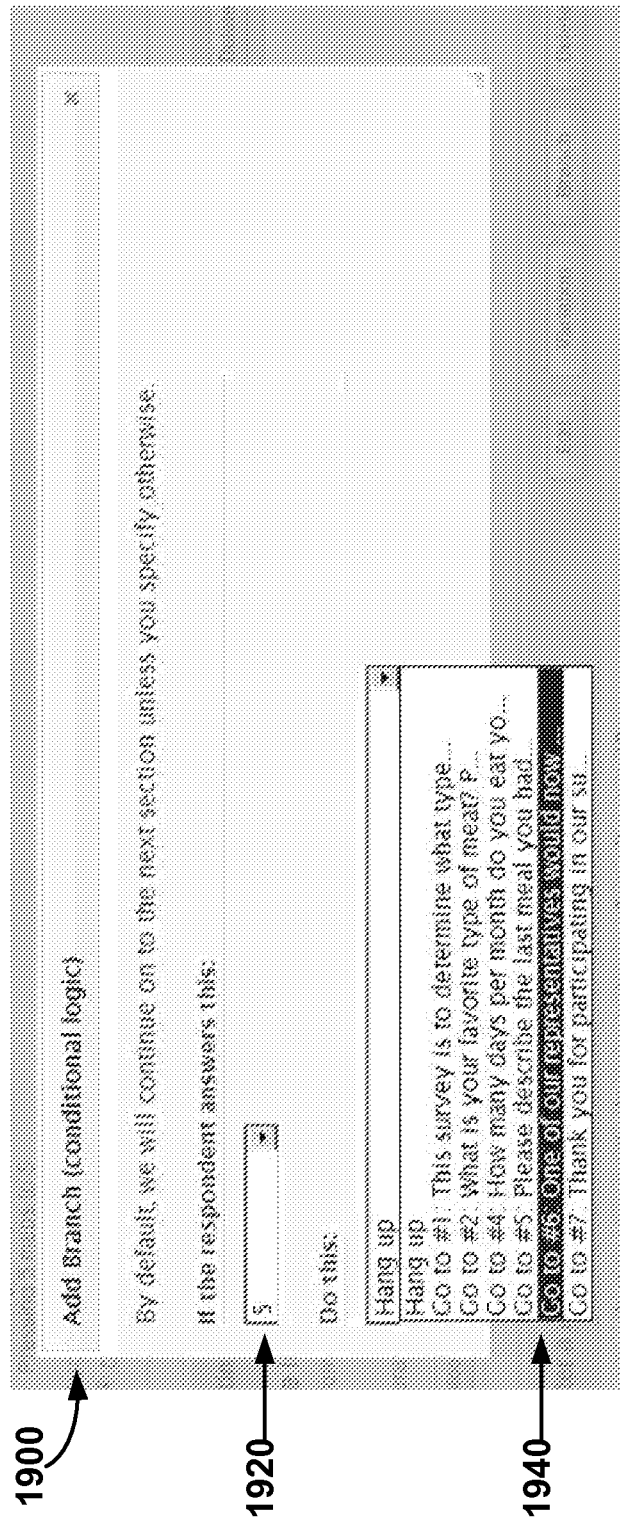
FIG. 19. illustrates one embodiment of an add branch logic page.

In one embodiment, when the user launches a branch logic entry page for the rating question section of the exemplary poll (section 3 of the poll, corresponding to step 640 of FIG. 6), a branch entry logic page 1900 is displayed as shown in FIG. 19. In order to create a branch to the "patch through" section of the exemplary poll (section 6) when the user enters a rating of 5 (well done), the user selects rating '5' from rating drop down list 1920 and "Go to #6" from a branch-to drop down list 1940.

Figure 20:
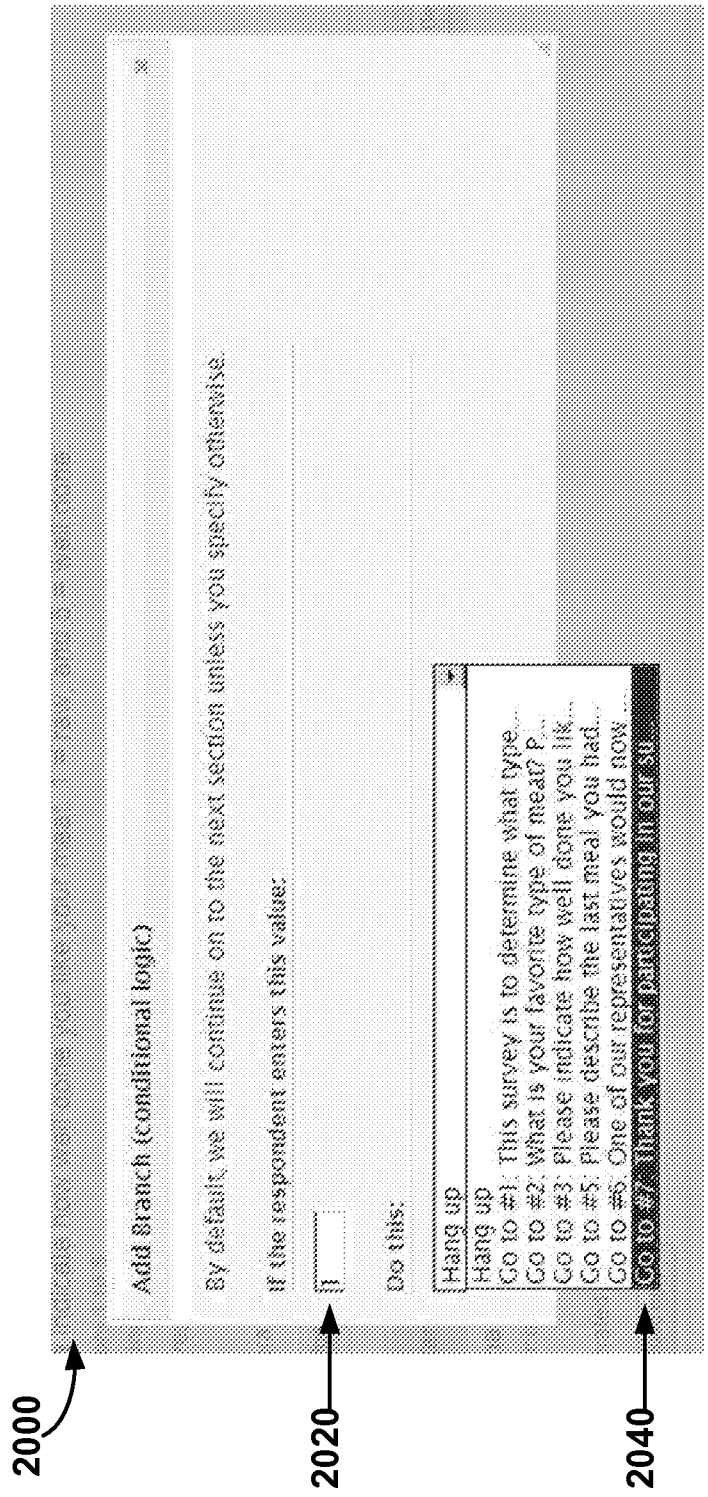
FIG. 20. illustrates one embodiment of an add branch logic page.

In one embodiment, when the user launches a branch logic entry page for the "Enter a number" question section of the exemplary poll (section 4 of the poll, corresponding to step 650 of FIG. 6), a branch entry logic page 2000 is displayed as shown in FIG. 20. In order to create a branch to the survey termination message (section 7) when the user selects enters 1, the user enters '1' in the number entry box 2020 and "Go to #7" from a branch-to drop down list 2040.

Figure 21:
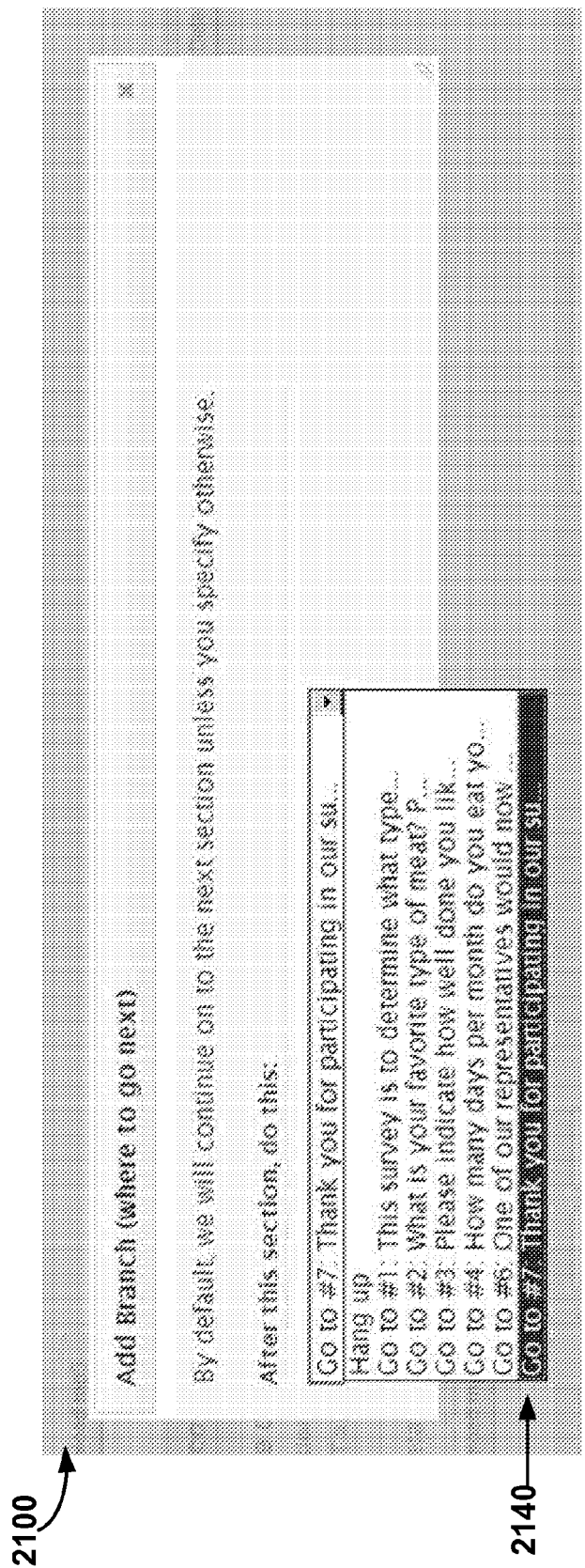
FIG. 21. illustrates one embodiment of an add branch logic page.

In one embodiment, when the user launches a branch logic entry page for the record message section of the exemplary poll (section 5 of the poll, corresponding to step 660 of FIG. 6), a branch entry logic page 2100 is displayed as shown in FIG. 21. In order to create an unconditional branch to the survey termination message the user selects "Go to #7" from a branch-to drop down list 2140.

In one embodiment, in addition to branching to any poll section, branching logic can specify that one or more responses to a poll section cause the poll to be terminated immediately. In the case of dial-out and call-in polls, the system hangs up the call to the target when the poll is terminated.

Figure 22:
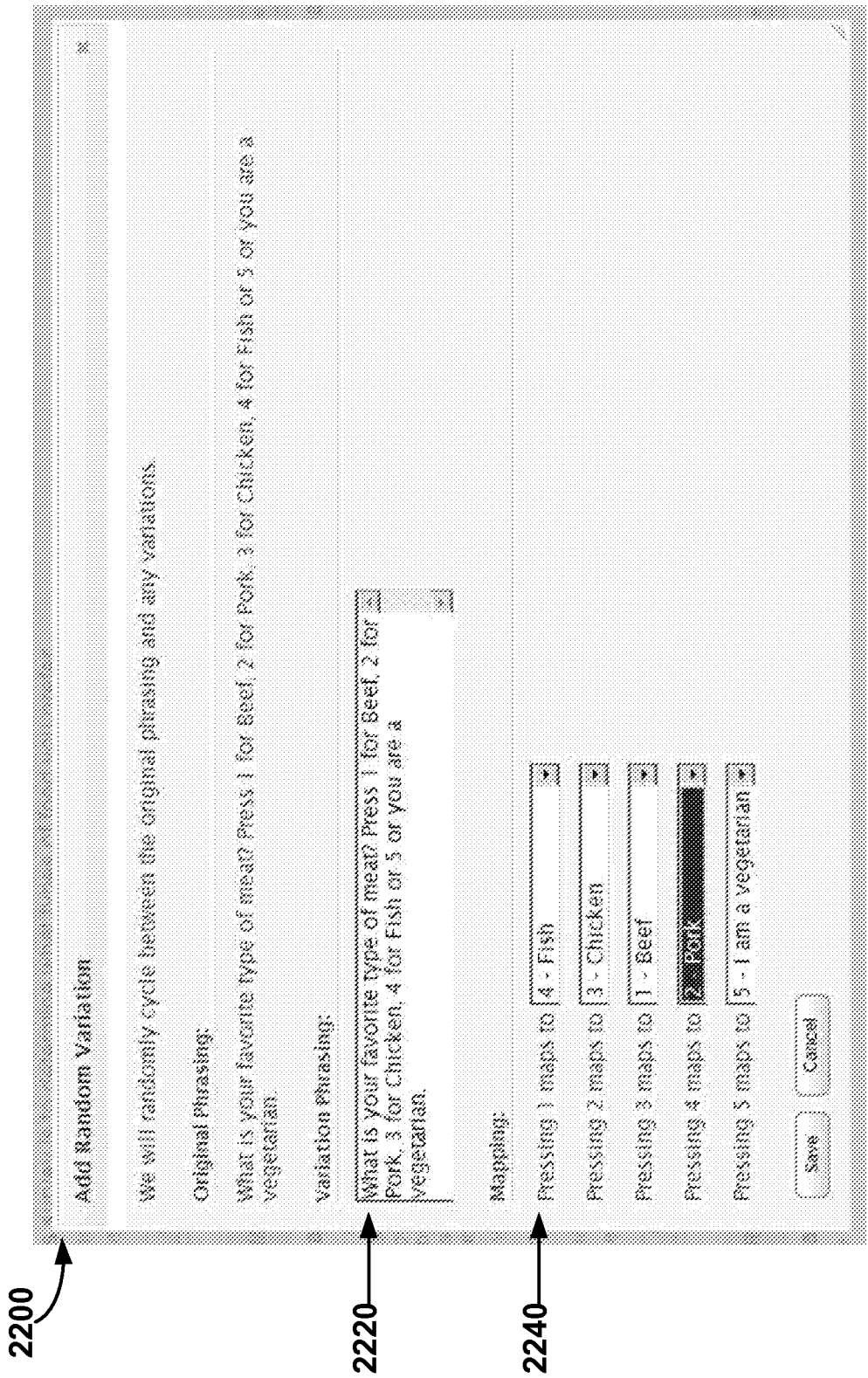
FIG. 22. illustrates one embodiment of a question variation entry page.

Referring back to FIG. 17, poll sections additionally provide a control to launch pages to create alternate versions of poll sections. In the illustrated interface in FIG. 17, when the user clicks the "Variation" control 1730, a page for creating a variation on the question as shown in FIG. 22 is launched. The page 2200 provides a text entry box 2220 to allow the user to enter an alternate phrasing for the question body, and 5 drop down selection lists 2240 that allows the user to reassign multiple-choice options to alternate numbers. In one embodiment, in the case of the remaining types of poll sections, including voice sections, rating question sections, "enter a number" sections, record message sections, and "patch-through" sections, the system allows the creation of question variations which include to alternate phrasing of the question. In one embodiment, a section can be defined with any number of variations.

In one embodiment, when the poll is run, when a section with variations is reached, the system randomly selects one of the variations. In general, use of alternate question variations is good survey practice to minimize the effect of question ordering and phrasing bias.

In one embodiment, the system can play a variation of a question based on the answer to a prior question. For example, different variations of the same question could be created in different languages (e.g. English, Spanish, French, German) and played or presented to the user. With this feature, a poll question at the beginning of a survey could be phrased as "Q1: What language do you prefer? Press 1 for English, Press 2 for Spanish", and then later used to select which variation to play for a subsequent section. In one embodiment, such a feature could also be used for changing phrasing based on prior answers, e.g. change the tone of language based on how old the target is, or change the gender recorded voice for questions if target is male or female to improve response rates.

In one embodiment, the interface as shown in FIG. 17 can additionally provide controls to edit 1720, move 1710 (e.g. up or down within the poll definition) and delete 1750 sections at any point, even if a poll has been run one or more times.

Recording of Audio Corresponding to Survey/Poll Content

In one embodiment, the recording of audio corresponding to survey/poll content corresponds explicitly to step 223 of FIG. 2A. In one embodiment, the recording of audio corresponding to poll content can also be regarded as part of the step of receiving a poll definition in step 231 of FIG. 2B and step 241 of FIG. 2C.

In one embodiment, surveys defined using the system disclosed herein can run voice surveys (e.g. telephonic dial-out and call-in type surveys). In one embodiment, as discussed above, when a survey/poll is first created, the survey/poll can be run as a voice poll using a machine generated male or female voice. A user may prefer, however, to record and play poll sections using an actual human voice.

Figure 23:
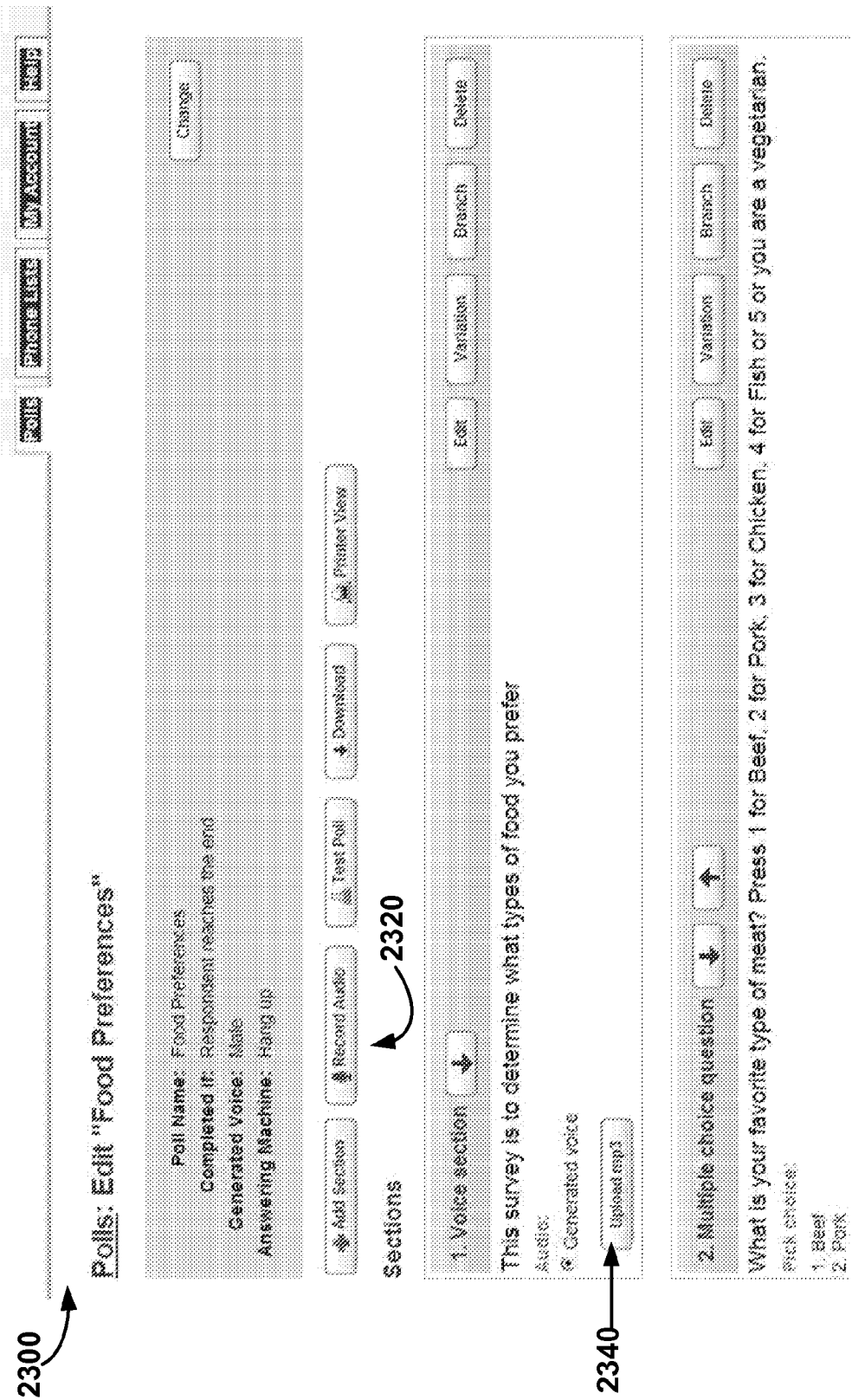
FIG. 23. illustrates one embodiment of a poll definition display page.
Figure 24:
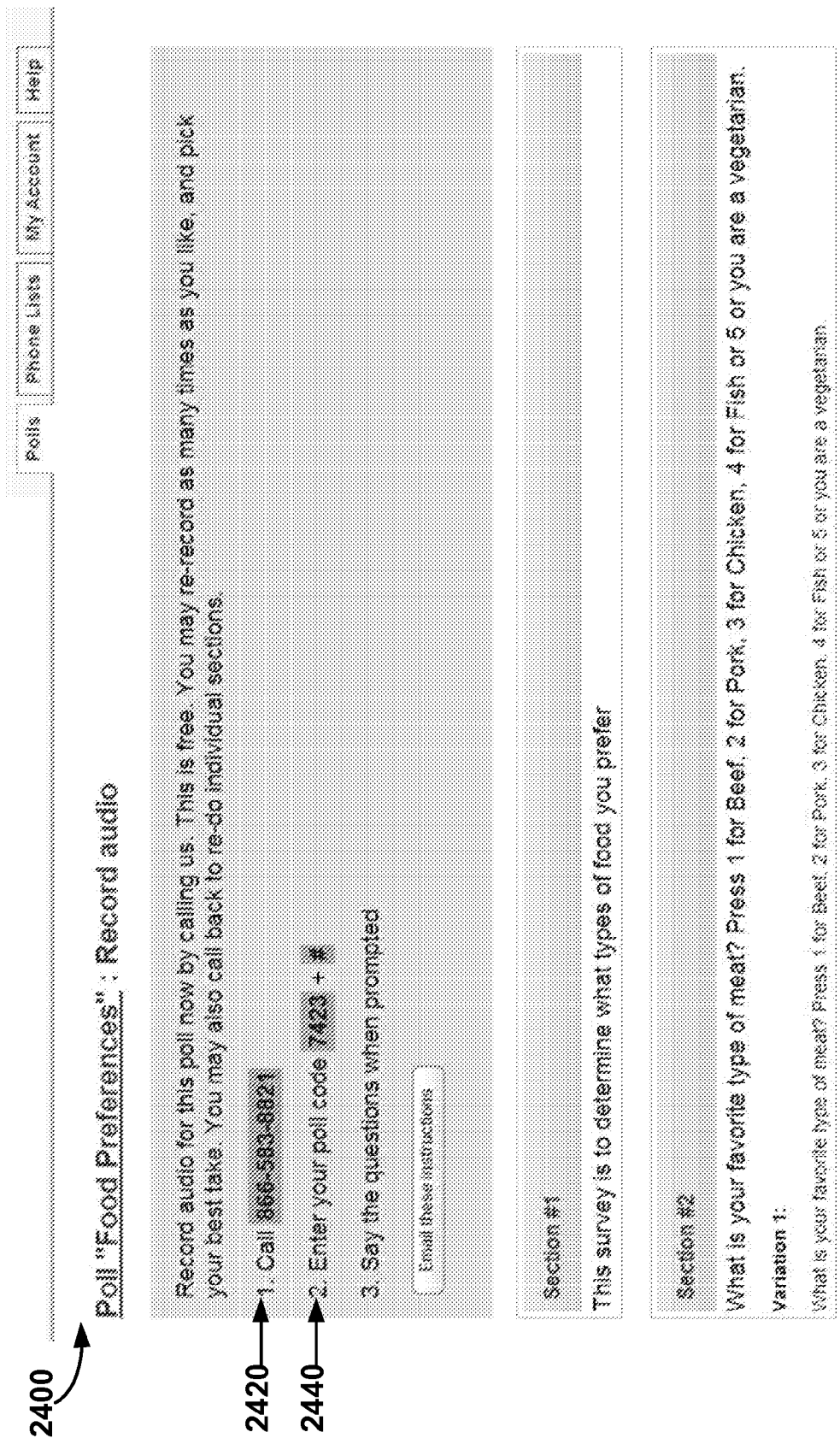
FIG. 24. illustrates one embodiment of a record audio page.

In one embodiment, the survey system can provide an automated means for a user to record section dialog telephonically. FIG. 23 displays one embodiment of a display 2300 of the heading and the first section of the exemplary poll on the user dashboard. The poll heading provides a control "Record Audio" 2320. In one embodiment, when the "Record Audio" control 2320 is clicked, the system launches a page 2400 for initiating telephonic recording of poll section dialog, as shown in FIG. 24.

In one embodiment, the system provides the user a unique poll code 2440 and a dial-in number 2420 where the user can dial in to an automated voice response system, and enter the code for the user's poll. In one embodiment, the automated voice response system provides a simple IVR response tree that prompts the user to record voice recordings for each of the poll sections. In one embodiment, voice recordings for segments are then stored as digital audio files, such as mp3 files which are stored on storage accessible to the survey system, for example, storage local to a survey services server. In one embodiment, the system can store digital audio files on distributed storage, such as cloud based storage, for example, Amazon S3.

Additionally, or alternatively, the survey system can allow users to upload prerecorded audio files for poll sections. For example, in FIG. 23, a user can click on an "Upload mp3 control 2340 provided on every poll section to upload a recorded voice segment for the segment. In one embodiment, the system allows the user to upload multiple recordings for the same segment and later select the segment to use.

Additionally, or alternatively, if the user's workstation has a microphone or similar device for audio recording, the survey system can allow users to record and upload audio files for poll sections in one operation. For example, in one embodiment, when the "Record Audio" control 2320 is clicked, the system could launch a recording dialog box that provides the user controls to start, stop and replay recordings for all poll sessions. Alternatively, each poll sections could provide a "Record Audio" control that launches a recording dialog box for that particular poll section. In one embodiment, the recording of voice segments is controlled at the user workstation via, for example, a browser based control such as, for example, a Flash, Java, or Silverlight control. In one embodiment, recordings of voice segments are automatically uploaded to the survey system when the user accepts the recordings.

Defining and Uploading Phone Lists

In one embodiment, the uploading of phone lists corresponds to step 224 of FIG. 2A and step 232 of FIG. 2B. Phone lists are used in running polls in step 225 of FIG. 2A, step 233 of FIG. 2B, step 243 of FIG. 2C, and steps 251-253 of FIG. 2D.

If a user wishes to run dial-out surveys, the user uses one or more phone lists to select survey targets and provide telephone numbers for such targets. A phone list is a set of phone list entries. In one embodiment, each phone list entry consists of a phone number, plus an arbitrary number of other columns representing additional information about survey targets. In one embodiment, a phone list can be initially set up as a load file in a standard format such as a CSV file.

A short example CSV phone list could be:

John, Smith, 555-555-1234, 35, M
Jane, Doe, 555-555-5678, 40, F
Robert, Jones, 555-555-9876, 45, M In the example phone list, the comma separated fields represent in order, a target first name, a target last name, a phone number for the target, the target's age, and the target's gender. In one embodiment, each entry in the list need only include a phone number. In one embodiment, each entry in the list can additionally include any other type of information that relates to the target phone number, such as, for example, identifying and demographic information for the target (e.g. age, gender, voting district, has pets, etc). In one embodiment, the fields included in each entry are free form, and need not be selected from a predefined list, although each entry in a given phone list will typically include the same fields in the same order and in the same format. In one embodiment, fields other than phone numbers are used for reporting and analysis functions, as will be shown below.

Figure 25:
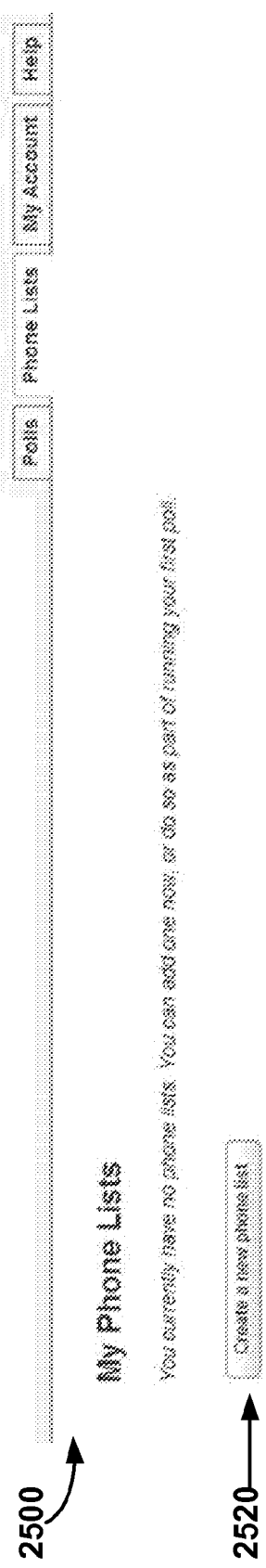
FIG. 25. illustrates one embodiment of a phone list creation page.

In one embodiment, the survey system dashboard provides a phone list tab 2500 as shown in FIG. 25, where a user can upload phone lists and view and delete phone lists. In one embodiment, the user can on the "Create a new phone list" control 2520 to upload a phone list, such as the list shown above, to the survey system. In one embodiment, after the phone list shown above is uploaded, it is stored on the system as follows:

| Phone Number | DATA1 | DATA2 | DATA3 | DATA4 |
|---|---|---|---|---|
| +1 555-555-9876 | Robert | Jones | 45 | M |
| +1 555-555-5678 | Jane | Doe | 40 | F |
| +1 555-555-1234 | John | Smith | 35 | M |

In one embodiment, the system automatically recognizes the phone number in the list and uses it as the primary key of the list. The remaining data fields are loaded in order, and labeled DATA1, DATA2, DATA3 and DATA4. In one embodiment, the data fields DATA1, DATA2, DATA3 and DATA4 can be labeled and referenced in data analysis functions, for example, in crosstab functions, as shown and discussed below.

In one embodiment, once uploaded, user phone lists are stored on storage accessible to survey system servers and can be used and reused in multiple surveys. In one embodiment, the phone list upload process is executed asynchronously from other survey system functions, so that if a user is uploading a very large phone list, the user will be able to continue working on other survey functions.

Running Surveys/Polls

The running of surveys/polls (which includes storing poll results) corresponds to step 255 of FIG. 2A, steps 233-236 of FIG. 2B, step 243 and 244 of FIG. 2C, step 253-256 FIG. 2D and steps 262-265 of FIG. 2E.

Figure 26:
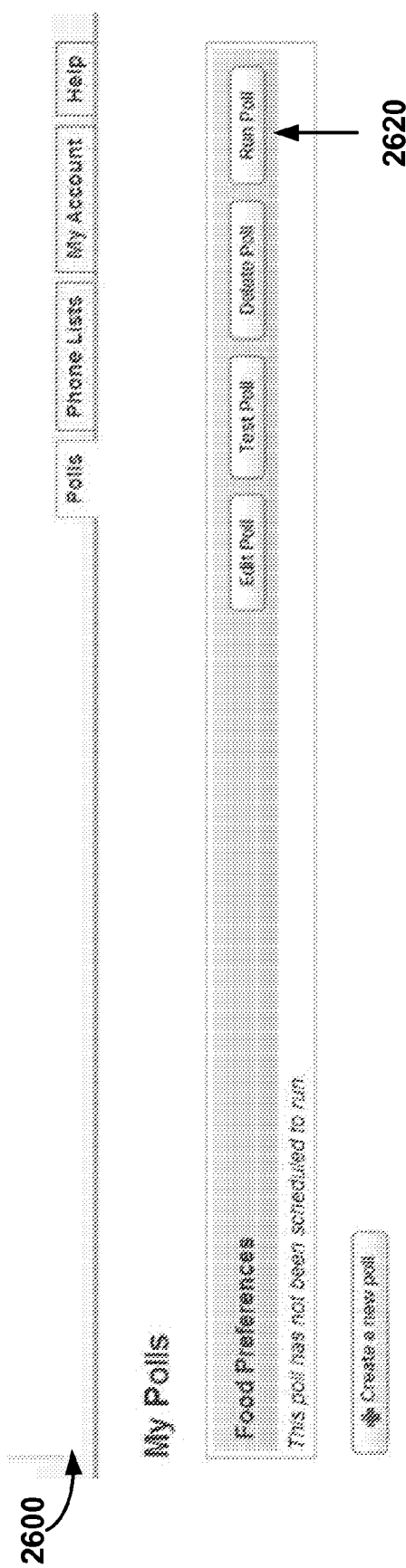
FIG. 26. illustrates one embodiment of a poll list display page.

In one embodiment, once a poll is defined, the user can run the poll. In one embodiment, as discussed above, a single poll definition can be run as a call-in, a dial-out or a web-based poll on-demand. In one embodiment, a user can run and control polls from the poll section of the survey system dashboard. FIG. 26 shows one embodiment of the survey system dashboard 2600 before any poll runs have begun.

Figure 27:
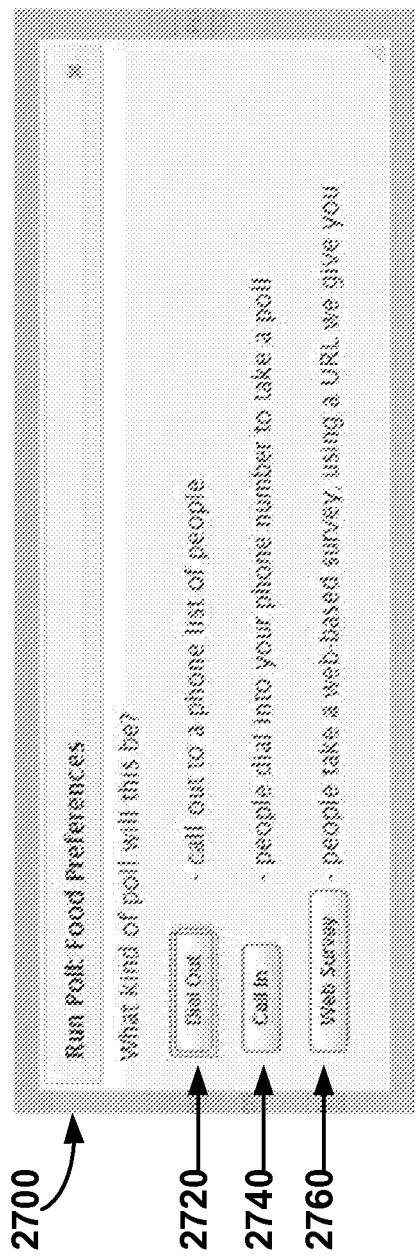
FIG. 27. illustrates one embodiment of a poll run launch page.
Figure 28:
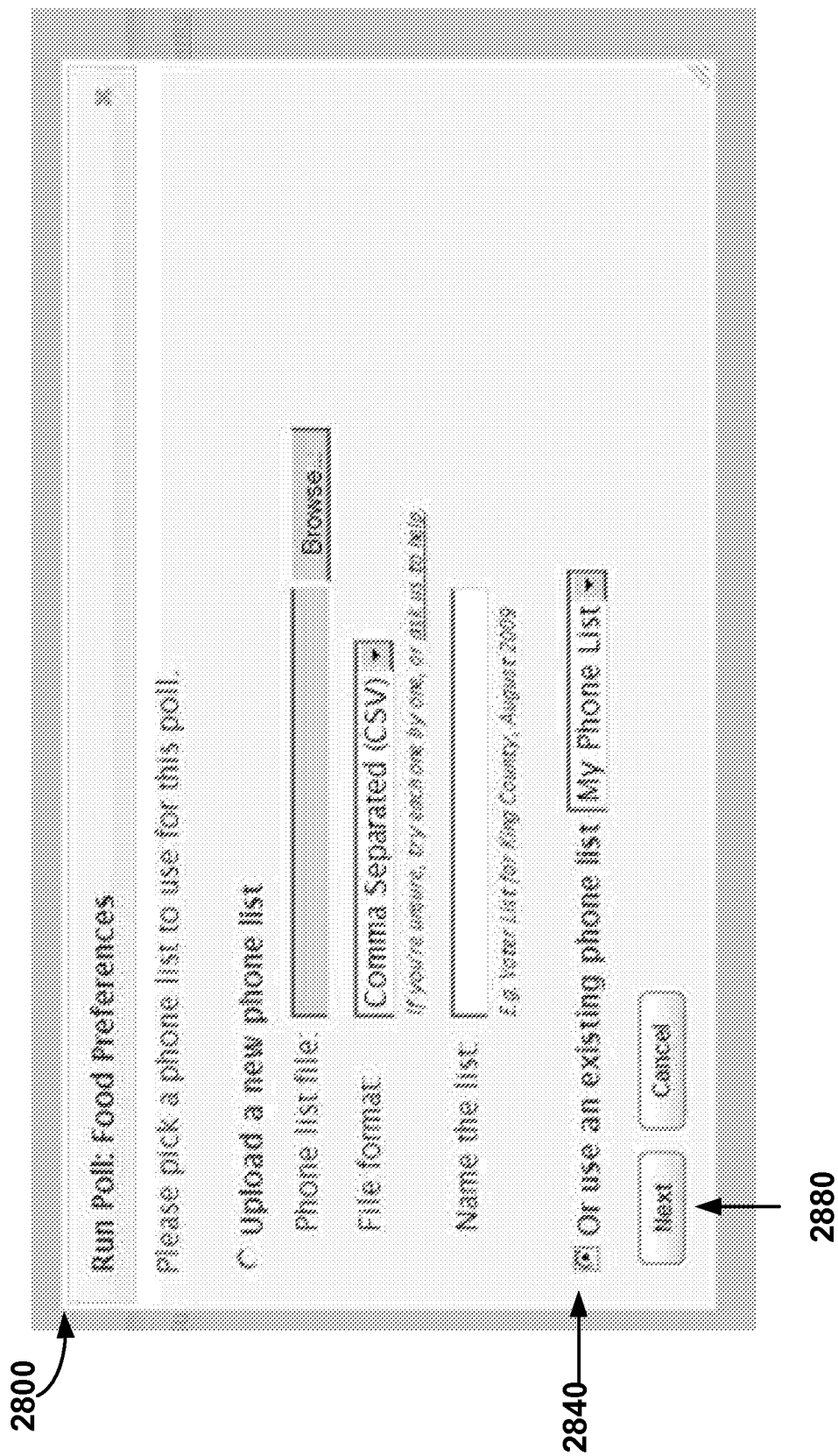
FIG. 28. illustrates one embodiment of a dial-out poll run launch page.

In one embodiment, a user can begin a dial-out poll run by clicking the "Run Poll" control 2620 and selecting "Dial-Out" 2720 for the poll run type from a poll-run type specification page 2700 as shown in FIG. 27. In one embodiment, the user is next presented with a page 2800 to select the phone list for the poll run as shown in FIG. 28. In the illustrated embodiment, the user can upload and name a phone list at the time of the poll run 2820, or can select a preexisting phone list 2840, such as "My Phone List" as shown. When the user clicks "Next" 2880, control proceeds to a poll preferences page.

Figure 29:
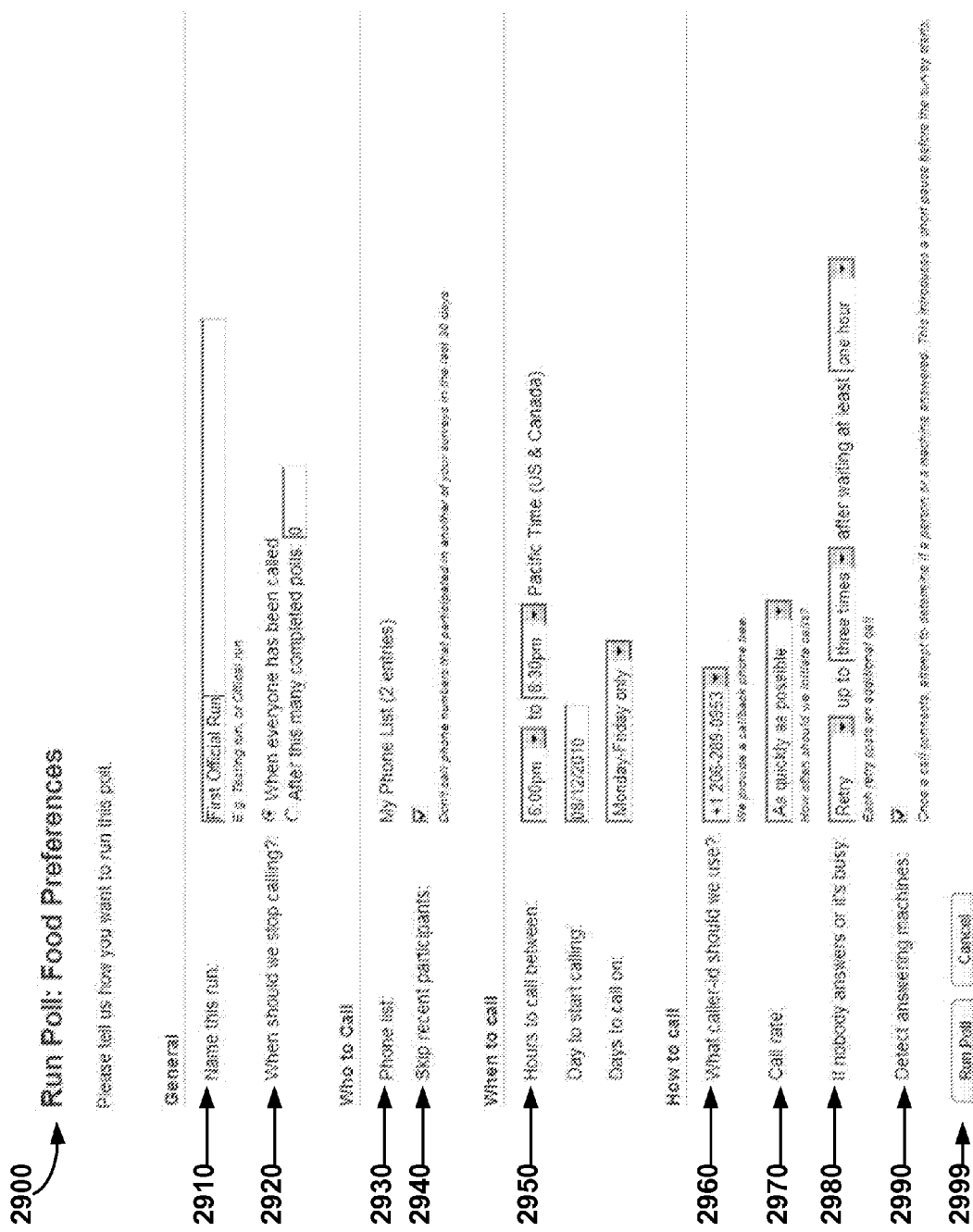
FIG. 29. illustrates one embodiment of a dial-out poll run preferences page.

FIG. 29 illustrates one embodiment of a poll preferences page 2900 for the dial-out poll run "First Official Run". Each poll run receives a freeform text poll name 2910. This name uniquely identifies the poll run within the dashboard environment, allowing a user to control the poll and view the poll run results. In one embodiment, the user can specify that the poll is to stop calling targets after everyone in the phone list associated with the poll run has been called or after a predetermined number of polls have completed using a radio button 2920 and number entry box. In one embodiment, the poll run can be configured to stop calling based on additional criteria relating to data supplied in the phone list, for example, target demographics. For example, a poll run could stop calling targets when complete polls have been received for 50 males over the age of 30, or when complete polls have been received 75 female Republicans, or when complete polls have been received from 25 students.

In one embodiment, the page displays the call list applicable to the run 2930, and provides a check box 2940 to specify that targets that have been called in the last 30 days in previous poll runs (if any) should not be called. This can be useful, for example, when a user reuses a large phone list (e.g. King County voters) and does not want to call people that have been recently surveyed. In one embodiment, the system selects phone numbers from the phone list in random order to minimize bias in poll runs. Commonly, users upload a phone list containing a large number of targets (e.g. King County voters) and set a lower number of completed polls, resulting in a random selection of a subset of the phone list for a given poll run. In such an embodiment, multiple runs of the same poll will select a different random set of phone numbers for each run.

In one embodiment, the page additionally provides for specifying dial-out dates and times 2950 for the poll run, including a starting date, hours to call, and whether calls should be made on business days or any day of the week. In one embodiment, the page additionally allows the user to select a caller ID 2960 for a call-back number displayed to poll targets when the targets are called by the survey system.

In one embodiment, the user can select a caller ID number provided by the system, user their own number, or alternatively, the user can request the automated survey service provider to provide a caller ID number from a particular area code. This can be useful as a practical matter, as it is commonly observed that polls get the highest response rate using a caller ID number from the same area code as survey targets. In one embodiment, when a specifies their own outbound caller ID, the system requires the user to enter a verification code provided by the survey service provider to the user via the outbound caller ID number entered by the user. This prevents the entry of erroneous or fraudulent caller IDs by users.

In one embodiment, the user can specify an outbound call rate 2970, which could be as fast as possible, or a fixed number per hour, for example, 500 calls per hour. In one embodiment, the survey system can dial-out to multiple phone numbers concurrently and can support high outbound call rates, for example, more than 5,000 calls per hour. In one embodiment, an outbound call rate could be specified indirectly by allowing the user to specify a targeted time for poll completion. For example, a parameter could be specified to the effect that that polling should be completed in two days or by a deadline date and time. The system could then select an appropriate call rate to achieve the user's deadline. In one embodiment, the call rate could then be determined at the beginning of a poll run. In one embodiment, the call rate could additionally be reevaluated periodically during a poll run, for example, every hour.

The user can additionally specify whether to retry a target phone number if the number is busy or there is no answer 2980. In one embodiment, the system can retry the target phone number a fixed number of times at a fixed time interval, for example, 3 times at hour intervals. In one embodiment, the user can specify if the system should attempt to detect an answering machine pickup 2990. In one embodiment, if an answering machine pickup is detected, the system can hang-up, or leave a message. for example, a call-back number. In one embodiment, the caller ID used by the survey system can represent a call-back number that allows the target to respond to the survey as a call-in survey. Thus, if a target does not pick up or the call drops, they can use caller ID to return the call and provide a call-in poll response. In one embodiment, where a call-back number is provided to respond to the poll, data gathered via the call-back number are merged with data gathered by the dial-out poll.

In one embodiment, the survey system can maintain, independently of individual users and polls, a "Do Not Call" list of phone numbers. In one embodiment, if a survey target calls back to a survey's caller ID, they can add their number to a "Do Not Call" list. In one embodiment, the users can also flag surveys they do not believe are legitimate, which marks the do-not-call-entry with a flag for later investigation by the survey system provider.

Figure 30:
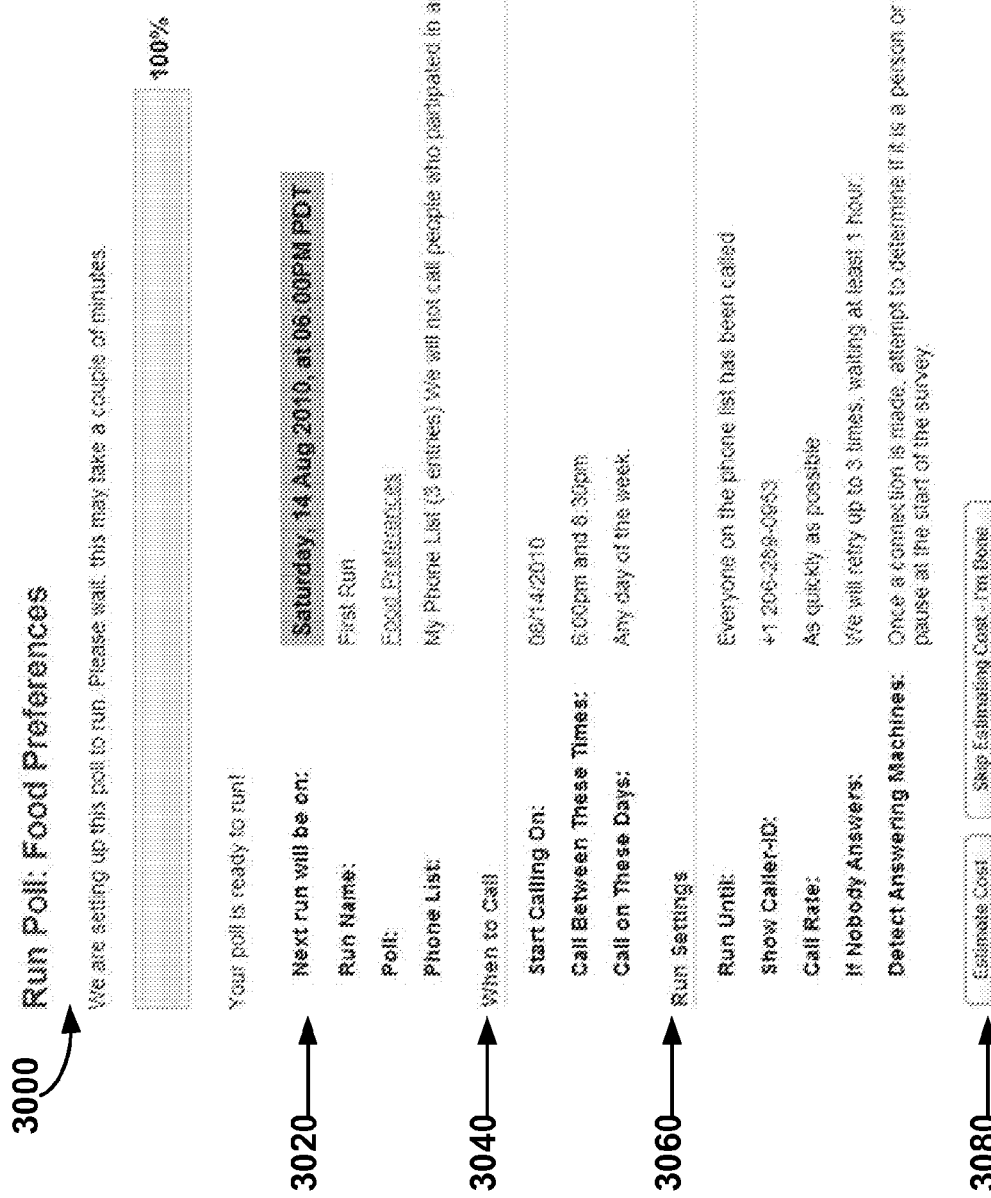
FIG. 30. illustrates one embodiment of a dial-out poll run information page.
Figure 31:
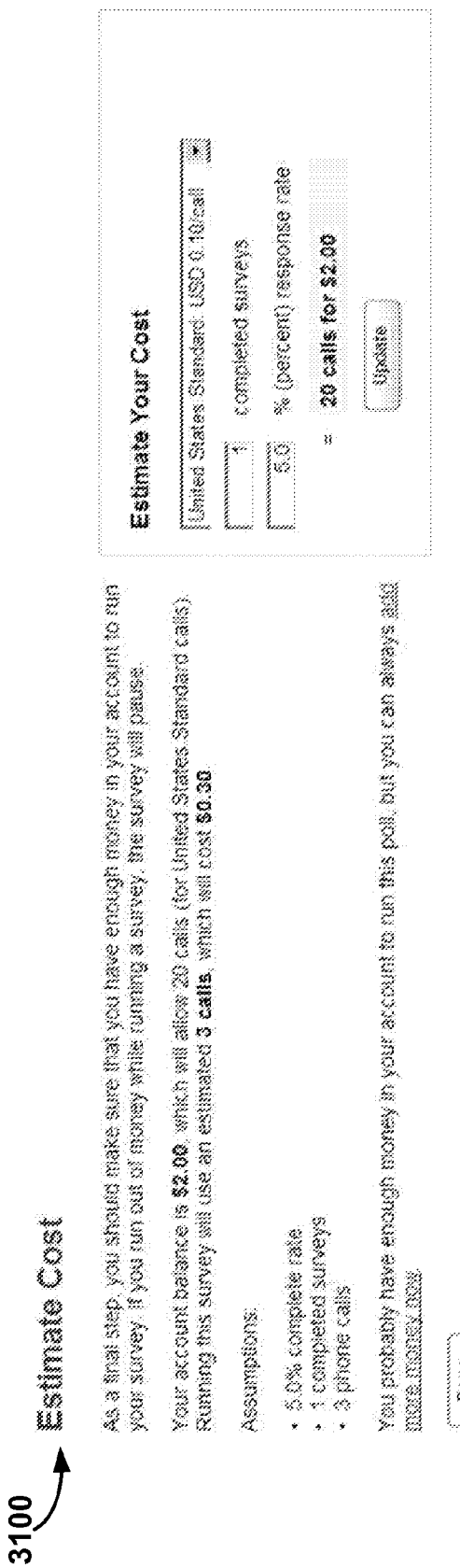
FIG. 31. illustrates one embodiment of a poll cost estimate page.

When the user has completed setting poll preferences according to the user's wishes, the use can click on the "Run Poll" control 2999. In one embodiment, poll execution begins immediately, and the dashboard displays a poll run information page 3000 such as displayed in FIG. 30 which includes poll run name information 3020, when the poll will call targets 3040 and poll run settings 3060. In one user can, in one embodiment, obtain an estimate 3100 of the poll cost by clicking "Estimate Cost" 3080, one embodiment of which is illustrated in FIG. 31.

The dial-out survey dials, all, or a portion of the targets in the phone list associated with the poll run. In one embodiment, each target experiences the poll as an as an IVR type dialog including the voice sections and questions of the exemplary poll following the flow of control as specified in the branching logic of individual sections.

Figure 32:
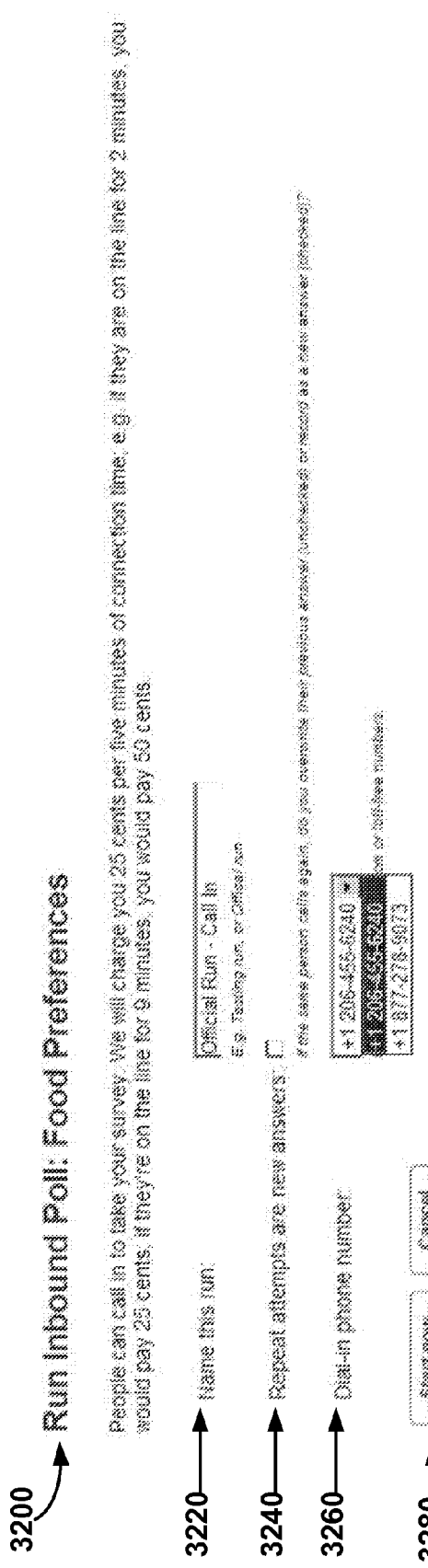
FIG. 32. illustrates one embodiment of a call-in poll run preferences page.

In one embodiment, a user can begin a call-in type poll run by selecting "Call-In" 2740 for the poll run type from the poll-run type selection page shown in FIG. 27. In one embodiment, the user is next presented with a call-in poll (also referred to as an inbound poll) preferences page as shown in FIG. 32. FIG. 32 illustrates one embodiment of a poll preferences page for a call-in poll run "First Official Run—Call In". Each poll run receives a freeform text poll name 3220. This name uniquely identifies the poll run within the dashboard environment, allowing a user to control the poll and view the poll run results. The user can additionally specify 3240 whether or not a given inbound phone number can submit multiple survey responses (e.g. to prevent "ballot-stuffing").

In one embodiment, the user can select the dial-in phone number from a drop down list 3260. In one embodiment, the dial-in number could be a phone number supplied by the automated survey service provider. In one embodiment, the dial-in number could be a number specified by the user. In one embodiment, the dial-in number could be a phone number with a specific area code or could be a toll free number. In one embodiment, the phone number could be a phone number for a dedicated phone line (i.e. only for purposes of conducting the poll).

Figure 33:
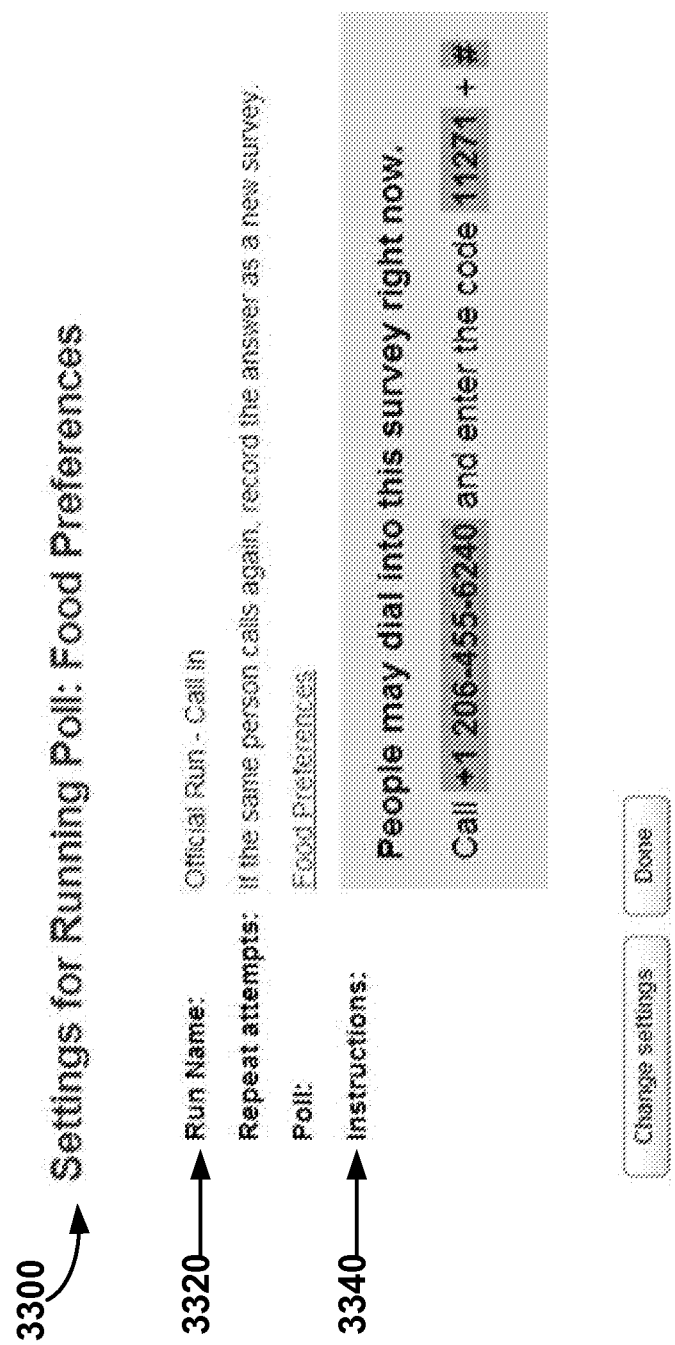
FIG. 33. illustrates one embodiment of a call-in poll run information page.

When the user has completed setting poll preferences according to the user's wishes, the use can click on the "Start Now" control 3280. In one embodiment, poll execution begins immediately, and the dashboard displays a poll run information screen 3300 such as displayed in FIG. 33 that shows the poll run name 3320 and a dial-in number and poll identification code 3340. At this point, targets can call the dial-in number and provide the poll identification code, at which point the poll proceeds as in the same manner a dial-out poll (e.g. as an IVR dialog). In one embodiment, if the phone number is for a dedicated phone line, a poll identification code not need not be used (i.e. a phone call to the number goes straight into the poll).

Figure 35:
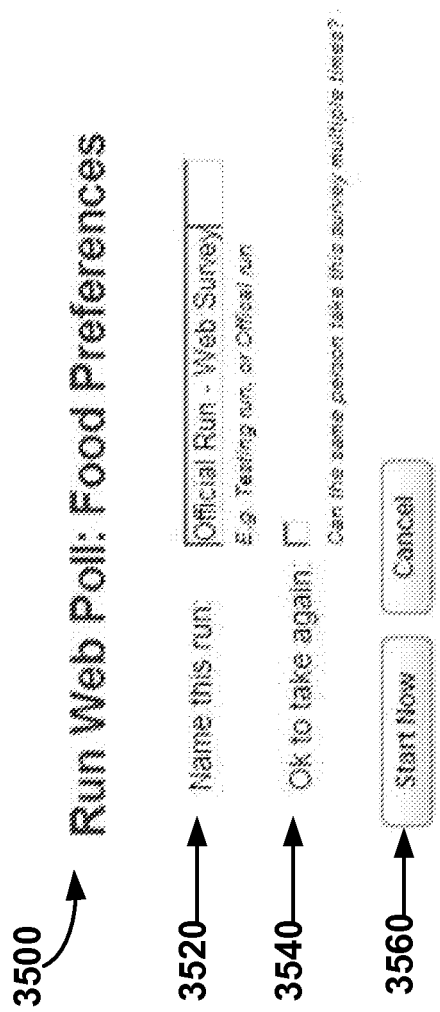
FIG. 35. illustrates one embodiment of a web survey poll run preferences page.

In one embodiment, a user can begin a web survey by selecting "Web Survey" 2760 for the poll run type from a poll-run type page as shown in FIG. 27. In one embodiment, the user is next presented with a web survey poll preferences page 3500 as shown in FIG. 35. FIG. 35 illustrates one embodiment of a poll preferences page for a web-survey type poll run "First Official Run—Web Survey". Each poll run receives a freeform text poll name 3520. This name uniquely identifies the poll run within the dashboard environment, allowing a user to control the poll and view the poll run results. The user can additionally specify whether or not a given target (e.g. a specific IP address) can submit multiple survey responses 3540.

Figure 36:
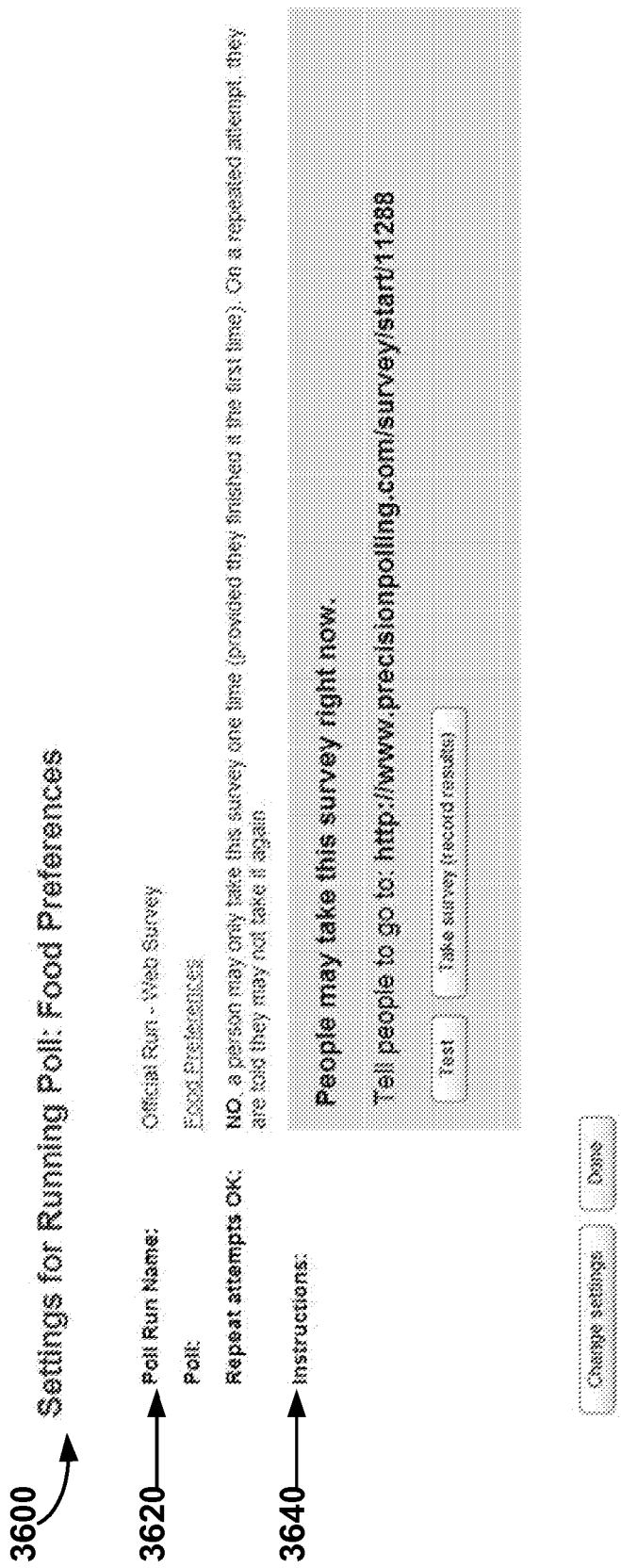
FIG. 36. illustrates one embodiment of a web survey poll run information page.

When the user has completed setting poll preferences according to the user's wishes, the use can click on the "Start Now" control 3560. In one embodiment, poll execution begins immediately, and the dashboard displays a poll run information screen 3600 such as displayed in FIG. 36 that displays the poll run name and settings 3620 and instructions 3640 that provides a URL for the survey that includes the poll identification code. At this point, targets can access the survey via the URL.

Figure 37:
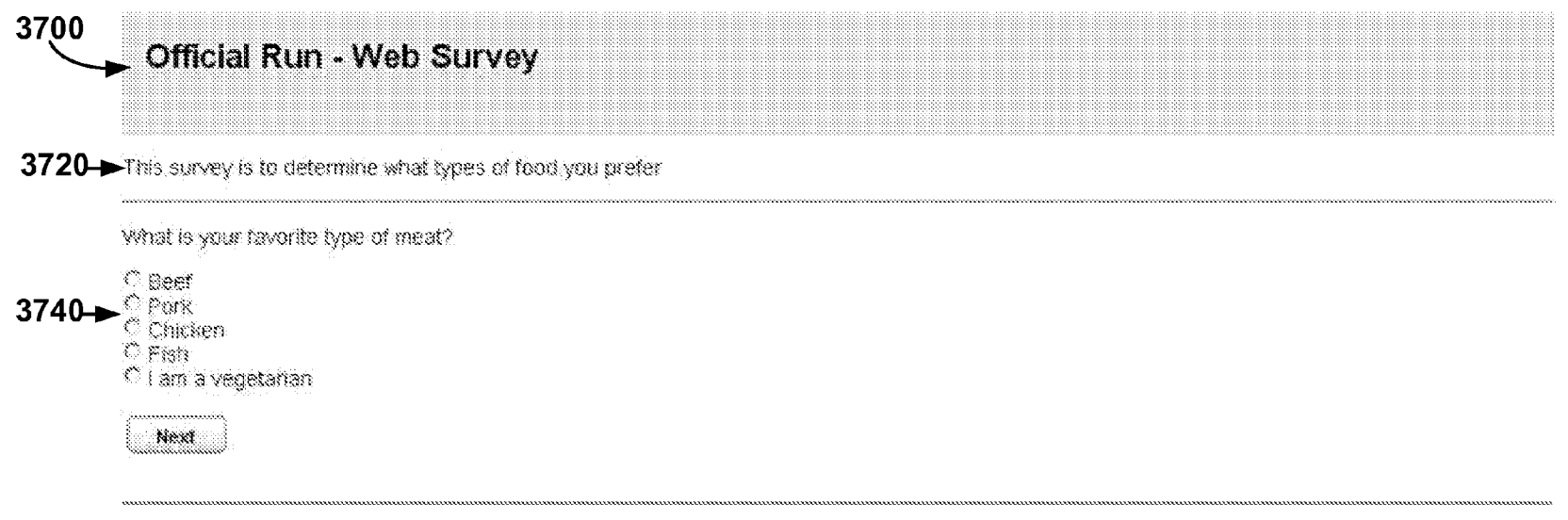
Figure 39:
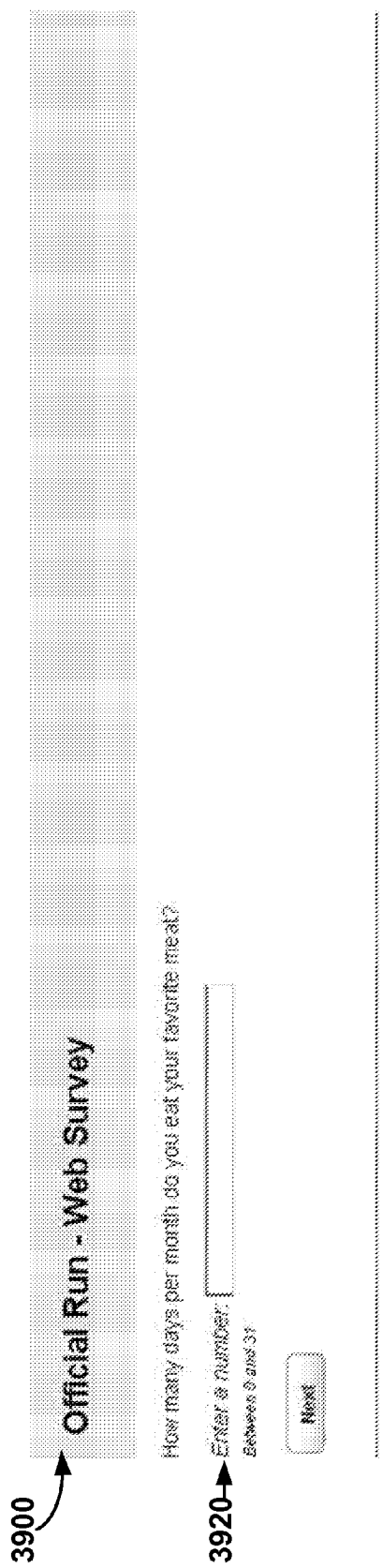
FIG. 39. illustrates one embodiment of an "Enter a number" question on a web survey.
Figure 40:
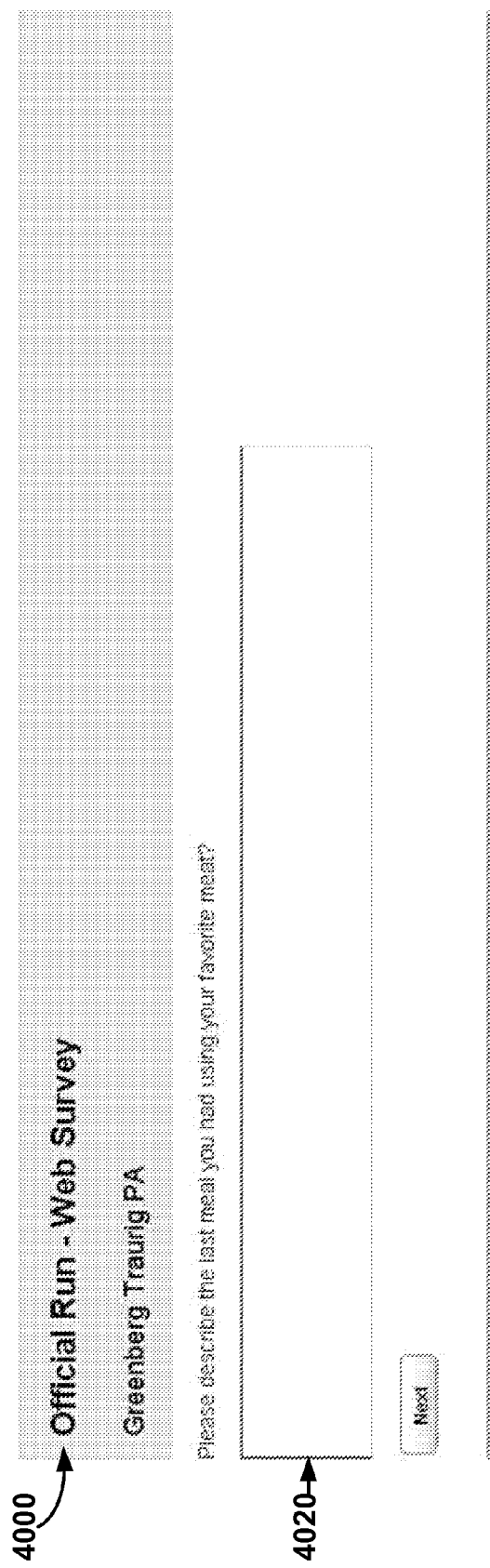
FIG. 40. illustrates one embodiment of a record message question on a web survey.
Figure 41:
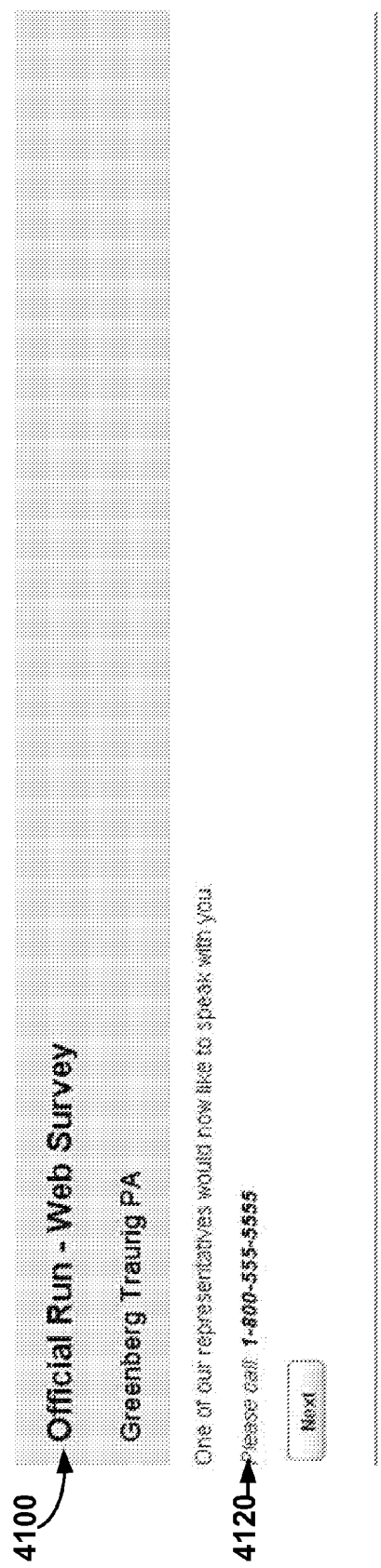
FIG. 41. illustrates one embodiment of a "Patch through" section on a web survey.
Figure 42:
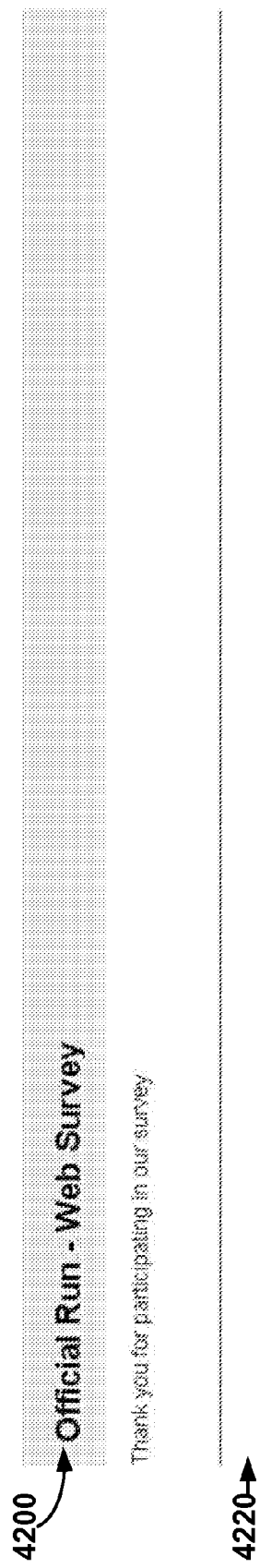
FIG. 42. illustrates one embodiment of a voice section on a web survey.

In one embodiment, the exemplary poll is presented as a series of web pages as illustrated in FIG. 37-42. In FIG. 37, the voice section of section 1 of the exemplary poll is presented as text 3720 and the multiple-choice question of section 2 of the exemplary poll is presented as a vertical set of radio buttons 3740 on a web page 3700. In FIG. 38, the rating question of section 3 of the exemplary poll is presented as a horizontal set of radio buttons 3820 on a web page 3800. In FIG. 39, the "enter a number" question of section 4 of the exemplary poll is presented as a number entry box 3920 on a web page 3900. In FIG. 40, the record message question of section 5 of the exemplary poll is presented as a free form text entry box 4020 on a web page 4000. In FIG. 41, the "patch-through" question of section 6 of the exemplary poll is presented as text 4120 on a on a web page 4100 requesting the user to call a specific phone number and speak to a representative. In FIG. 42, the voice section of section 7 of the exemplary poll is presented as a free form text 4220 on a web page 4200. The flow of control of the web survey is the same as it is for dial-out and call-in IVR surveys. In one embodiment, the pages of the web survey could additionally be branded with the name and logo of the entity conducting the survey. In one embodiment, web surveys are formatted to fit the user's device, so that, for example, a web survey could be completed via a PC, a PDA or a mobile phone.

In one embodiment, when a web poll or a call in poll is initiated, the system could send an SMS message to a list of target phone numbers to notify the target phone numbers that a poll has been initiated. In one embodiment, the notification message provides sufficient information for targets to respond to the survey, for example, a URL for a web poll, or a phone number for a dial-in poll. The notification message could additionally comprise information about the poll, such as who is conducting the poll, or the general subject matter to which it relates. In one embodiment, the list of target phone numbers could be a preexisting phone list stored on the system, or a subset of such a list (e.g. cell phone numbers). Alternatively, in one embodiment, a list of target phone numbers could be provided at the time the survey is run (e.g. via a popup window or webpage).

In one embodiment, when a web poll or a call in poll is initiated, the system could post a message to a list of target members of one or more websites to notify the such members that a poll has been initiated. For example, a notification message could be posted for one or more members of a social networking site, such as FACEBOOK or TWITTER websites. In one embodiment, a notification message could be posted to a page or BLOG maintained by, or on behalf of, the organization running the poll. In one embodiment, the notification message provides sufficient information for targets to respond to the survey, for example, a URL for a web poll, or a phone number for a dial-in poll. The notification message could additionally comprise information about the poll, such as who is conducting the poll, or the general subject matter to which it relates. In the list of target members could be a preexisting list stored by the system. Alternatively, in one embodiment, a list of target members could be provided at the time the survey is run (e.g. via a popup window or webpage).

In one embodiment, a poll can be run any number of times via any of the supported polling and survey modes. In one embodiment, a poll can be run multiple times with different phone lists. For example, a user could set up poll runs to dial out to different demographic groups to compare their responses. At the same time, the user could post a link to offer the survey from the user's website; and the user could print posters with a dial-in phone number and survey code.

In one embodiment, for any type of poll run, the user could explicitly authorize the survey service provider to play or display one or more advertisements at some point in the poll. Such advertisements could comprise a voice recording or a block of text directed to the poll target by the survey service provider. For example, a message could be played or displayed at the end of a poll that informs the target the poll was conducted using the services of the survey service provider. In one embodiment, the user could be compensated by the survey service provider for allowing advertisements to be part of the user's poll. Such compensation could take any form such as, for example, a discounted rate for poll runs or credits to the user's account.

In one embodiment, a user could authorize advertisements to be incorporated into the user's polls at a user account level, within poll definitions and/or within poll preferences at poll run time. Alternatively, in one embodiment, inclusion of advertisements in polls could be a condition of service, or exclusion of advertisements in polls could represent a premium service for which extra charges are incurred.

Figure 43:
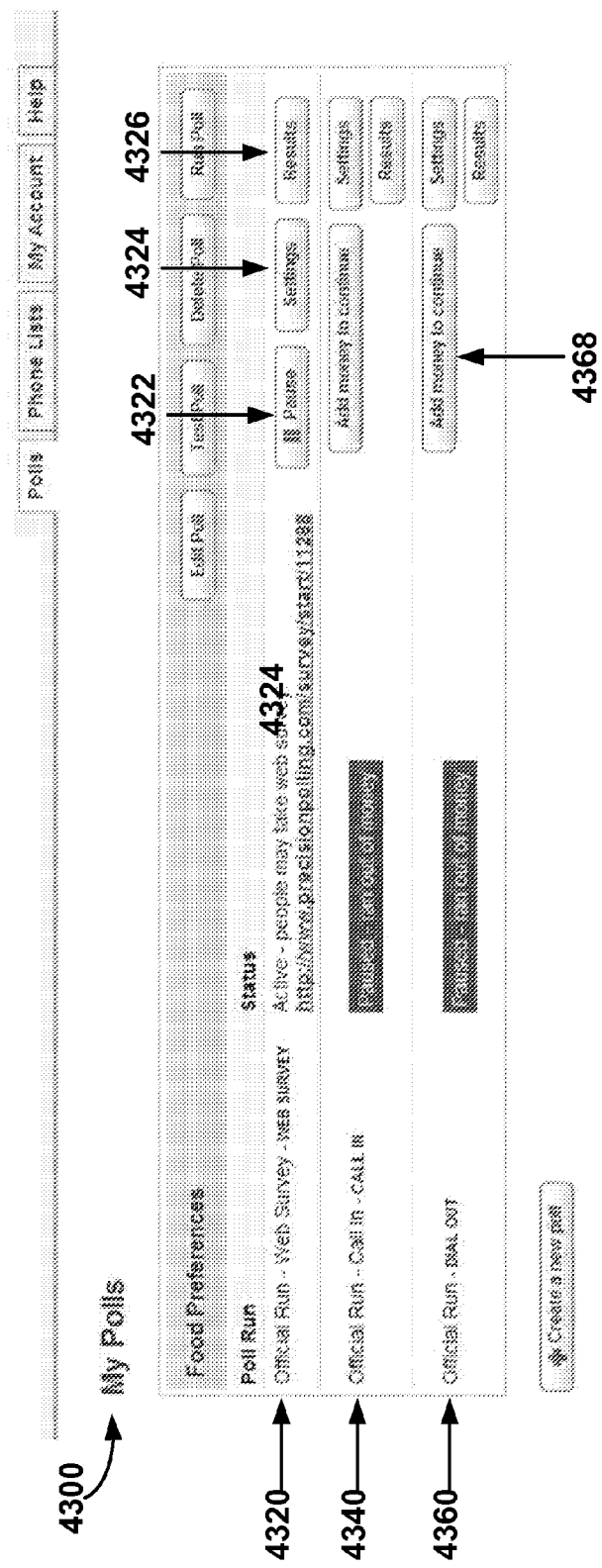
FIG. 43. illustrates one embodiment of a poll display on a survey system dashboard.

Once polls runs have been initiated, they can be monitored from the dashboard. FIG. 43 of the poll run shows the poll section displaying three runs of the same poll ("Food Preferences") in process: a web survey 4320, a call-in poll run 4340 and a dial-out poll run 4360. Via the dashboard, the user can pause 4322 a poll run in process, view the results 4326 of poll runs that are in-process or have completed, and change 4324 the setting of a poll run. Note that in the illustrated embodiment, the call-in and dial-out polls have been paused because the user's account has run out of money. The dashboard provides a control 4368 that the user can click to add more money to his or her account in order to resume the poll run. In one embodiment, when a poll run is paused, the poll run settings can be modified without effecting poll results that have already been collected, and poll audio recordings can be changed. In one embodiment, the poll definition itself cannot be changed while a poll run is in progress.

In the embodiments described above, poll runs are initiated and poll run options are set using a browser-based user interface. It should be understood, however, that in various embodiments, poll runs could be initiated and poll run options could be set using any method known in the art for communicating electronic information between systems and/or devices. For example, a poll run could be initiated and poll options could be set via an SMS message sent to the system by a user. In another example, an API could be provided to enable user systems to initiate poll runs and set poll run options using API calls.

While the discussion above has been limited to poll runs for dial-out, call-in and web type surveys, it is understood that polls can be conducted using any form of electronic communications that can support a dialog between two points. For example, any poll that could be conducted via a IVR process, could also be conducted via a text-message (SMS) based interface, which could, for example, send a sequence of messages to participants.

View and Analyze Survey Results

The viewing and analyzing of poll/survey results corresponds to step 226 of FIG. 2A, step 237 of FIG. 2B, step 245 of FIG. 2C, step 257 of FIG. 2D and step 266 of FIG. 2E.

In one embodiment, once a poll run has collected at least some data, the user can display poll results, both for the poll run as a whole, and for individual poll sections. In one embodiment, a user can launch a page to review survey results for a specific poll run by clicking on a "Results" control 4326 for the poll run on the poll section of the survey system dashboard shown in FIG. 43. In one embodiment, results pages include information that summarizes the overall progress for the poll run. The information can include the length of the poll run, number of polls completed, a margin of error and additionally includes various types of information specific to the mode of the poll run.

Figure 44:
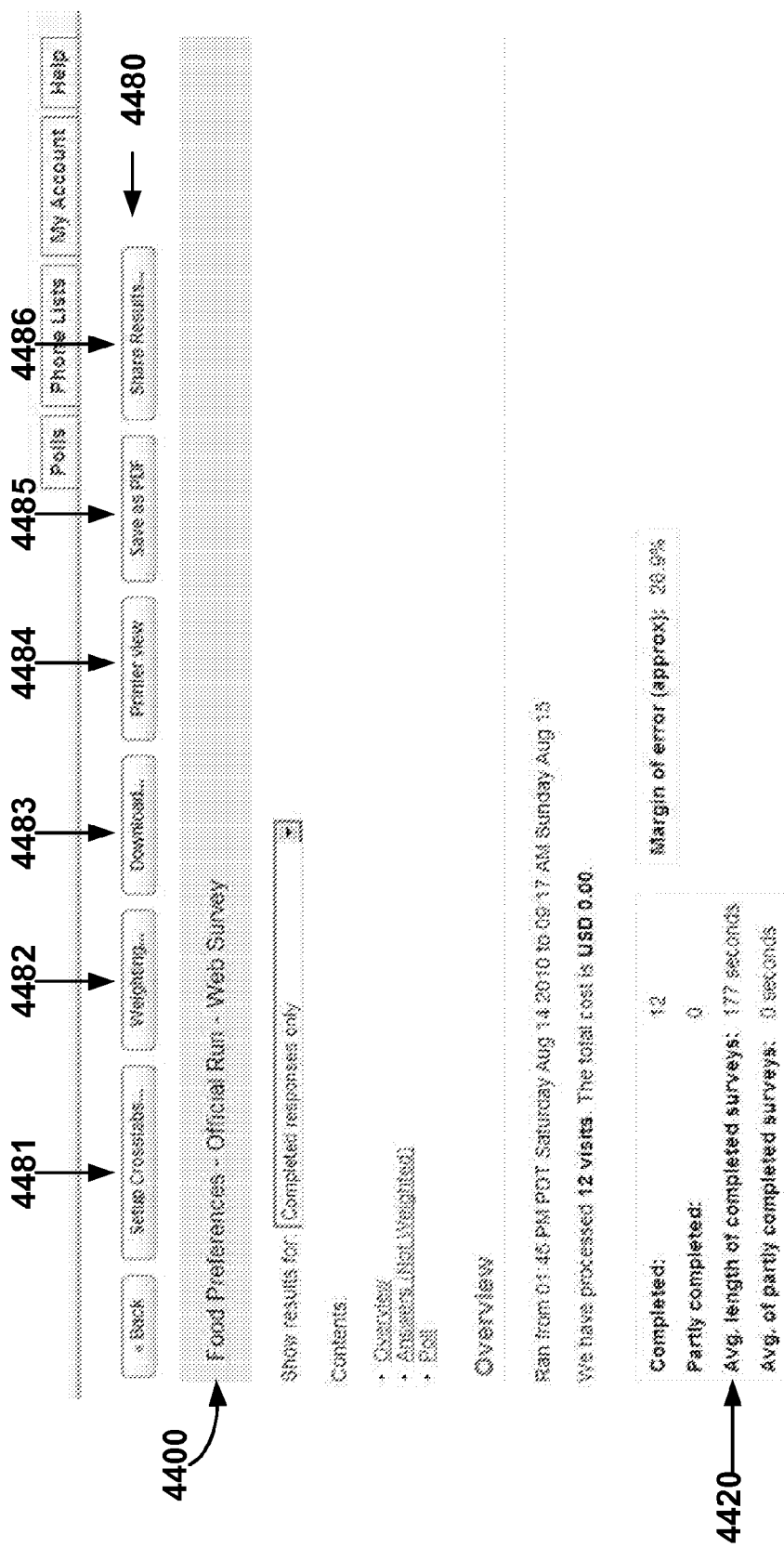
FIG. 44. illustrates one embodiment of summary information for a web survey run.
Figure 45:
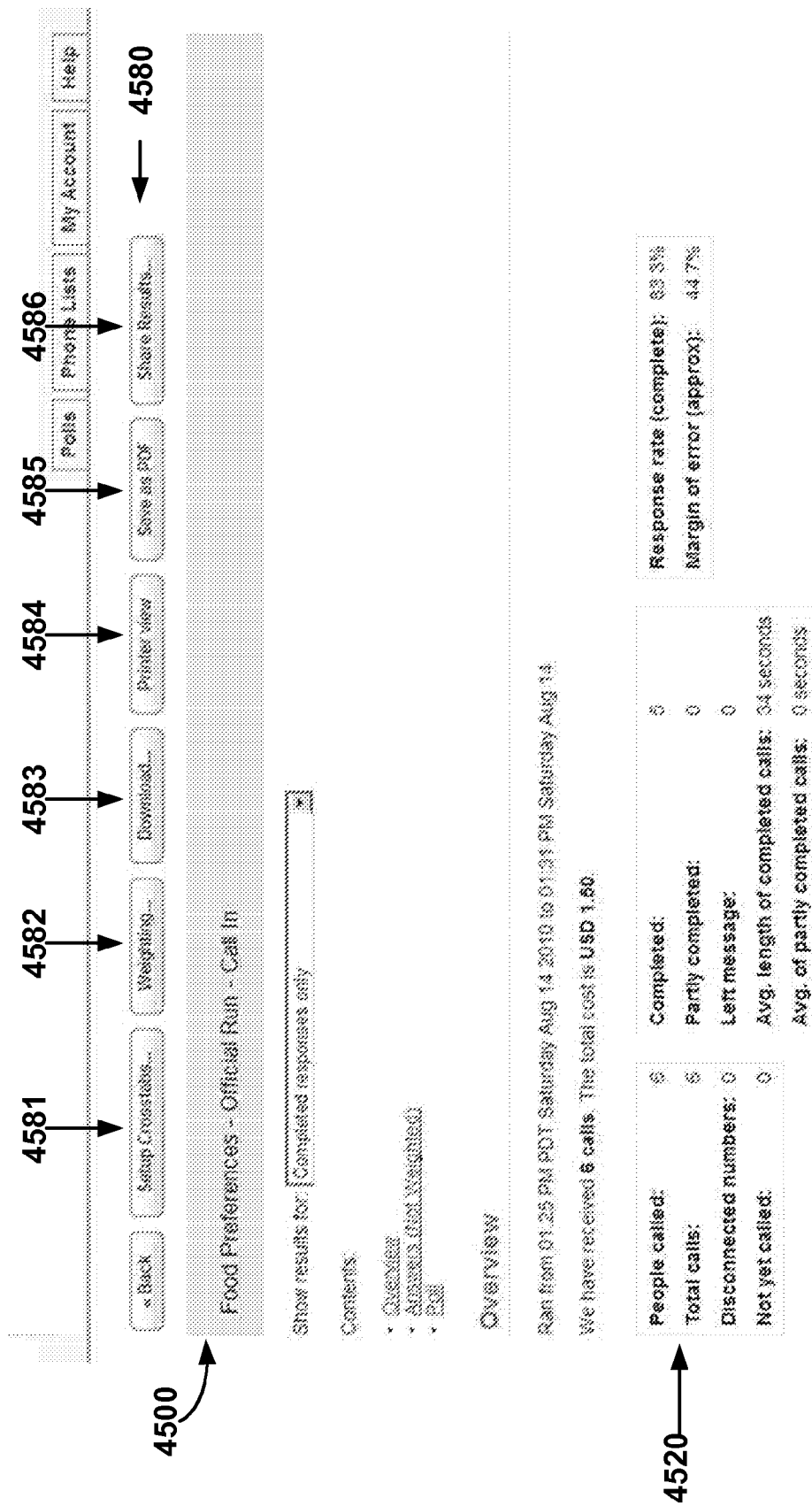
FIG. 45. illustrates one embodiment of summary information for a call-in poll run.
Figure 46:
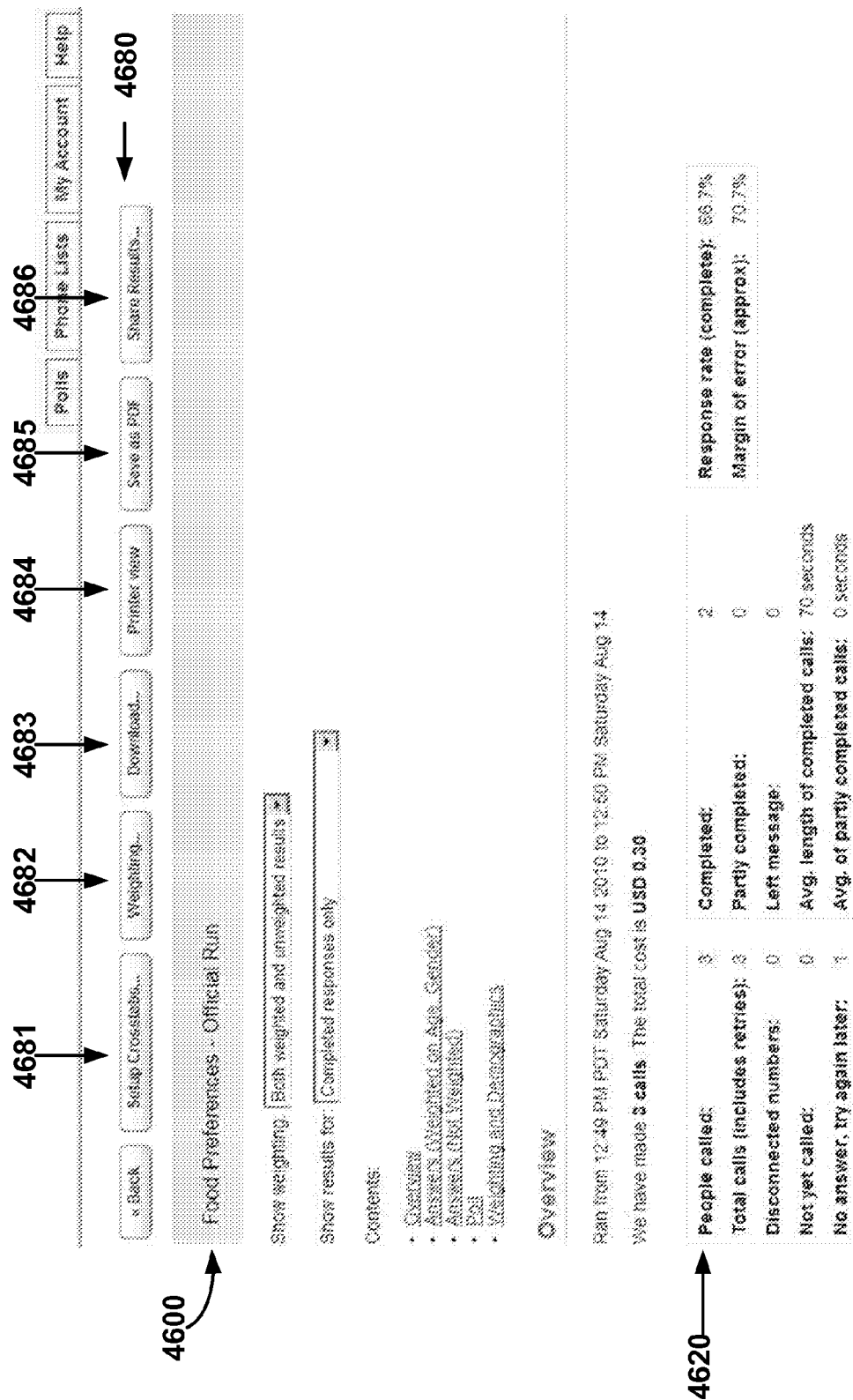
FIG. 46. illustrates one embodiment of summary information for a dial-out survey run.

FIGS. 44, 45 and 46 illustrates one embodiment of summary information for each of the poll runs shown on the dashboard in FIG. 43. FIG. 44 corresponds to the summary information 4400 for the web survey entitled "Official Run—Web Survey", and additionally includes information 4420 such as the average length of completed surveys.

FIG. 45 corresponds to the summary information 4500 for the call-in poll run entitled "Official Run—Call-In", and additionally includes information such as telephone usage statistics 4520 including the total number of calls received and the total number of calls completed.

FIG. 46 corresponds to the summary information 4600 for the dial-out poll run entitled "Official Run", and additionally includes information such as telephone usage statistics 4620 including the total number of calls received and the total number of calls completed, the number of telephone numbers with no answer, the response rate and the average time spent on phone calls for a completed surveys and partially completed surveys.

In one embodiment, each of the poll run result pages shown in FIGS. 43, 44 and 45 additionally includes a set of controls, 4480, 4580 and 4680 respectively, that enable the user to manipulate, display, output and share poll results, as will be discussed in more detail below.

In one embodiment, each of the poll run result pages additionally display detailed results for each poll section of a given poll run. In one embodiment, results for multiple choice questions, rating questions, and "enter a number" questions are represented both in numbers and graphically. FIG. 47-50 illustrate one embodiment of a graphical and numeric display of results for the exemplary web survey poll run summarized in FIG. 44.

Figure 49:
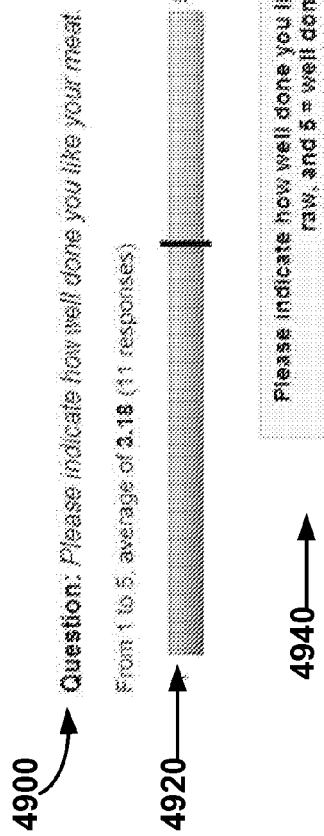
FIG. 49 illustrates one embodiment of a display of results for a rating question.
Figure 50:
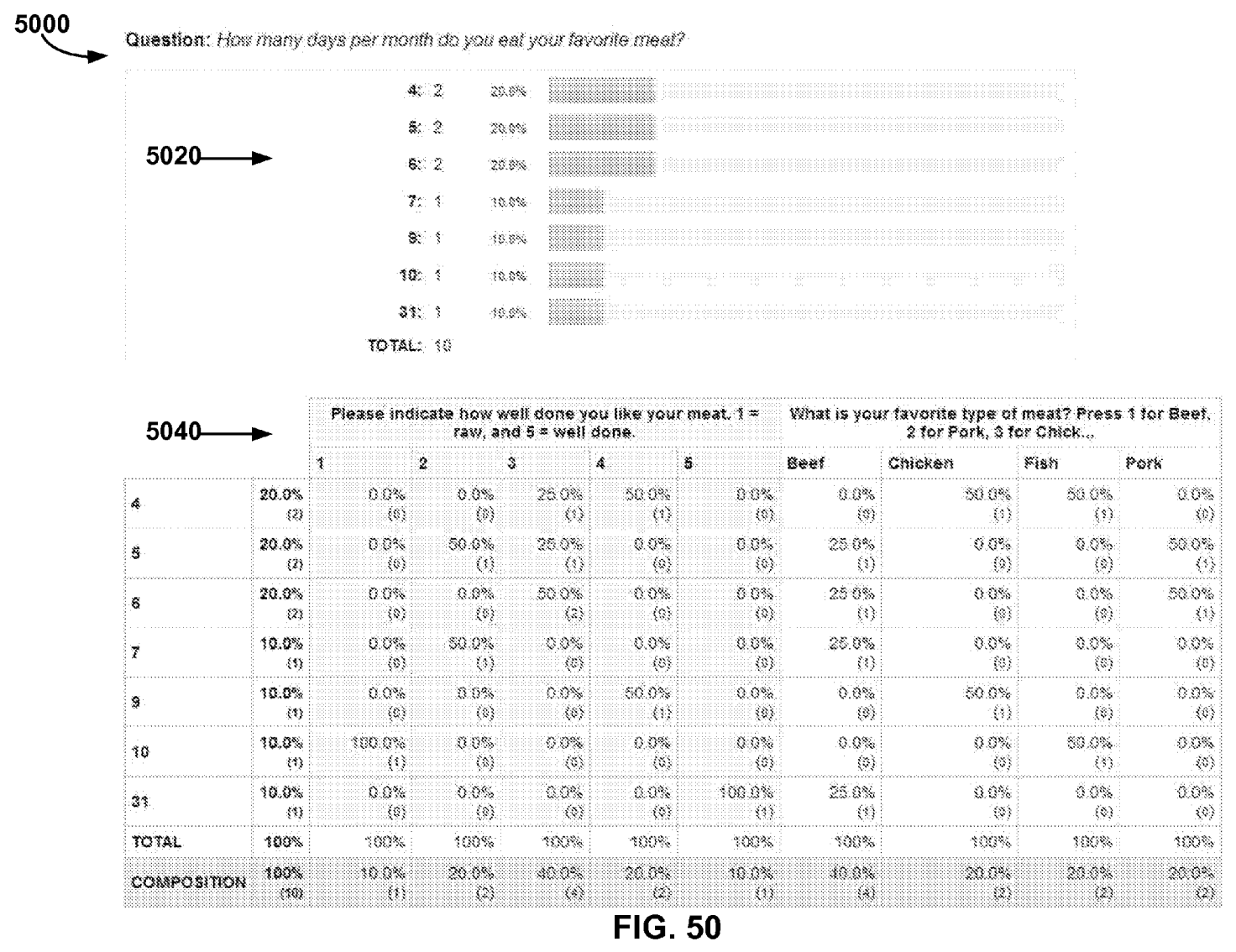

In FIG. 48, the results 4800 for the multiple-choice question of section 2 of the exemplary poll are presented as a vertical bar chart 4820, with individual bars for each selection of the question. In FIG. 49, the results 4900 for the rating question of section 3 is represented as a slider 4920 showing the average rating for the total set of answers to the question. In FIG. 50, the results 5000 for the "Enter a number" question of section 4 of the exemplary poll are presented as a vertical bar chart 5020, with individual bars for each number that appeared in at least one poll response. The particular graphical representations of the section results shown in FIG. 48-50 are purely exemplary, and it is understood that there are multiple ways of graphically presenting the same information. For example, any of the above section results could additionally, or alternatively, be presented as a pie chart.

Figure 51:
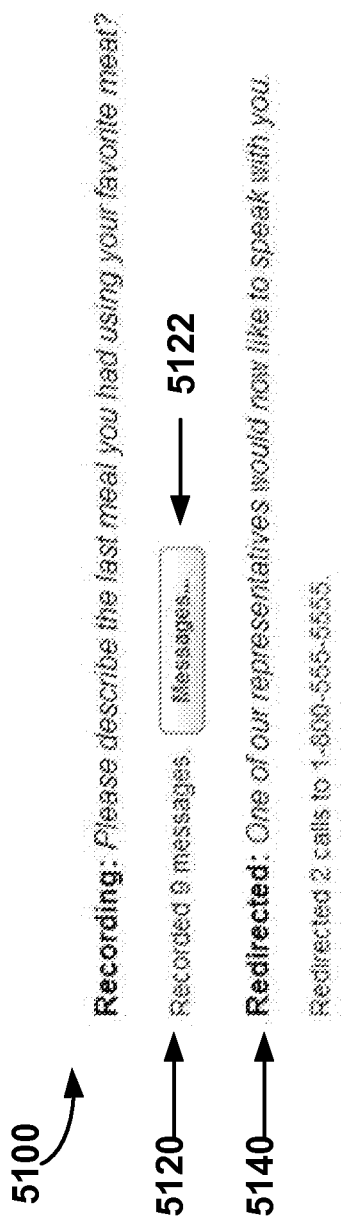
FIG. 51. illustrates one embodiment of a display of results for record message question and a "Patch-through" question.

In one embodiment, results for record message sections and "patch-through" sections are not represented graphically. As shown in FIG. 51, the results 5100 for the record message question of section 5 of the exemplary poll is presented as text 5120 summarizing the total number of recordings. In one embodiment, a control 5122 to link to the recordings is provided. In the case of web-based surveys, the control 5122 links to free form text entries received from poll targets. In the case of audio recordings, the control 5122 links to digital audio files of individual recordings. In one embodiment, where a user has selected machine translation of audio recordings for a poll section, the control 5122 links to digital audio files of individual recordings and their corresponding translations. In one embodiment, as shown in FIG. 51, the results for the "patch-through" question of section 6 of the exemplary poll is presented as text 5140 summarizing the total number of redirected calls.

In one embodiment, text collected via record message sections could be analyzed using one or more textual analysis techniques. For example, in one embodiment, the text collected via a record message section of a poll run could be analyzed to generate a word cloud highlighting the most interesting words (e.g. the most frequently used words) in the set of all responses. In another example, the text collected via a record message section of a poll run could be tagged with tags that categorize or characterize each response.

Figure 47:
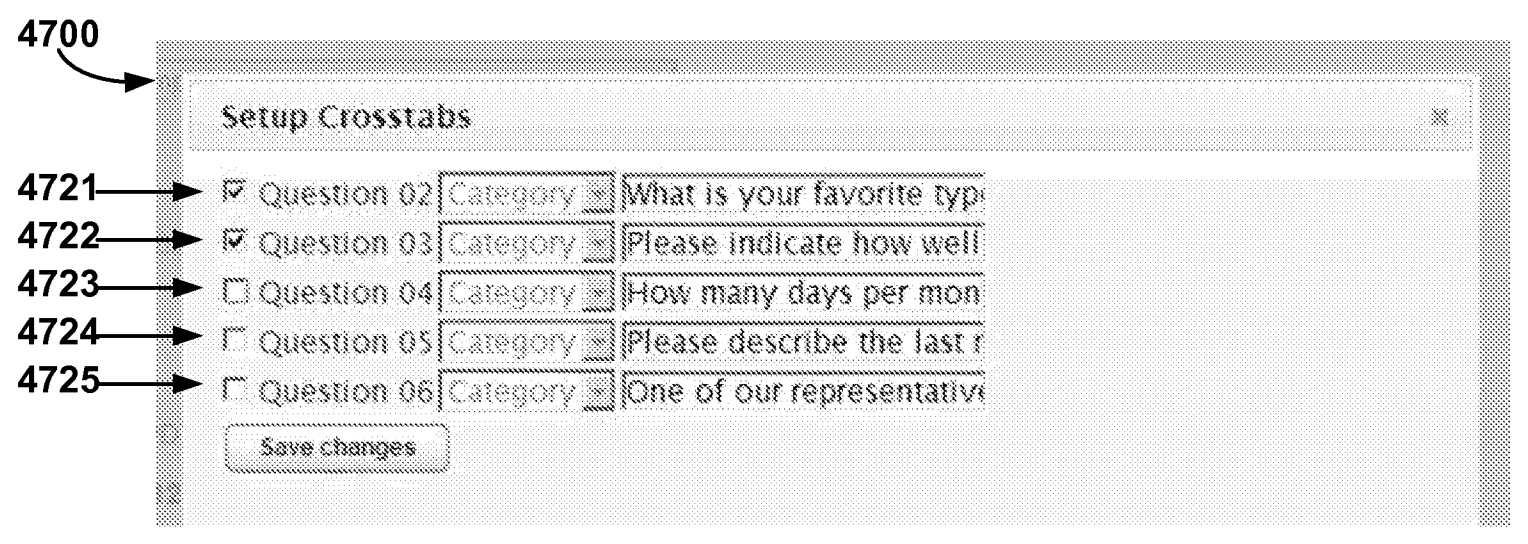

In one embodiment, the survey system additionally provides means for generating crosstabs to compare and correlate results for poll sections with one another. In one embodiment, the user selects sections to generate crosstabs for by clicking the "Setup Crosstabs . . . " control on the poll run results pages, such as those shown in FIG. 44-46. In one embodiment, when the user clicks on a "Setup Crosstabs . . . " control, a crosstab setup page is displayed. FIG. 47 illustrates one embodiment of a page displayed when the "Setup Crosstabs . . . " control 4481 is clicked on the poll results page for the exemplary web survey run shown in FIG. 44.

The crosstab setup page displays check boxes 4721-4725 for all of the poll sections except voice sections. In the illustrated embodiment, sections two 4721 and three 4722 of the poll run, corresponding to the questions "What kind of meat do you prefer?" and "How well done do you like your meat?" are selected. A user could select these tabs, for example, to determine how targets tend to cook a particular type of meat. In one embodiment, when the user saves the changes, the system automatically generates crosstab tables relating to the selected poll sections for all multiple choice questions, ratings questions, and "enter a number" type questions in the survey.

In one embodiment, crosstab tables 4840, 4940 and 5040 for sections 2, 3 and 4 of the exemplary Web Survey poll run are shown in FIGS. 48, 49 and 50, respectively, where a crosstab table is displayed for a given poll section immediately below the graphical representation of the poll section results. In one embodiment, each crosstab table 4840, 4940 and 5040 displays values for that specific poll section on the vertical axis of a crosstab table, and displays values for the crosstabbed sections (sections 2 and 3 in this case) on the horizontal axis of the crosstab table. In one embodiment, individual cells of the crosstab tables 4840, 4940 and 5040 contain a count of the number of poll results that include the poll section values indicated on the vertical and horizontal axes of the crosstab table. In one embodiment, individual cells of the crosstab tables 4840, 4940 and 5040 additionally include a percentage of the total number of poll results each cell represents. In one embodiment, the crosstab tables 4840, 4940 and 5040 additionally includes a total row along the horizontal axis of the table and a row indicating the percentage of the total poll results each value on the horizontal axis of the table represents.

Figure 52:
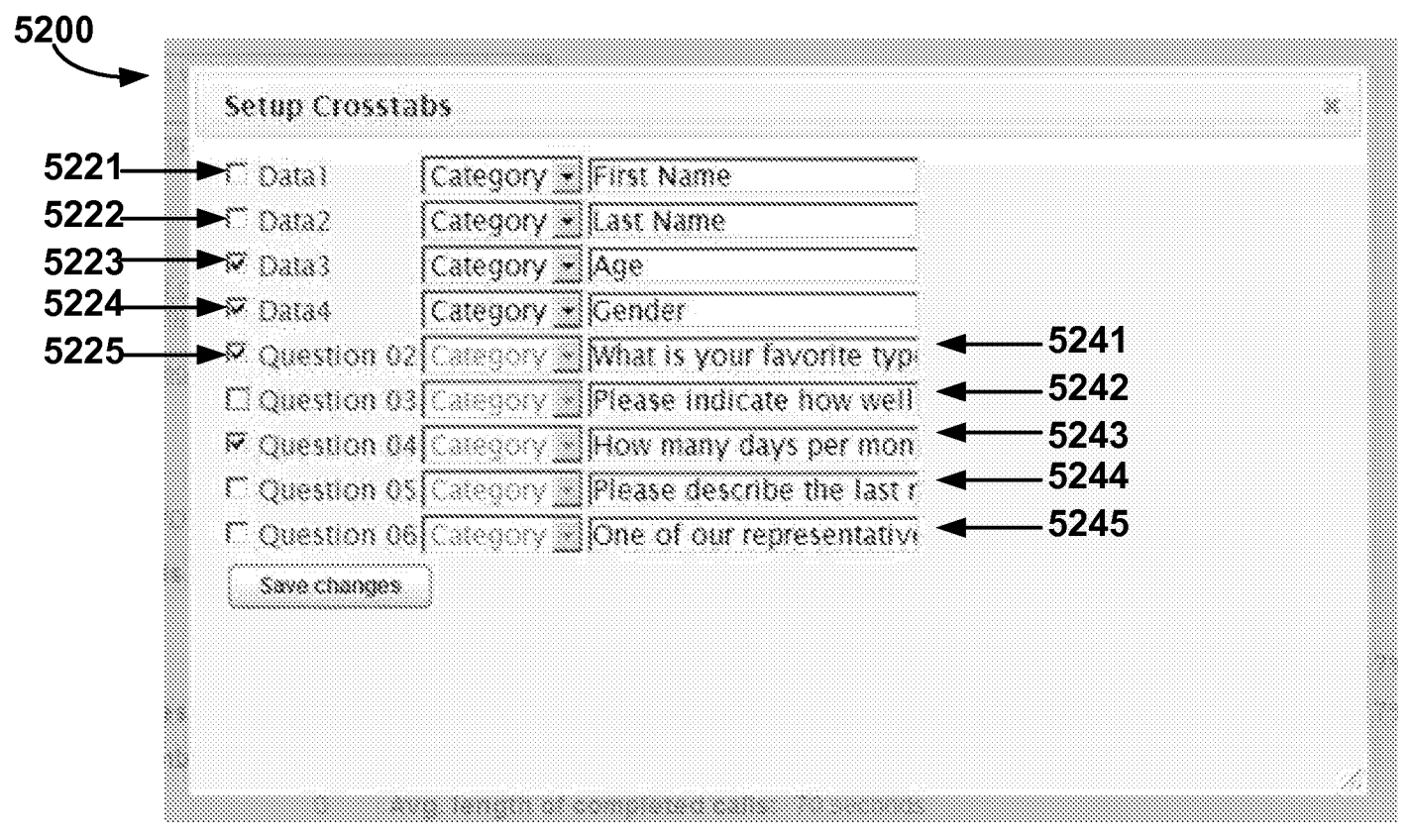

In one embodiment, crosstabs can also be generated for information included in phone lists, for example demographics for targets included in a phone list. In the exemplary dial-out poll run, the phone list used by for the poll run includes the user demographics age and gender. FIG. 52 illustrates one embodiment of a page displayed when the "Setup Crosstabs . . . " 4681 control is clicked on the poll results page for the exemplary dial-out poll run shown in FIG. 46.

The crosstab setup page shown in FIG. 52, in addition to providing check boxes for poll sections 5241-45, additionally provides check boxes 5221-24 for the phone list fields DATA1, DATA2, DATA3 and DATA4 respectively. In one embodiment, the user can assign meaningful names to the phone list fields. In the illustrated embodiment, the user has selected the field DATA3 5223 and labeled the field as "Age", and has further the field DATA4 5224 and labeled the field as "Gender". The user has additionally selected poll sections 2 5241 and 4 5243, corresponding to the questions "What type of meat do you prefer?" and "How many days a month do you eat your favorite meat?" In one embodiment, when the user saves the changes, the system automatically generates crosstab reports relating to these poll sections and demographics for all multiple choice questions, ratings questions, and "enter a number" type questions in the survey.

Figure 53:
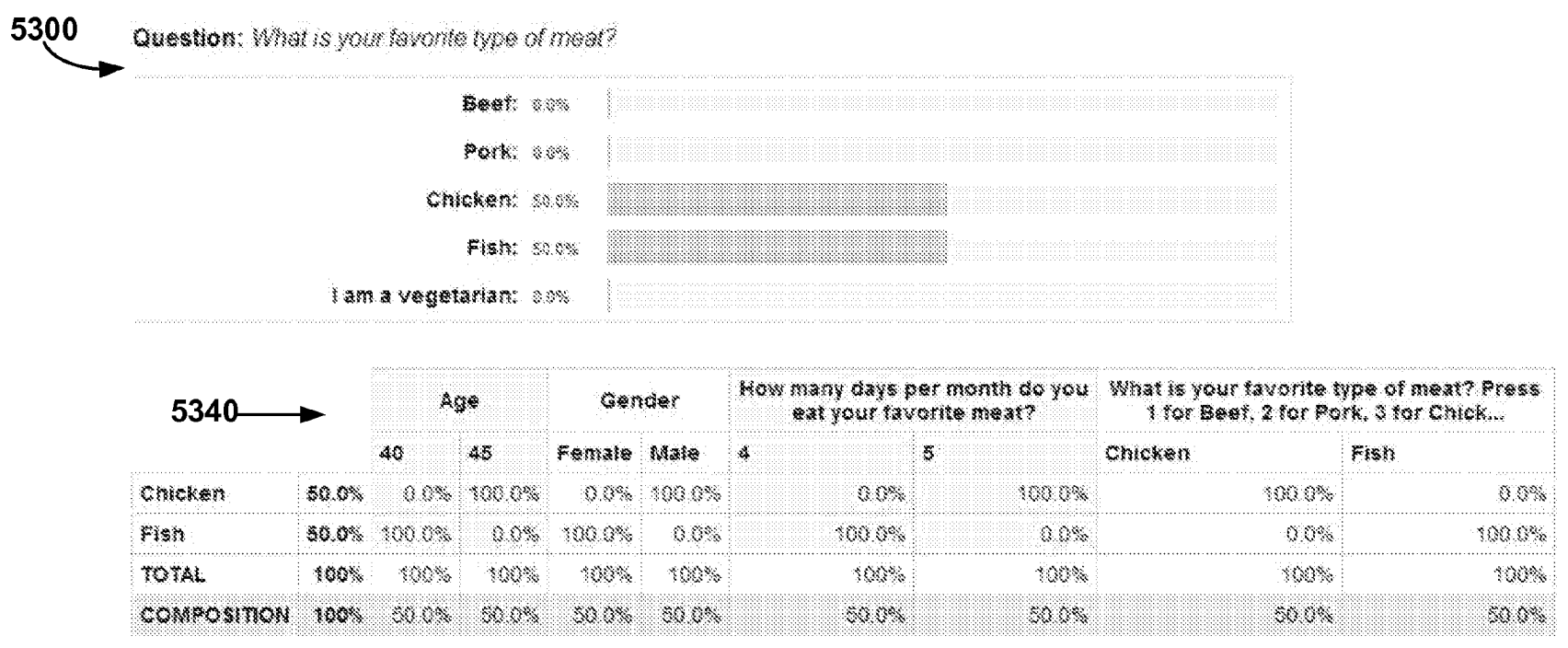
Figure 54:
FIG. 54. illustrates one embodiment of a display of results for a rating question with demographics.
Figure 55:
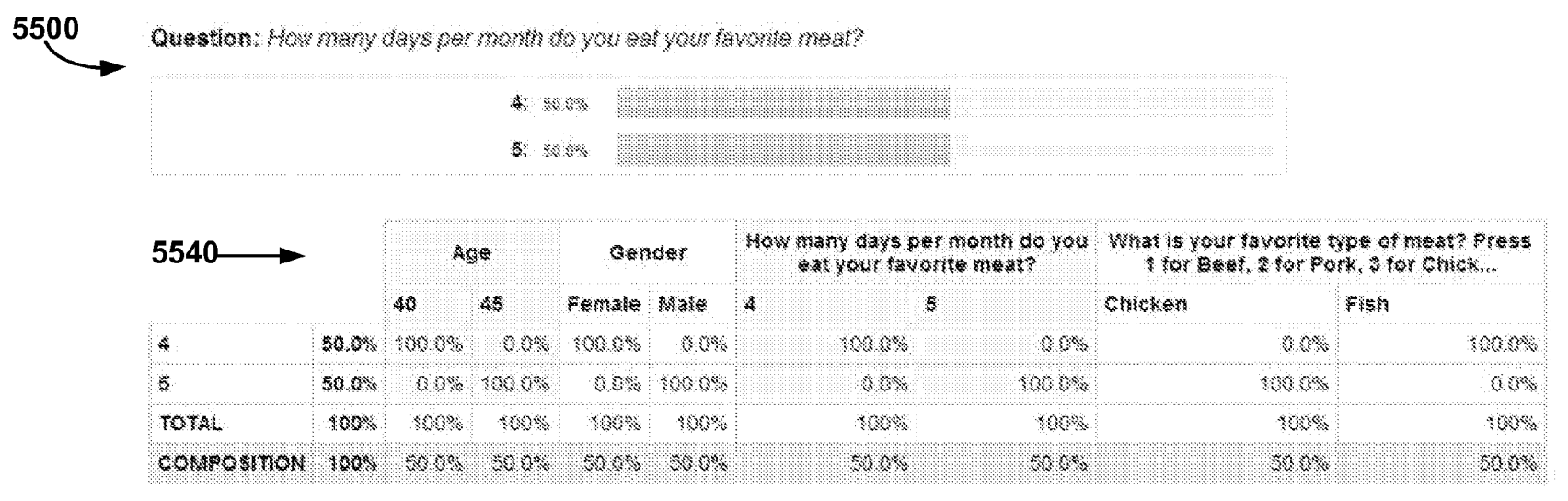

In one embodiment, crosstabbed results 5340, 5440 and 5540 for sections 2, 3 and 4 of the exemplary Web Survey poll run are shown in FIGS. 53, 54 and 55, respectively. Each crosstab report 5340, 5440 and 5540 displays values for that specific poll section on the vertical axis of a crosstab table, and displays values for the user demographics (Age and Gender) and the crosstabbed sections (sections 2 and 4 in this case) on the horizontal axis of the crosstab tables.

In one embodiment, the survey system can weight poll results using demographic information included in a phone list used for a polling run. In one embodiment, the system uses the demographics in the phone list used for a polling run as a representative baseline for expected poll demographics, and adjusts the impact of results in categories that were over or under-represented in the phone list. For example, if a phone list includes more males than females, the user may prefer to weight survey results such that individual poll results for females are more heavily weighted than those for males.

Figure 56:
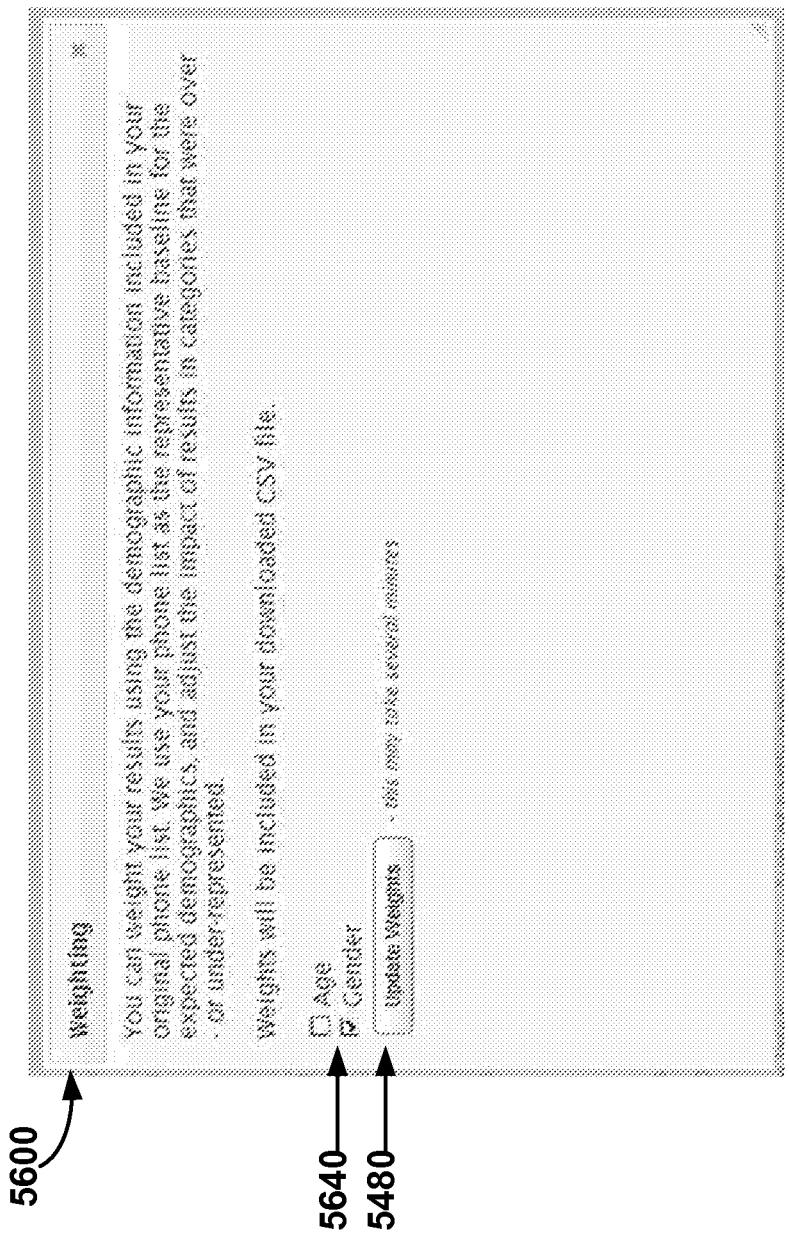
FIG. 56. illustrates one embodiment of a weighting set up page.

In one embodiment, the weighting process can be initiated for the exemplary dial-out survey by clicking on a "Weighting . . . " control on the poll results page, for example, as shown in element 4682 of FIG. 46. A weighting demographic selection box 5600 is then displayed as shown in FIG. 56. If the user selects gender 5620 and clicks "Update Weights" 5640, the system automatically weights poll results to reflect the baseline demographics in the phone list for the poll run. In one embodiment, survey results displays, such as graphs and crosstabs can display weighted survey results, unweighted survey results, or both.

In one embodiment, weighting on a single dimension is performed by calculating a simple ratio for each value of the dimension and weighting poll results using such ratios. For example, assume a phone list of 90 targets has 60 females and 30 males. If poll results are weighted on gender, poll results for males are weighted by a factor of 2 and poll results for females are weighted by a factor of 1.

In one embodiment, if multiple weighing dimensions are used, they are counted as dependent variables (e.g. a grouping by "female AND 35-49" is counted, in effect, as a single weighting dimension). In one embodiment, multiple weighing dimensions can be counted as independent variables. In one embodiment, the system could allow the user to manually set weights for demographic variables or combinations of demographic variables.

In one embodiment, poll results can be viewed while a poll run is actually running In one embodiment, poll run results are updated every time the user refreshes the poll results page. In one embodiment, poll results are also visible when a poll run is paused or any time after the poll run is complete. In one embodiment, the results for individual poll runs are stored separately, and are retained indefinitely. In one embodiment, the phone lists used for individual poll runs can be modified or deleted without affecting the results for such poll runs. In one embodiment, results for individual poll runs additionally includes a complete script of the poll used for the polling runs. In one embodiment, the result page can display information reflecting complete poll events (i.e. the target completed the survey), or complete and partial poll events.

In one embodiment, the results from a set of poll runs which used the same poll definition can be merged for the purpose of displaying and analyzing poll results. In one embodiment, the results from a set of poll runs can be merged even if more than one type of poll run was used. For example, results from one or more dial-out poll runs, one or more call-in poll runs and one or more web survey runs could be merged into a single set of results so long as the same poll definition was used for each poll run.

In one embodiment, one or more filters could be applied to the results of a poll run or a set of poll runs for the purpose of displaying and analyzing poll results. In one embodiment, filters could include or exclude poll results based on any data associated with the poll results. For example, a filter could include or exclude poll results from a date and/or time range or where a target gave a specific answer to a particular question.

Figure 57:
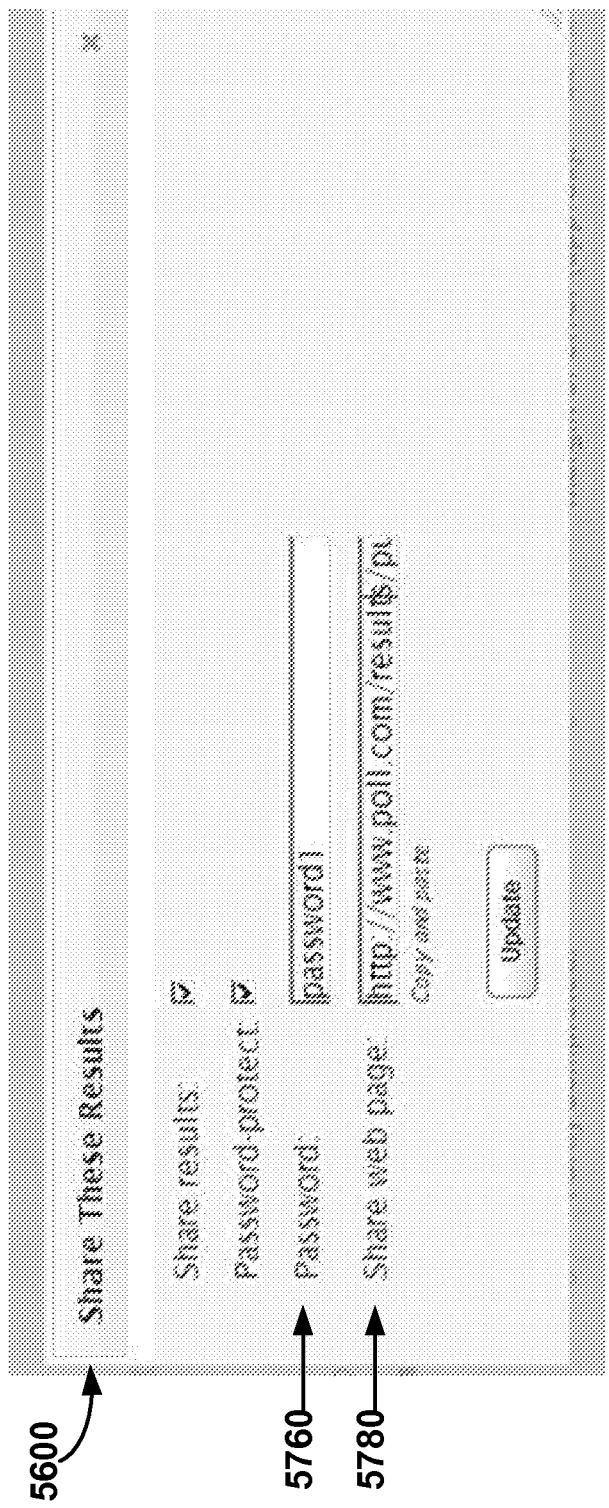
FIG. 57. illustrates one embodiment of a result sharing page.

In one embodiment, poll run result pages such as those shown in FIG. 44-46 provide controls to download poll results in a standard file format, such as CSV files and/or SPSS format files. In one embodiment, such files can include weighting factors if the poll results have been weighted. In one embodiment, poll run result pages such as those shown in FIG. 44-46 provide controls to print poll results (elements 4484, 4584 and 4684 respectively) and/or produce PDFs displaying poll results (elements 4484, 4585 and 4686 respectively). In one embodiment, poll run result pages such as those shown in FIG. 44-46 provide a "Share Results" control (elements 4486, 4586 and 4686 respectively) that, when clicked, provides an interface 5700 that allows a user to setup a password 5760 on the poll result page as shown in FIG. 57. The user can then share the URL 5780 for the poll result page and the password 5760 with other persons to allow any person access to the poll run results page using the URL and password.

In one embodiment, poll run result pages could be displayed using a sitelet embedded in a webpage. For example, a company that is running a poll could embed a sitelet reflecting the poll run on a page of the corporate website. In one embodiment, the data reflected in the sitelet is updated whenever the webpage in which the sitelet is embedded is refreshed. In one embodiment, the data reflected in the sitelet is updated in real-time.

Figure 58:
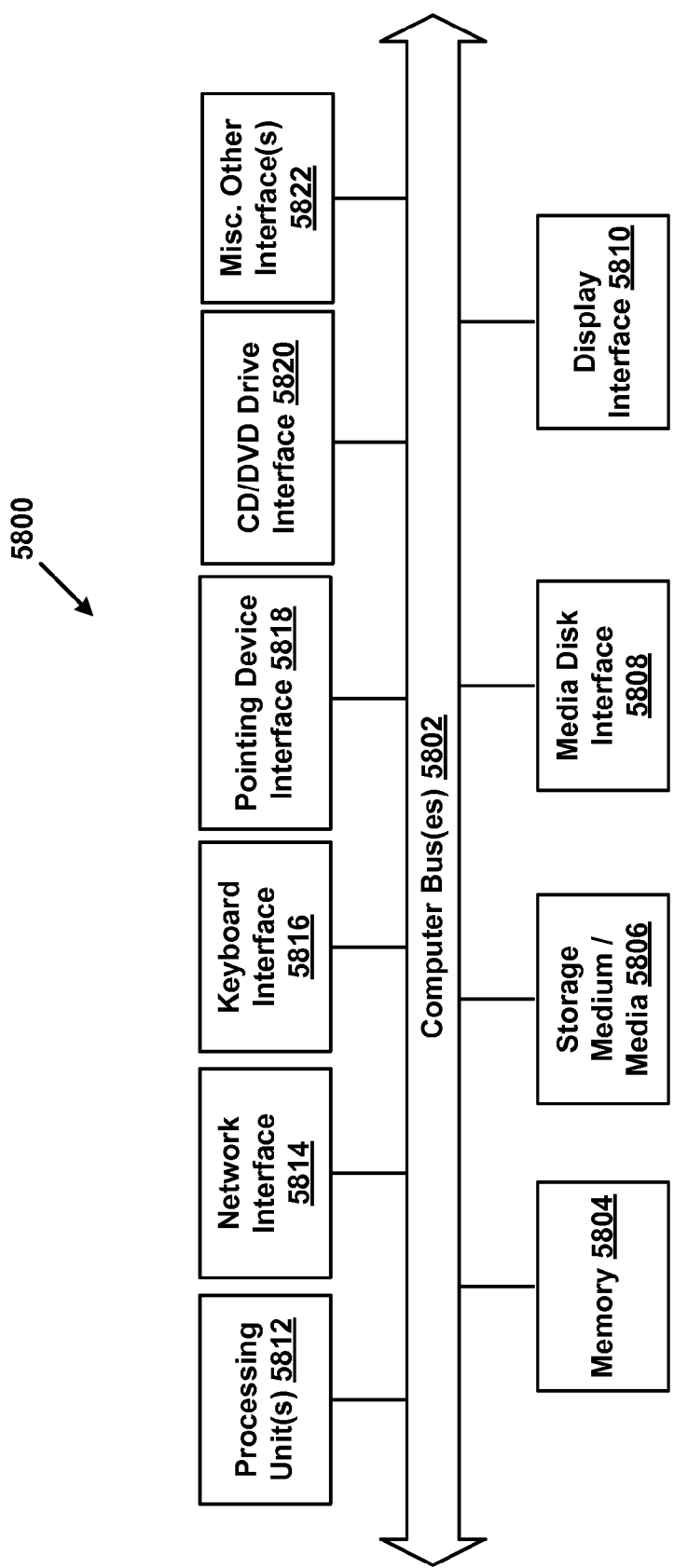
FIG. 58 is a block diagram illustrating an internal architecture of an example of a computing device.

FIG. 58 is a block diagram illustrating an internal architecture of an example of a computing device, such the automated survey services servers of FIG. 6, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 8, internal architecture 5800 includes one or more processing units (also referred to herein as CPUs) 5812, which interface with at least one computer bus 5802. Also interfacing with computer bus 5802 are persistent storage medium/media 5806, network interface 5814, memory 5804, e.g., random access memory (RAM), run-time transient memory, read only memory (ROM), etc., media disk drive interface 5808 as an interface for a drive that can read and/or write to media including removable media such as floppy, CD-ROM, DVD, etc. media, display interface 5810 as interface for a monitor or other display device, keyboard interface 5816 as interface for a keyboard, pointing device interface 5818 as an interface for a mouse or other pointing device, and miscellaneous other interfaces not shown individually, such as parallel and serial port interfaces, a universal serial bus (USB) interface, and the like.

Memory 5804 interfaces with computer bus 5802 so as to provide information stored in memory 5804 to CPU 5812 during execution of software programs such as an operating system, application programs, device drivers, and software modules that comprise program code, and/or computer executable process steps, incorporating functionality described herein, e.g., one or more of process flows described herein. CPU 5812 first loads computer executable process steps from storage, e.g., memory 5804, storage medium/media 5806, removable media drive, and/or other storage device. CPU 5812 can then execute the stored process steps in order to execute the loaded computer-executable process steps. Stored data, e.g., data stored by a storage device, can be accessed by CPU 5812 during the execution of computer-executable process steps.

Persistent storage medium/media 5806 is a computer readable storage medium(s) that can be used to store software and data, e.g., an operating system and one or more application programs. Persistent storage medium/media 5806 can also be used to store device drivers, such as one or more of a digital camera driver, monitor driver, printer driver, scanner driver, or other device drivers, web pages, content files, playlists and other files. Persistent storage medium/media 5806 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:
1. A method comprising:
selecting, by a computing device, a plurality of phone list entries from a phone list, each phone list entry comprising a target phone number;
for each of the plurality of phone list entries:
calling, by the computing device over a voice network, the target phone number of the respective phone list entry;
if the call is answered,
the computing device conducting a voice response survey using a poll definition comprising at least one question, such that a voice capability of the computing device asks a person responding to the call the at least one question;

the computing device receiving, over the voice network, an answer to the at least one question; and the computing device storing, the answer to the at least one question to a poll answers database.

2. The method of claim 1, such that each phone list entry additionally comprises at least one user demographic, such that each answer is stored to the poll answers database in association with the at least one user demographic.

3. The method of claim 2, such that the at least one user demographic in the phone list is used to weight each answer stored on the poll answers database.

4. A method comprising:

selecting, by a computing device, a plurality of phone list entries from a phone list, each phone list entry comprising a target phone number;

for each of the plurality of phone list entries:

calling, by the computing device over a voice network, the target phone number of the respective phone list entry;

if the call is answered, conducting, by the computing device, a voice response survey using a poll definition comprising at least one question, such that a person responding to the call is asked the at least one question using a voice capability provided via the computing device;

receiving, by the computing device over the voice network, an answer to the at least one question; and storing, by the computing device, the answer to a poll answers database, such that each phone list entry additionally comprises at least one user demographic, such that each answer is stored to the poll answers database in association with the at least one user demographic, such that the at least one user demographic in the phone list is used to weight each answer stored on the poll answers database, such that weighting comprises:

determining, by the computing device, a baseline for expected poll demographics using the phone list; and weighting, by the computing device, each answer stored to the poll answers database using the baseline for expected poll demographics and the at least one user demographic for the respective answer.

5. The method of claim 1, such that the at least one question has at least two versions, such that, for each of the plurality of phone list entries, one of the at least two versions of the at least one question is randomly selected and the respective person is asked the one of the at least two versions of the at least one question.

6. The method of claim 1, such that the poll comprises at least two questions, such that at least a first one of the at least two questions has at least two versions, such that one of the at least two versions of the at least one question is selected based on an answer to a second one of the at least two questions.

7. The method of claim 5, such that the at least one question is a multiple choice question comprising a plurality of multiple choice options, and each of the at least two versions of the at least one question orders the plurality of multiple choice options in manner different that the remaining versions of the question.

8. The method of claim 5, such that the each of the at least two versions of the at least one question phrases the question in manner different that the remaining questions.

9. The method of claim 2 additionally comprising displaying, on a display device, a representation of the answers stored on the poll answers database, such that the representation of the answers stored on the poll answers database is provided for each of the at least one questions and comprises a crosstab of the at least one user demographic and answers to the at least one questions.

10. A method comprising:

selecting, by a computing device, a plurality of phone list entries from a phone list, each phone list entry comprising a target phone number;

for each of the plurality of phone list entries:

calling, by the computing device over a voice network, the target phone number of the respective phone list entry;

if the call is answered, conducting, by the computing device, a voice response survey using a poll definition comprising at least one question, such that a person responding to the call is asked the at least one question using a voice capability provided via the computing device;

receiving, by the computing device over the voice network, an answer to the at least one question; and storing, by the computing device, the answer to a poll answers database, such that each phone list entry additionally comprises at least one user demographic, such that each phone list entry additionally comprises at least one user demographic, such that each answer is stored to the poll answers database in association with the at least one user demographic, and displaying, on a display device, a representation of the answers stored on the poll answers database, such that the representation of the answers stored on the poll answers database is provided for each of the at least one questions and comprises a crosstab of the at least one user demographic and answers to the at least one questions, such that the representation of the answers stored on the poll answers database is displayed before all of the plurality of phone numbers are called, and the display of the representation of the answers stored on the poll answers database changes dynamically as the additional phone numbers from the plurality of phone numbers are called.

11. The method of claim 1, such that the plurality of phone list entries are selected at random from the phone list.

12. The method of claim 1, such that the phone number of each of the plurality of phone list entries is retried a fixed number of times if there is no answer.

13. The method of claim 1, such that if an answering machine pickup is detected for a call made to a target phone number, the call is hung-up, and the call to the target phone number is treated as if the call was not answered.

14. The method of claim 1, such that if an answering machine pickup is detected for a call made to a target phone number, a message is left on the answering machine, and the call to the target phone number is treated as complete.

15. The method of claim 1, additionally comprising:

receiving, by the computing device, poll run completion criteria, such that if the poll run completion criteria are satisfied before all of the plurality of phone list entries have been called, the poll run is stopped, and no more calls are made.

16. The method of claim 15, such that poll completion criteria comprises the completion of a predetermined number of polls.

17. The method of claim 15, such that poll completion criteria comprises the completion of predetermined number of polls by a defined demographic group.

18. The method of claim 15, such that poll completion criteria comprises a predetermined date and time.

19. The method of claim 1, additionally comprising:
receiving, by the computing device, at least one poll run option.

20. The method of claim 19, such that the at least one poll run option indicates that target phone numbers which have been called within a fixed number of days prior to the current date should not be called.

21. The method of claim 19, such that the at least one poll run option indicates certain dates and times in which target phone numbers may be called.

22. The method of claim 19, such that the at least one poll run option is an outbound caller ID which is used for making phone calls to target phone numbers.

23. The method of claim 19, such that the poll run option is an outbound caller ID is for a phone number for a dial-in voice response survey that uses the poll definition.

24. The method of claim 19, such that the at least one poll run option specifies an outbound call rate for calls made to target phone numbers.

25. The method of claim 1, such that if an answer to the at least one question is a voice message, the voice message is automatically transcribed, using the computing device, to a text representation, and the text representation is stored on the poll answers database.

26. The method of claim 1, additionally comprising:
receiving, by the computing device, an indication that calling target phone numbers is to be paused, such that target phone numbers are not called until an indication is received that calling target phone numbers is to be resumed.

27. A non-transitory computer-readable storage medium for tangibly storing thereon computer readable instructions that, when executed by a computing device, cause the computing device to perform a method comprising:
selecting a plurality of phone list entries from a phone list, each phone list entry comprising a target phone number;
for each of the plurality of phone list entries:
calling, over a voice network, the target phone number of a respective phone list entry;
if the call is answered,
conducting a voice response survey using a poll definition comprising at least one question, such that a person responding to the call is asked the at least one question using a voice capability provided via the computing device;
receiving, over the voice network, an answer to the at least one question; and
storing the answer to a poll answers database.

28. A computing device comprising:
a processor memory;
a storage medium for tangibly storing thereon program logic for execution by the processor, the program logic comprising:
logic configured to cause a computing device to select a plurality of phone list entries from a phone list, each phone list entry comprising a target phone number;
logic configured to cause the computing device, for each of the plurality of phone list entries:
to call, over a voice network, the target phone number of a respective phone list entry;
logic configured to cause the computing device to, if the call is answered,
conduct a voice response survey using a poll definition comprising at least one question, such that a person responding to the call is asked the at least one question using a voice capability provided via the computing device;
receive, over the voice network, an answer to the at least one question; and
store the answer to a poll answers database.

29. A method comprising:
for each of a plurality of in-bound calls associated with respective phone numbers:
receiving, over a voice network by a computing device, a voice call from one of the respective phone numbers;
conducting, by the computing device, a previously-created voice response survey using a poll definition comprising at least one question, such that a person making the inbound call is asked the at least one question using a voice capability provided via the computing device;
receiving, over the voice network by the computing device, an answer to the at least one question;
storing, by the computing device, the answer to a poll answers database;
receiving, over the voice network by the computing device, a second call from the respective phone number; and
replacing, by the computing device, the answer with an answer to the at least one question received via the second call.

30. The method of claim 29, such that the at least one question has at least two versions, such that, for each inbound call, one of the at least two versions of the at least one question is randomly selected and the respective person is asked the one of the at least two versions of the at least one question.

31. A method comprising:
for each of a plurality of in-bound calls associated with respective phone numbers:
receiving, over a voice network by a computing device, a voice call from one of the respective phone numbers;
conducting, by the computing device, a voice response survey using a poll definition comprising at least one question, such that a person making the inbound call is asked the at least one question using a voice capability provided via the computing device;
receiving, over the voice network by the computing device, an answer to the at least one question;
storing, by the computing device, the answer to a poll answers database;
receiving, over the voice network by the computing device, a second call from the respective phone number; and
replacing, by the computing device, the answer with an answer to the at least one question received via the second call, such that the at least one question has at least two versions, such that, for each inbound call, one of the at least two versions of the at least one question is randomly selected and the respective person is asked the one of the at least two versions of the at least one question,
such that the poll comprises at least two questions, such that at least a first one of the at least two questions has at least two versions, such that one of the at least two versions of the at least one question is selected based on an answer to a second one of the at least two questions.

32. The method of claim 30, such that the at least one question is a multiple choice question comprising a plurality of multiple choice options, and each of the at least two versions of the at least one question orders the plurality of multiple choice options in manner different that the remaining versions of the question.

33. The method of claim 30, such that the each of the at least two versions of the at least one question phrases the question in manner different that the remaining questions.

34. The method of claim 29 such that the poll definition comprises at least two questions, the method additionally comprising:
displaying, on a display device, a representation of the answers stored on the poll answers database, such that the representation of the answers is provided for each of the at least two questions and comprises a crosstab of the answers to the at least two questions.

35. The method of claim 29 additionally comprising:
receiving, via the voice call, a poll code, such that the poll code is used to identify the poll definition used to conduct the voice response survey.

36. The method of claim 29 additionally comprising:
sending, via a network, a poll notification message to a plurality of poll targets, the poll notification message comprising a notification that a poll has been initiated.

37. The method of claim 36 such that the poll notification comprises a dial-in phone number for the voice response survey.

38. The method of claim 36 such that the network is the voice network, and the poll notification message is sent to the plurality of poll targets as an SMS message.

39. The method of claim 36 such that the poll notification message is sent to the plurality of poll targets as an email.

40. The method of claim 36 such that the poll notification message is posted to a social networking account for each of the plurality of poll targets.

41. The method of claim 36 such that the poll notification message is posted to a social networking account for an entity interested in the results of the poll.

42. A non-transitory computer-readable storage medium for tangibly storing thereon computer readable instructions for a method executed by a computing device, the method comprising:
for each of a plurality of in-bound calls associated with respective phone numbers:
receiving, over a voice network, a voice call from one of the respective phone numbers;
conducting a previously-created voice response survey using a poll definition comprising at least one question, such that a person making the inbound call is asked the at least one question using a voice capability provided via the computing device;
receiving an answer to the at least one question;
storing the answer to a poll answers database;
receiving a second call from the respective phone number; and
replacing the answer with an answer to the at least one question received in the second call.

43. A computing device comprising:
a processor;
a processor memory;
a storage medium for tangibly storing thereon program logic for execution by the processor, the program logic comprising:
logic for:
for each of a plurality of in-bound calls associated with respective phone numbers:
receiving, over a voice network, a voice call from the respective phone number;
conducting a previously-created voice response survey using a poll definition comprising at least one question, such that a person making the inbound call is asked the at least one question using a voice capability provided via the computing device;
receiving, over the voice network, an answer to the at least one question;
storing the answer to a poll answers database receiving, over the voice network, a second call from the respective phone number; and
replacing the answer with an answer to the at least one question received in the second call.

44. A method comprising:
calling, over a voice network by a computing device, a target phone number using an outbound caller ID number;
the computing device receiving, over a voice, a voice call from the target phone number at a number corresponding to the outbound caller ID number;
the computing device conducting a first voice response survey using a poll definition comprising at least one question, such that a voice capability of the computing device asks a person making the voice call the at least one question;
the computing device receiving, over the voice network, a first answer to the at least one question;
the computing device storing, the first answer to the poll answers database;
the computing device receiving, over the voice network, a second call from the target phone number; and
the computing device replacing, over the voice network, the first answer with a second answer to the at least one question received via the second call.

* * * * *